United States Patent
Woodgate et al.

(10) Patent No.: US 10,365,426 B2
(45) Date of Patent: *Jul. 30, 2019

(54) DIRECTIONAL BACKLIGHT

(71) Applicant: REALD SPARK, LLC, Beverly Hills, CA (US)

(72) Inventors: Graham J. Woodgate, Henley-on-Thames (GB); Michael G. Robinson, Boulder, CO (US); Jonathan Harrold, Leamington Spa (GB); Miller H. Schuck, Erie, CO (US)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/821,515

(22) Filed: Aug. 7, 2015

(65) Prior Publication Data
US 2016/0131823 A1 May 12, 2016
US 2019/0179076 A9 Jun. 13, 2019

Related U.S. Application Data

(63) Continuation of application No. 13/838,936, filed on Mar. 15, 2013, now Pat. No. 9,188,731.
(Continued)

(51) Int. Cl.
*F21V 8/00* (2006.01)
*G02B 6/00* (2006.01)
*G02F 1/1335* (2006.01)

(52) U.S. Cl.
CPC ......... *G02B 6/0078* (2013.01); *G02B 6/0048* (2013.01); *G02B 6/0055* (2013.01);
(Continued)

(58) Field of Classification Search
CPC .. G02B 6/0045; G02B 6/0048; G02B 6/0055; G02B 6/0061; G02B 6/0068;
(Continued)

(56) References Cited

U.S. PATENT DOCUMENTS 1,128,979 A  2/1915  Hess
1,970,311 A  8/1934  Ives
(Continued)

FOREIGN PATENT DOCUMENTS

CN  1142869 A   2/1997
CN  1377453 A  10/2002
(Continued)

OTHER PUBLICATIONS

Maeda et al, Feb. 16, 2012, Espacenet Machine Translation of WO2012020636A1, pp. 1-65.*
(Continued)

*Primary Examiner* — Alan B Cariaso
(74) *Attorney, Agent, or Firm* — Penny L. Lowry; Neil G. J. Mothew

(57) ABSTRACT

Disclosed is a light guiding valve apparatus including at least one transparent stepped waveguide optical valve for providing large area collimated illumination from localized light sources, and at least one further illumination source. A stepped waveguide may be a stepped structure, where the steps include extraction features hidden to guided light, propagating in a first forward direction. Returning light propagating in a second backward direction may be refracted, diffracted, or reflected by the features to provide discrete illumination beams exiting from the top surface of the waveguide. Such controlled illumination may provide for efficient, multi-user autostereoscopic displays as well as improved 2D display functionality. Light from a separate illumination source may pass through the transparent
(Continued)

stepped waveguide optical valve to provide at least one further additional illumination function.

21 Claims, 57 Drawing Sheets

Related U.S. Application Data

(60) Provisional application No. 61/649,136, filed on May 18, 2012, provisional application No. 61/649,054, filed on May 18, 2012, provisional application No. 61/649,116, filed on May 18, 2012, provisional application No. 61/648,942, filed on May 18, 2012, provisional application No. 61/648,840, filed on May 18, 2012, provisional application No. 61/649,050, filed on May 18, 2012.

(52) U.S. Cl.
CPC ......... *G02B 6/0068* (2013.01); *G02B 6/0073* (2013.01); *G02B 6/0076* (2013.01); *G02F 1/133524* (2013.01); *G02B 6/0061* (2013.01); *G02F 2001/133567* (2013.01)

(58) Field of Classification Search
CPC .. G02B 6/0073; G02B 6/0076; G02B 6/0078; G02B 6/008; G02B 6/0075; G02F 1/133524; G02F 2001/133567
See application file for complete search history.

(56) References Cited

U.S. PATENT DOCUMENTS

| | | |
|---|---|---|
| 2,133,121 A | 10/1938 | Stearns |
| 2,247,969 A | 7/1941 | Lemuel |
| 2,480,178 A | 8/1949 | Zinberg |
| 2,810,905 A | 10/1957 | Barlow |
| 3,409,351 A | 11/1968 | Winnek |
| 3,715,154 A | 2/1973 | Bestenreiner |
| 4,057,323 A | 11/1977 | Ward |
| 4,528,617 A | 7/1985 | Blackington |
| 4,542,958 A | 9/1985 | Young |
| 4,804,253 A | 2/1989 | Stewart |
| 4,807,978 A | 2/1989 | Grinberg et al. |
| 4,829,365 A | 5/1989 | Eichenlaub |
| 4,914,553 A | 4/1990 | Hamada et al. |
| 5,050,946 A | 9/1991 | Hathaway et al. |
| 5,278,608 A | 1/1994 | Taylor et al. |
| 5,347,644 A | 9/1994 | Sedlmayr |
| 5,349,419 A | 9/1994 | Taguchi et al. |
| 5,459,592 A | 10/1995 | Shibatani et al. |
| 5,466,926 A | 11/1995 | Sasano et al. |
| 5,510,831 A | 4/1996 | Mayhew |
| 5,528,720 A | 6/1996 | Winston et al. |
| 5,581,402 A | 12/1996 | Taylor |
| 5,588,526 A | 12/1996 | Fantone et al. |
| 5,697,006 A | 12/1997 | Taguchi et al. |
| 5,703,667 A | 12/1997 | Ochiai |
| 5,727,107 A | 3/1998 | Umemoto et al. |
| 5,771,066 A | 6/1998 | Barnea |
| 5,796,451 A | 8/1998 | Kim |
| 5,808,792 A | 9/1998 | Woodgate et al. |
| 5,850,580 A | 12/1998 | Taguchi et al. |
| 5,875,055 A | 2/1999 | Morishima et al. |
| 5,896,225 A | 4/1999 | Chikazawa |
| 5,903,388 A | 5/1999 | Sedlmayr |
| 5,933,276 A | 8/1999 | Magee |
| 5,956,001 A | 9/1999 | Sumida et al. |
| 5,959,664 A | 9/1999 | Woodgate |
| 5,959,702 A | 9/1999 | Goodman |
| 5,971,559 A | 10/1999 | Ishikawa et al. |
| 6,008,484 A | 12/1999 | Woodgate et al. |
| 6,014,164 A | 1/2000 | Woodgate et al. |
| 6,023,315 A | 2/2000 | Harrold et al. |
| 6,044,196 A | 3/2000 | Winston et al. |
| 6,055,013 A | 4/2000 | Woodgate et al. |
| 6,061,179 A | 5/2000 | Inoguchi et al. |
| 6,061,489 A | 5/2000 | Ezra et al. |
| 6,064,424 A | 5/2000 | Berkel et al. |
| 6,075,557 A | 6/2000 | Holliman et al. |
| 6,094,216 A | 7/2000 | Taniguchi et al. |
| 6,108,059 A | 8/2000 | Yang |
| 6,118,584 A | 9/2000 | Berkel et al. |
| 6,128,054 A | 10/2000 | Schwarzenberger |
| 6,144,118 A | 11/2000 | Cahill et al. |
| 6,172,723 B1 | 1/2001 | Inoue et al. |
| 6,199,995 B1 | 3/2001 | Umemoto |
| 6,219,113 B1 | 4/2001 | Takahara |
| 6,224,214 B1 | 5/2001 | Martin et al. |
| 6,232,592 B1 | 5/2001 | Sugiyama |
| 6,256,447 B1 | 7/2001 | Laine |
| 6,262,786 B1 | 7/2001 | Perlo et al. |
| 6,295,109 B1 | 9/2001 | Kubo et al. |
| 6,302,541 B1 | 10/2001 | Grossmann |
| 6,305,813 B1 * | 10/2001 | Lekson ................ B60Q 1/302 362/23.15 |
| 6,335,999 B1 | 1/2002 | Winston et al. |
| 6,373,637 B1 | 4/2002 | Gulick et al. |
| 6,377,295 B1 | 4/2002 | Woodgate et al. |
| 6,422,713 B1 | 7/2002 | Fohl et al. |
| 6,456,340 B1 | 9/2002 | Margulis |
| 6,464,365 B1 | 10/2002 | Gunn et al. |
| 6,476,850 B1 | 11/2002 | Erbey |
| 6,481,849 B2 | 11/2002 | Martin et al. |
| 6,654,156 B1 | 11/2003 | Crossland et al. |
| 6,663,254 B2 | 12/2003 | Ohsumi |
| 6,724,452 B1 | 4/2004 | Takeda et al. |
| 6,731,355 B2 | 5/2004 | Miyashita |
| 6,736,512 B2 | 5/2004 | Balogh |
| 6,798,406 B1 | 9/2004 | Jones et al. |
| 6,801,243 B1 | 10/2004 | Berkel |
| 6,816,158 B1 | 11/2004 | Lemelson et al. |
| 6,825,985 B2 | 11/2004 | Brown et al. |
| 6,847,354 B2 | 1/2005 | Vranish |
| 6,847,488 B2 | 1/2005 | Travis |
| 6,859,240 B1 | 2/2005 | Brown et al. |
| 6,867,828 B2 | 3/2005 | Taira et al. |
| 6,870,671 B2 | 3/2005 | Travis |
| 6,883,919 B2 | 4/2005 | Travis |
| 7,001,058 B2 * | 2/2006 | Inditsky ............... G02B 6/0021 362/311.02 |
| 7,052,168 B2 | 5/2006 | Epstein et al. |
| 7,058,252 B2 | 6/2006 | Woodgate |
| 7,073,933 B2 | 7/2006 | Gotoh et al. |
| 7,091,931 B2 | 8/2006 | Yoon |
| 7,101,048 B2 | 9/2006 | Travis |
| 7,136,031 B2 | 11/2006 | Lee et al. |
| 7,215,391 B2 | 5/2007 | Kuan et al. |
| 7,215,415 B2 | 5/2007 | Maehara |
| 7,215,475 B2 | 5/2007 | Woodgate et al. |
| 7,227,567 B1 | 6/2007 | Beck et al. |
| 7,239,293 B2 | 7/2007 | Perlin et al. |
| 7,365,908 B2 | 4/2008 | Dolgoff |
| 7,375,886 B2 | 5/2008 | Lipton et al. |
| 7,410,286 B2 | 8/2008 | Travis |
| 7,430,358 B2 | 9/2008 | Qi et al. |
| 7,492,346 B2 | 2/2009 | Manabe et al. |
| 7,528,893 B2 | 5/2009 | Schultz |
| 7,545,429 B2 | 6/2009 | Travis |
| 7,587,117 B2 | 9/2009 | Winston et al. |
| 7,614,777 B2 | 11/2009 | Koganezawa et al. |
| 7,660,047 B1 | 2/2010 | Travis |
| 7,750,981 B2 | 7/2010 | Shestak |
| 7,750,982 B2 | 7/2010 | Nelson |
| 7,771,102 B2 | 8/2010 | Iwasaki |
| 7,798,698 B2 * | 9/2010 | Segawa ................ G02B 6/002 349/65 |
| 7,798,699 B2 * | 9/2010 | Laitinen ............... G02B 6/006 349/65 |
| 7,800,710 B2 * | 9/2010 | Sugihara .............. B60K 35/00 349/65 |
| 7,944,428 B2 | 5/2011 | Travis |

(56) References Cited

U.S. PATENT DOCUMENTS

| | | |
|---|---|---|
| 7,970,246 B2 | 6/2011 | Travis et al. |
| 7,976,208 B2 | 7/2011 | Travis |
| 8,016,475 B2 | 9/2011 | Travis |
| 8,179,361 B2 | 5/2012 | Sugimoto et al. |
| 8,186,889 B2 * | 5/2012 | Masuda .................. H04M 1/22 349/56 |
| 8,216,405 B2 | 7/2012 | Emerton |
| 8,223,296 B2 | 7/2012 | Lee et al. |
| 8,251,562 B2 | 8/2012 | Kuramitsu et al. |
| 8,325,295 B2 | 12/2012 | Sugita |
| 8,354,806 B2 | 1/2013 | Travis |
| 8,393,777 B2 * | 3/2013 | Minano ................ G02B 6/0028 362/561 |
| 8,477,261 B2 | 7/2013 | Travis |
| 8,502,253 B2 | 8/2013 | Min |
| 8,534,901 B2 | 9/2013 | Panagotacos et al. |
| 8,556,491 B2 | 10/2013 | Lee |
| 8,651,725 B2 | 2/2014 | Le et al. |
| 8,684,588 B2 * | 4/2014 | Ajichi ................ G02B 6/0036 362/23.09 |
| 8,714,804 B2 | 5/2014 | Kim et al. |
| 8,752,995 B2 | 6/2014 | Park |
| 8,760,762 B1 | 6/2014 | Kelly et al. |
| 8,926,112 B2 * | 1/2015 | Uchiike ................ G02B 6/0068 349/58 |
| 8,942,434 B1 | 1/2015 | Karakotsios et al. |
| 9,063,261 B2 * | 6/2015 | Katsuta ................ G02B 6/005 |
| 9,188,731 B2 * | 11/2015 | Woodgate ............. G02B 6/0078 |
| 9,197,884 B2 | 11/2015 | Lee et al. |
| 9,350,980 B2 | 5/2016 | Robinson et al. |
| 9,519,153 B2 | 12/2016 | Robinson et al. |
| 2001/0001566 A1 | 5/2001 | Moseley et al. |
| 2001/0050686 A1 | 12/2001 | Allen |
| 2002/0018299 A1 | 2/2002 | Daniell |
| 2002/0113246 A1 | 8/2002 | Nagai et al. |
| 2002/0113866 A1 | 8/2002 | Taniguchi et al. |
| 2003/0046839 A1 | 3/2003 | Oda et al. |
| 2003/0117790 A1 | 6/2003 | Lee et al. |
| 2003/0133191 A1 | 7/2003 | Morita et al. |
| 2003/0137738 A1 | 7/2003 | Ozawa et al. |
| 2003/0137821 A1 | 7/2003 | Gotoh et al. |
| 2004/0008877 A1 | 1/2004 | Leppard et al. |
| 2004/0015729 A1 | 1/2004 | Elms et al. |
| 2004/0021809 A1 | 2/2004 | Sumiyoshi et al. |
| 2004/0042233 A1 | 3/2004 | Suzuki et al. |
| 2004/0046709 A1 | 3/2004 | Yoshino |
| 2004/0105264 A1 | 6/2004 | Spero |
| 2004/0108971 A1 | 6/2004 | Waldern et al. |
| 2004/0109303 A1 | 6/2004 | Olczak |
| 2004/0135741 A1 | 7/2004 | Tomisawa et al. |
| 2004/0170011 A1 | 9/2004 | Kim et al. |
| 2004/0263968 A1 | 12/2004 | Kobayashi et al. |
| 2004/0263969 A1 | 12/2004 | Lipton et al. |
| 2005/0007753 A1 | 1/2005 | Hees et al. |
| 2005/0094295 A1 | 5/2005 | Yamashita et al. |
| 2005/0110980 A1 | 5/2005 | Maehara et al. |
| 2005/0135116 A1 | 6/2005 | Epstein et al. |
| 2005/0174768 A1 | 8/2005 | Conner |
| 2005/0180167 A1 | 8/2005 | Hoelen et al. |
| 2005/0190180 A1 | 9/2005 | Jin et al. |
| 2005/0190345 A1 | 9/2005 | Dubin et al. |
| 2005/0237488 A1 | 10/2005 | Yamasaki et al. |
| 2005/0254127 A1 | 11/2005 | Evans et al. |
| 2005/0264717 A1 | 12/2005 | Chien et al. |
| 2005/0274956 A1 | 12/2005 | Bhat |
| 2005/0276071 A1 | 12/2005 | Sasagawa et al. |
| 2005/0280637 A1 | 12/2005 | Ikeda et al. |
| 2006/0002678 A1 | 1/2006 | Weber et al. |
| 2006/0012845 A1 | 1/2006 | Edwards |
| 2006/0056166 A1 | 3/2006 | Yeo et al. |
| 2006/0114664 A1 | 6/2006 | Sakata et al. |
| 2006/0132423 A1 | 6/2006 | Travis |
| 2006/0139447 A1 | 6/2006 | Unkirch |
| 2006/0158729 A1 | 7/2006 | Vissenberg et al. |
| 2006/0176912 A1 | 8/2006 | Anikitchev |
| 2006/0203200 A1 | 9/2006 | Koide |
| 2006/0215129 A1 | 9/2006 | Alasaarela et al. |
| 2006/0221642 A1 | 10/2006 | Daiku |
| 2006/0227427 A1 | 10/2006 | Dolgoff |
| 2006/0244918 A1 | 11/2006 | Cossairt et al. |
| 2006/0250580 A1 | 11/2006 | Silverstein et al. |
| 2006/0262376 A1 | 11/2006 | Mather et al. |
| 2006/0269213 A1 | 11/2006 | Hwang et al. |
| 2006/0284974 A1 | 12/2006 | Lipton et al. |
| 2006/0291053 A1 | 12/2006 | Robinson et al. |
| 2006/0291243 A1 | 12/2006 | Niioka et al. |
| 2007/0008406 A1 | 1/2007 | Shestak et al. |
| 2007/0013624 A1 | 1/2007 | Bourhill |
| 2007/0025680 A1 | 2/2007 | Winston et al. |
| 2007/0035706 A1 | 2/2007 | Margulis |
| 2007/0035829 A1 | 2/2007 | Woodgate et al. |
| 2007/0035964 A1 | 2/2007 | Olczak |
| 2007/0081110 A1 | 4/2007 | Lee |
| 2007/0085105 A1 | 4/2007 | Beeson et al. |
| 2007/0109400 A1 | 5/2007 | Woodgate et al. |
| 2007/0109401 A1 | 5/2007 | Lipton et al. |
| 2007/0115551 A1 | 5/2007 | Robinson et al. |
| 2007/0115552 A1 | 5/2007 | Robinson et al. |
| 2007/0153160 A1 | 7/2007 | Lee et al. |
| 2007/0183466 A1 | 8/2007 | Son et al. |
| 2007/0188667 A1 | 8/2007 | Schwerdtner |
| 2007/0189701 A1 | 8/2007 | Chakmakjian et al. |
| 2007/0223252 A1 | 9/2007 | Lee et al. |
| 2007/0279554 A1 | 12/2007 | Kowarz et al. |
| 2007/0279727 A1 | 12/2007 | Gandhi et al. |
| 2008/0079662 A1 | 4/2008 | Saishu et al. |
| 2008/0084519 A1 | 4/2008 | Brigham et al. |
| 2008/0086289 A1 | 4/2008 | Brott |
| 2008/0128728 A1 | 6/2008 | Nemchuk et al. |
| 2008/0225205 A1 | 9/2008 | Travis |
| 2008/0259012 A1 | 10/2008 | Fergason |
| 2008/0259643 A1 | 10/2008 | Ijzerman et al. |
| 2008/0291359 A1 | 11/2008 | Miyashita |
| 2008/0297431 A1 | 12/2008 | Yuuki et al. |
| 2008/0297459 A1 | 12/2008 | Sugimoto et al. |
| 2008/0304282 A1 | 12/2008 | Mi et al. |
| 2008/0316768 A1 | 12/2008 | Travis |
| 2009/0014700 A1 | 1/2009 | Metcalf et al. |
| 2009/0016057 A1 | 1/2009 | Rinko |
| 2009/0040426 A1 | 2/2009 | Mather et al. |
| 2009/0067156 A1 | 3/2009 | Bonnett et al. |
| 2009/0109705 A1 | 4/2009 | Pakhchyan et al. |
| 2009/0128735 A1 | 5/2009 | Larson et al. |
| 2009/0135623 A1 | 5/2009 | Kunimochi |
| 2009/0140656 A1 | 6/2009 | Kohashikawa et al. |
| 2009/0160757 A1 | 6/2009 | Robinson et al. |
| 2009/0167651 A1 | 7/2009 | Benitez et al. |
| 2009/0168459 A1 | 7/2009 | Holman et al. |
| 2009/0174700 A1 | 7/2009 | Daiku |
| 2009/0174840 A1 | 7/2009 | Lee et al. |
| 2009/0190072 A1 | 7/2009 | Nagata et al. |
| 2009/0190079 A1 | 7/2009 | Saitoh |
| 2009/0207629 A1 | 8/2009 | Fujiyama et al. |
| 2009/0225380 A1 | 9/2009 | Schwerdtner et al. |
| 2009/0278936 A1 | 11/2009 | Pastoor et al. |
| 2009/0290203 A1 | 11/2009 | Schwerdtner |
| 2009/0315915 A1 | 12/2009 | Dunn et al. |
| 2010/0034987 A1 | 2/2010 | Fujii et al. |
| 2010/0040280 A1 | 2/2010 | McKnight |
| 2010/0053771 A1 | 2/2010 | Travis |
| 2010/0053938 A1 | 3/2010 | Kim et al. |
| 2010/0091093 A1 | 4/2010 | Robinson |
| 2010/0091254 A1 | 4/2010 | Travis |
| 2010/0165598 A1 | 7/2010 | Chen et al. |
| 2010/0177387 A1 | 7/2010 | Travis |
| 2010/0182542 A1 | 7/2010 | Nakamoto et al. |
| 2010/0188438 A1 | 7/2010 | Kang |
| 2010/0188602 A1 | 7/2010 | Feng |
| 2010/0214135 A1 | 8/2010 | Bathiche |
| 2010/0220260 A1 | 9/2010 | Sugita et al. |
| 2010/0251498 A1 | 9/2010 | Large |
| 2010/0271838 A1 * | 10/2010 | Yamaguchi ............ G02B 6/002 362/602 |
| 2010/0277575 A1 | 11/2010 | Ismael et al. |

(56) References Cited

U.S. PATENT DOCUMENTS

| | | |
|---|---|---|
| 2010/0278480 A1 | 11/2010 | Vasylyev |
| 2010/0289870 A1 | 11/2010 | Leister |
| 2010/0295920 A1 | 11/2010 | McGowan |
| 2010/0295930 A1 | 11/2010 | Ezhov |
| 2010/0300608 A1 | 12/2010 | Emerton et al. |
| 2010/0302135 A1 | 12/2010 | Larson et al. |
| 2010/0309296 A1 | 12/2010 | Harrold et al. |
| 2010/0321953 A1 | 12/2010 | Coleman et al. |
| 2010/0328438 A1 | 12/2010 | Ohyama et al. |
| 2011/0013417 A1 | 1/2011 | Saccomanno et al. |
| 2011/0019112 A1 | 1/2011 | Dolgoff |
| 2011/0032483 A1 | 2/2011 | Hiruska et al. |
| 2011/0032724 A1 | 2/2011 | Kinoshita |
| 2011/0043142 A1 | 2/2011 | Travis et al. |
| 2011/0043501 A1 | 2/2011 | Daniel |
| 2011/0044056 A1 | 2/2011 | Travis |
| 2011/0044579 A1 | 2/2011 | Travis et al. |
| 2011/0051237 A1 | 3/2011 | Hasegawa et al. |
| 2011/0187293 A1 | 8/2011 | Travis |
| 2011/0187635 A1 | 8/2011 | Lee et al. |
| 2011/0188120 A1 | 8/2011 | Tabirian et al. |
| 2011/0199459 A1 | 8/2011 | Barenbrug et al. |
| 2011/0211142 A1 | 9/2011 | Kashiwagi et al. |
| 2011/0216266 A1 | 9/2011 | Travis |
| 2011/0221998 A1 | 9/2011 | Adachi et al. |
| 2011/0228183 A1 | 9/2011 | Hamagishi |
| 2011/0228562 A1 | 9/2011 | Travis et al. |
| 2011/0235359 A1 | 9/2011 | Liu et al. |
| 2011/0242150 A1 | 10/2011 | Song et al. |
| 2011/0242277 A1 | 10/2011 | Do et al. |
| 2011/0242298 A1 | 10/2011 | Bathiche |
| 2011/0255303 A1 | 10/2011 | Nichol et al. |
| 2011/0267563 A1* | 11/2011 | Shimizu ............... G02B 6/0088 349/65 |
| 2011/0285927 A1 | 11/2011 | Schultz et al. |
| 2011/0292321 A1 | 12/2011 | Travis et al. |
| 2011/0310232 A1 | 12/2011 | Wilson et al. |
| 2012/0002136 A1 | 1/2012 | Nagata et al. |
| 2012/0002295 A1 | 1/2012 | Dobschal et al. |
| 2012/0008067 A1 | 1/2012 | Mun et al. |
| 2012/0013720 A1 | 1/2012 | Kadowaki et al. |
| 2012/0056971 A1 | 3/2012 | Kumar et al. |
| 2012/0062991 A1 | 3/2012 | Mich et al. |
| 2012/0063166 A1 | 3/2012 | Panagotacos et al. |
| 2012/0075285 A1 | 3/2012 | Oyagi et al. |
| 2012/0081920 A1 | 4/2012 | Ie et al. |
| 2012/0086776 A1 | 4/2012 | Lo |
| 2012/0092435 A1 | 4/2012 | Wohlert |
| 2012/0106193 A1 | 5/2012 | Kim et al. |
| 2012/0127573 A1 | 5/2012 | Robinson et al. |
| 2012/0154450 A1 | 6/2012 | Aho et al. |
| 2012/0162966 A1 | 6/2012 | Kim et al. |
| 2012/0169838 A1 | 7/2012 | Sekine |
| 2012/0206050 A1 | 8/2012 | Spero |
| 2012/0236484 A1 | 9/2012 | Miyake |
| 2012/0243204 A1 | 9/2012 | Robinson |
| 2012/0243261 A1 | 9/2012 | Yamamoto et al. |
| 2012/0293721 A1 | 11/2012 | Ueyama |
| 2012/0299913 A1 | 11/2012 | Robinson et al. |
| 2012/0314145 A1 | 12/2012 | Robinson |
| 2012/0327172 A1 | 12/2012 | El-Saban et al. |
| 2013/0101253 A1 | 4/2013 | Popovich et al. |
| 2013/0107340 A1 | 5/2013 | Wong et al. |
| 2013/0127861 A1 | 5/2013 | Gollier |
| 2013/0135588 A1 | 5/2013 | Popovich et al. |
| 2013/0156265 A1 | 6/2013 | Hennessy |
| 2013/0169701 A1 | 7/2013 | Whitehead et al. |
| 2013/0230136 A1 | 9/2013 | Sakaguchi et al. |
| 2013/0235561 A1 | 9/2013 | Etienne et al. |
| 2013/0294684 A1 | 11/2013 | Lipton et al. |
| 2013/0307831 A1 | 11/2013 | Robinson et al. |
| 2013/0307946 A1 | 11/2013 | Robinson et al. |
| 2013/0308339 A1 | 11/2013 | Woodgate et al. |
| 2013/0321599 A1 | 12/2013 | Harrold et al. |
| 2013/0328866 A1 | 12/2013 | Woodgate et al. |
| 2013/0335821 A1 | 12/2013 | Robinson et al. |
| 2014/0009508 A1 | 1/2014 | Woodgate et al. |
| 2014/0016354 A1 | 1/2014 | Lee et al. |
| 2014/0022619 A1 | 1/2014 | Woodgate et al. |
| 2014/0036361 A1 | 2/2014 | Woodgate et al. |
| 2014/0041205 A1 | 2/2014 | Robinson et al. |
| 2014/0043323 A1 | 2/2014 | Sumi |
| 2014/0098558 A1 | 4/2014 | Vasylyev |
| 2014/0126238 A1 | 5/2014 | Kao et al. |
| 2014/0240344 A1 | 8/2014 | Tomono et al. |
| 2014/0240828 A1 | 8/2014 | Robinson et al. |
| 2014/0289835 A1 | 9/2014 | Varshaysky et al. |
| 2014/0340728 A1 | 11/2014 | Taheri |
| 2014/0368602 A1 | 12/2014 | Woodgate et al. |
| 2015/0116212 A1 | 4/2015 | Freed et al. |
| 2015/0268479 A1 | 9/2015 | Woodgate et al. |
| 2015/0334365 A1 | 11/2015 | Tsubaki et al. |
| 2015/0339512 A1 | 11/2015 | Son et al. |

FOREIGN PATENT DOCUMENTS

| | | |
|---|---|---|
| CN | 1454329 A | 11/2003 |
| CN | 1466005 A | 1/2004 |
| CN | 1487332 A | 4/2004 |
| CN | 1588196 A | 3/2005 |
| CN | 1678943 A | 10/2005 |
| CN | 1696788 A | 11/2005 |
| CN | 1769971 A | 5/2006 |
| CN | 1823292 A | 8/2006 |
| CN | 1826553 A | 8/2006 |
| CN | 1866112 A | 11/2006 |
| CN | 1900785 A | 1/2007 |
| CN | 1908753 A | 2/2007 |
| CN | 2872404 | 2/2007 |
| CN | 1307481 | 3/2007 |
| CN | 101029975 A | 9/2007 |
| CN | 101049028 A | 10/2007 |
| CN | 200983052 | 11/2007 |
| CN | 101114080 A | 1/2008 |
| CN | 101142823 A | 3/2008 |
| CN | 101266338 A | 9/2008 |
| CN | 100449353 | 1/2009 |
| CN | 101364004 A | 2/2009 |
| CN | 101598863 B | 12/2009 |
| CN | 100591141 | 2/2010 |
| CN | 101660689 A | 3/2010 |
| CN | 102147079 A | 8/2011 |
| CN | 202486493 U | 10/2012 |
| CN | 1910399 B | 5/2013 |
| EP | 0653891 A1 | 5/1995 |
| EP | 0721131 A2 | 7/1996 |
| EP | 0830984 A2 | 3/1998 |
| EP | 0833183 A1 | 4/1998 |
| EP | 0860729 A2 | 8/1998 |
| EP | 0939273 A1 | 1/1999 |
| EP | 0939273 A1 | 9/1999 |
| EP | 0656555 B1 | 3/2003 |
| EP | 0860729 A1 | 7/2006 |
| EP | 3968742 A1 | 8/2007 |
| EP | 2003394 A1 | 12/2008 |
| EP | 1394593 B1 | 6/2010 |
| EP | 2219067 A1 | 8/2010 |
| EP | 2451180 A2 | 5/2012 |
| EP | 1634119 B1 | 8/2012 |
| GB | 2405542 | 2/2005 |
| JP | H07270792 | 10/1995 |
| JP | H08211334 | 8/1996 |
| JP | 08-237691 A | 9/1996 |
| JP | 08254617 B2 | 10/1996 |
| JP | 08340556 B2 | 12/1996 |
| JP | H08070475 | 12/1996 |
| JP | H1042315 A | 2/1998 |
| JP | H10142556 A | 5/1998 |
| JP | H11242908 A | 9/1999 |
| JP | 2000048618 A | 2/2000 |
| JP | 2000069504 A | 3/2000 |
| JP | 2000-200049 A | 7/2000 |
| JP | 2001-093321 A | 4/2001 |
| JP | 2001281456 | 10/2001 |

(56) References Cited

FOREIGN PATENT DOCUMENTS

| | | | |
|---|---|---|---|
| JP | 2002-049004 | A | 2/2002 |
| JP | 2003-215705 | A | 7/2003 |
| JP | 200321539 | A | 7/2003 |
| JP | 2004112814 | A | 4/2004 |
| JP | 2004265813 | A | 9/2004 |
| JP | 2004-319364 | A | 11/2004 |
| JP | 2005116266 | | 4/2005 |
| JP | 2005-135844 | A | 5/2005 |
| JP | 2005-183030 | A | 7/2005 |
| JP | 2005181914 | A | 7/2005 |
| JP | 2005203182 | A | 7/2005 |
| JP | 2005-259361 | A | 9/2005 |
| JP | 2006-004877 | A | 1/2006 |
| JP | 2006010935 | A | 1/2006 |
| JP | 2006-031941 | A | 2/2006 |
| JP | 2006310269 | A | 11/2006 |
| JP | 2007094035 | A | 4/2007 |
| JP | 3968742 | | 8/2007 |
| JP | 2007273288 | A | 10/2007 |
| JP | 2007286652 | | 11/2007 |
| JP | 2008-204874 | A | 9/2008 |
| JP | 2010160527 | A | 7/2010 |
| JP | 2011192468 | A | 9/2011 |
| JP | 20110216281 | | 10/2011 |
| JP | WO 2012020636 A1 * | 2/2012 | ............. G02B 6/005 |
| JP | 2012060607 | A | 3/2012 |
| JP | 2013015619 | | 1/2013 |
| JP | 2013502693 | | 1/2013 |
| JP | 2013540083 | | 10/2013 |
| KR | 10-2003-0064258 | A | 7/2003 |
| KR | 10-0932304 | B1 | 12/2009 |
| KR | 102011-0006773 | A | 1/2011 |
| KR | 102011-0017918 | A | 2/2011 |
| KR | 10-2011-0067534 | A | 6/2011 |
| KR | 10-2012-0048301 | A | 5/2012 |
| KR | 10-2012-0049890 | A | 5/2012 |
| KR | 20130002646 | A | 1/2013 |
| KR | 20140139730 | | 12/2014 |
| TW | 200528780 | | 9/2005 |
| WO | 1994006249 | B1 | 4/1994 |
| WO | 1995020811 | A1 | 8/1995 |
| WO | 1995027915 | A1 | 10/1995 |
| WO | 1998021620 | A1 | 5/1998 |
| WO | 1999011074 | A1 | 3/1999 |
| WO | 2001027528 | A1 | 4/2001 |
| WO | 2001-061241 | A1 | 8/2001 |
| WO | 2001079923 | A1 | 10/2001 |
| WO | 2008038539 | A1 | 4/2008 |
| WO | 2008045681 | A1 | 4/2008 |
| WO | 2009098809 | A1 | 8/2009 |
| WO | 2010021926 | A2 | 2/2010 |
| WO | 2011020962 | A1 | 2/2011 |
| WO | 2011022342 | A2 | 2/2011 |
| WO | 2011068907 | A1 | 6/2011 |
| WO | 2011149739 | A2 | 12/2011 |
| WO | 2012158574 | A1 | 11/2012 |
| WO | 2014130860 | A1 | 8/2014 |

OTHER PUBLICATIONS

AU-2011329639 Australia Patent Examination Report No. 1 dated Mar. 6, 2014.
AU-2013262869 Australian Office Action of Australian Patent Office dated Feb. 22, 2016.
AU-2015258258 Australian Office Action of Australian Patent Office dated Jun. 9, 2016.
Bahadur, "Liquid crystals applications and uses," World Scientific, vol. 1, pp. 178 (1990).
CA-2817044 Canadian office action dated Jul. 14, 2016.
CN-201180065590.0 Office first action dated Dec. 31, 2014.
CN-201180065590.0 Office second action dated Oct. 21, 2015.
CN-201180065590.0 Office Third action dated Jun. 6, 2016.
CN-201280034488.9 2d Office Action from the State Intellectual Property Office of P.R. China dated Mar. 22, 2016.
CN-201280034488.9 1st Office Action from the State Intellectual Property Office of P.R. China dated Jun. 11, 2015.
CN-201380026047.9 Chinese 1st Office Action of the State Intellectual Property Office of P.R. dated Dec. 18, 2015.
CN-201380026047.9 Chinese 2d Office Action of the State Intellectual Property Office of P.R. dated Jul. 12, 2016.
CN-201380026050.0 Chinese 1st Office Action of the State Intellectual Property Office of P.R. dated Jun. 3, 2016.
CN-201380026059.1 Chinese 1st Office Action of the State Intellectual Property Office of P.R. dated Apr. 25, 2016.
CN-201380026076.5 Office first action dated May 11, 2016.
CN-201380049451.8 Chinese Office Action of the State Intellectual Property Office of P.R. dated Apr. 5, 2016.
CN-201380063055.0 Chinese 1st Office Action of the State Intellectual Property Office of P.R. dated Jun. 23, 2016.
CN-201480023023.2 Office action dated Aug. 12, 2016.
EP-07864751.8 European Search Report dated Jun. 1, 2012.
EP-07864751.8 Supplementary European Search Report dated May 29, 2015.
EP-09817048.3 European Search Report dated Apr. 29, 2016.
EP-11842021.5 Office Action dated Dec. 17, 2014.
EP-11842021.5 Office Action dated Oct. 2, 2015.
EP-13758536.0 European Extended Search Report of European Patent Office dated Feb. 4, 2016.
EP-13790013.0 European Extended Search Report of European Patent Office dated Jan. 26, 2016.
EP-13790141.9 European Extended Search Report of European Patent Office dated Feb. 11, 2016.
EP-13790195.5 European Extended Search Report of European Patent Office dated Mar. 2, 2016.
EP-13790267.2 European Extended Search Report of European Patent Office dated Feb. 25, 2016.
EP-13790274.8 European Extended Search Report of European Patent Office dated Feb. 8, 2016.
EP-13790775.4 European Extended Search Report of European Patent Office dated Oct. 9, 2015.
EP-13790809.1 European Extended Search Report of European Patent Office dated Feb. 16, 2016.
EP-13790942.0 European Extended Search Report of European Patent Office dated May 23, 2016.
EP-13791332.3 European Extended Search Report of European Patent Office dated Feb. 1, 2016.
EP-13791437.0 European Extended Search Report of European Patent Office dated Oct. 14, 2015.
EP-13843659.7 European Extended Search Report of European Patent Office dated May 10, 2016.
EP-13844510.1 European Extended Search Report of European Patent Office dated May 13, 2016.
EP-13822472 European Extended Search Report of European Patent Office dated Mar. 2, 2016.
EP-16150248.9 European Extended Search Report of European Patent Office dated Jun. 16, 2016.
KR-20117010839 1st Office action (translated) dated Aug. 28, 2015.
KR-20117010839 2d Office action (translated) dated Apr. 28, 2016.
Languy et al., "Performance comparison of four kinds of flat nonimaging Fresnel lenses made of polycarbonates and polymethyl methacrylate for concentrated photovoltaics", Optics Letters, 36, pp. 2743-2745.
Lipton, "Stereographics: Developers' Handbook", Stereographic Developers Handbook, Jan. 1, 1997, XP002239311, p. 42-49.
Marjanovic, M.,"Interlace, Interleave, and Field Dominance," http://www.mir.com/DMG/interl.html, pp. 1-5 (2001).
PCT/DE98/02576 International search report and written opinion of international searching authority dated Mar. 4, 1999 (WO99/11074).
PCT/US2007/85475 International preliminary report on patentability dated Jun. 4, 2009.
PCT/US2007/85475 International search report and written opinion dated Apr. 10, 2008.
PCT/US2009/060686 international report on patentability dated Apr. 19, 2011.
PCT/US2009/060686 international search report and written opinion of international searching authority dated Dec. 10, 2009.

(56) References Cited

OTHER PUBLICATIONS

PCT/US2011/061511 International Preliminary Report on Patentability dated May 21, 2013.
PCT/US2013/041237 International search report and written opinion of international searching authority dated May 15, 2013.
International search report and written opinion of international searching authority for PCT application PCT/US2013/063133 dated Jan. 20, 2014.
International search report and written opinion of international searching authority for PCT application PCT/US2013/063125 dated Jan. 20, 2014.
International search report and written opinion of international searching authority for PCT application PCT/US2013/077288 dated Apr. 18, 2014.
International search report and written opinion of international searching authority for PCT application PCT/US2014/017779 dated May 28, 2014.
International search report and written opinion of international searching authority for PCT application PCT/US2012/37677 dated Jun. 29, 2012.
International search report and written opinion of international searching authority for PCT application PCT/US2012/052819 dated Jan. 29, 2013.
International search report and written opinion of international searching authority for PCT application No. PCT/US2013/041697 dated Aug. 23, 2013.
International search report and written opinion of international searching authority for PCT application No. PCT/US2013/041235 dated Aug. 23, 2013.
International search report and written opinion of international searching authority for PCT application No. PCT/US2013/041228 dated Aug. 23, 2013.
International search report and written opinion of international searching authority for PCT application No. PCT/US2013/041683 dated Aug. 27, 2013.
International search report and written opinion of international searching authority for PCT application No. PCT/US2013/041548 dated Aug. 27, 2013.
International search report and written opinion of international searching authority for PCT application No. PCT/US2013/041703 dated Aug. 27, 2013.
International search report and written opinion of international searching authority for PCT application No. PCT/US2013/041655 dated Aug. 27, 2013.
International search report and written opinion of international searching authority for PCT application No. PCT/US2013/041619 dated Aug. 27, 2013.
International search report and written opinion of international searching authority for PCT application No. PCT/US2013/041192 dated Aug. 28, 2013.
Kalantar, et al., "Backlight Unit With Double Surface Light Emission", J. Soc. Inf. Display, 12:4, pp. 279-287 (Dec. 2004).
Tabiryan et al., "The Promise of Diffractive Waveplates", Optics and Photonics News, 21:3, pp. 40-45 (Mar. 2010).
Travis et al., "Backlight for view-sequential autostereo 3D".
International search report and written opinion of international searching authority for PCT application No. PCT/US2011/061511 dated Jun. 29, 2012.
International search report and written opinion of international searching authority for PCT application No. PCT/US2012/042279 dated Feb. 26, 2013.
PCT/US2013/049969 International search report and written opinion of international searching authority dated Oct. 23, 2013.
PCT/US2014/042721 International search report and written opinion of international searching authority dated Oct. 10, 2014.
PCT/US2014/057860 International Preliminary Report on Patentability dated Apr. 5, 2016.
PCT/US2014/057860 International search report and written opinion of international searching authority dated Jan. 5, 2015.
PCT/US2014/060312 International search report and written opinion of international searching authority dated Jan. 19, 2015.
PCT/US2014/060368 International search report and written opinion of international searching authority dated Jan. 14, 2015.
PCT/US2014/065020 International search report and written opinion of international searching authority dated May 21, 2015.
PCT/US2015/000327 International search report and written opinion of international searching authority dated Apr. 25, 2016.
PCT/US2015/021583 International search report and written opinion of international searching authority dated Sep. 10, 2015.
PCT/US2015/038024 International search report and written opinion of international searching authority dated Dec. 30, 2015.
PCT/US2016/027297 International search report and written opinion of international searching authority dated Jul. 26, 2017.
PCT/US2016/027350 International search report and written opinion of the international searching authority dated Jul. 25, 2016.
Robinson et al., U.S. Appl. No. 14/751,878 entitled "Directional privacy display", filed Jun. 26, 2015.
Robinson et al., U.S. Appl. No. 15/097,750 entitled "Wide angle imaging directional backlights", filed Apr. 13, 2016.
Robinson et al., U.S. Appl. No. 15/098,084 entitled "Wide angle imaging directional backlights", filed Apr. 13, 2016.
Robinson, U.S. Appl. No. 13/300,293 entitled "Directional flat illuminators", filed Nov. 18, 2011.
RU-2013122560 First office action dated Jan. 1, 2014.
RU-2013122560 Second office action dated Apr. 10, 2015.
Williams S P et al., "New Computational Control Techniques and Increased Understanding for Stereo 3-D Displays", Proceedings of SPIE, SPIE, US, vol. 1256, Jan. 1, 1990, XP000565512, p. 75, 77, 79.
3M™ ePrivacy Filter software professional version; http://www.cdw.com/shop/products/3M-ePrivacy-Filter-software-professional-version/3239412.aspx?cm_mmc=ShoppingFeeds-_-ChannelIntelligence-_-Software-_-3239412_3MT%20ePrivacy%20Filter%20software%20professional%20version_3MF-EPFPRO&cpncode=37-7582919&srccode=cii_10191459#PO; Copyright 2007-2016.
Cootes et al., "Active Aplpearance Models", IEEE Trans. Pattern Analysis and Machine Intelligence, 23(6):681-685, 2001.
Cootes et al., "Active Shape Models—Their Training and Application" Computer Vision and Image Understanding 61(1):38-59 Jan. 1995.
Dalal et al., "Histogram of Oriented Gradients for Human Detection", Computer Vision and Pattern Recognition, pp. 886-893, 2005.
Drucker et al., "Support Vector Regression Machines", Advances in Neural Information Processing Systems 9, pp. 155-161, NIPS 1996.
EP-11842021.5 Office Action dated Sep. 2, 2016.
EP-13790775.4 Office Action dated Aug. 29, 2016.
EP-13791437.0 European first office action dated Aug. 30, 2016.
EP-13865893.5 European Extended Search Report of European Patent Office dated Oct. 6, 2016.
EP-14754859.8 European Extended Search Report of European Patent Office dated Oct. 14, 2016.
Ho, "Random Decision Forests", Proceedings of the 3rd International Conference on Document Analysis and Recognition, Montreal, QC, pp. 278-282, Aug. 14-16, 1995.
Ian Sexton et al: "Stereoscopic and autostereoscopic display-systems",—IEEE Signal Processing Magazine, May 1, 1999 (May 1, 1999 ), pp. 85-99, XP055305471, Retrieved from the Internet: RL:http://ieeexplore.ieee.org/iel5/79/16655/00768575.pdf [retrieved on Sep. 26, 2016].
Kononenko et al., "Learning to Look Up: Realtime Monocular Gaze Correction Using Machine Learning", Computer Vision and Pattern Recognition, pp. 4667-4675, 2015.
Lowe, "Distinctive Image Features from Scale-Invariant Keypoints", International Journal of Computer Vision 60 (2), pp. 91-110, 2004.
Ozuysal et al., "Fast Keypoint recognition in Ten Lines of Code", Computer Vision and Pattern Recognition, pp. 1-8, 2007.
PCT/US2016/034418 International search report and written opinion of the international searching authority dated Sep. 7, 2016.
PCT/US2016/056410 International search report and written opinion of the international searching authority dated Jan. 25, 2017.
PCT/US2016/061428 International search report and written opinion of international searching authority dated Jan. 20, 2017.

(56) References Cited

OTHER PUBLICATIONS

Robinson et al., U.S. Appl. No. 15/165,960 entitled "Wide Angle Imaging Directional Backlights", filed May 26, 2016.
Robinson et al., U.S. Appl. No. 15/290,543 entitled "Wide angle imaging directional backlights", filed Oct. 11, 2016.
RU-201401264 Office action dated Jan. 18, 2017.
Viola and Jones, "Rapid Object Detection using a Boosted Cascade of Simple Features", pp. 1-9 CVPR 2001.
Zach et al., "A Duality Based Approach for Realtime TV-L1 Optical Flow", Pattern Recognition (Proc. DAGM), 2007, pp. 214-223.
AU-2014218711 Examination report No. 1 dated Mar. 20, 2017.
Beato: "Understanding Comfortable stereography", Dec. 31, 2011 (Dec. 31, 2011), XP055335952, Retrieved from the Internet: URL:http://64.17.134.112/Affonso Beato/Understanding Comfortable Stereography.html [retrieved-on Jan. 17, 2017].
Braverman: "The 3D Toolbox : News", Aug. 13, 2010 (Aug. 13, 2010), XP055336081, Retrieved from the Internet: URL:http://www.dashwood3d.com/blog/the-3d-toolbox/ [retrieved on Jan. 17, 2017].
CN-201380026050.0 Chinese 2nd Office Action of the State Intellectual Property Office of P.R. dated Apr. 1, 2017.
CN-201480023023.2 Office second action dated May 11, 2017.
EP-14813739.1 European Extended Search Report of European Patent Office dated Jan. 25, 2017.
EP-14853532.1 European Extended Search Report of European Patent Office dated May 23, 2017.
JP-2015-512794 1st Office Action (translated) dated Feb. 14, 2017.
JP-2015-512809 1st Office Action dated Mar. 28, 2017.
JP-2015-512810 1st Office Action (translated) dated Feb. 7, 2017.
JP 2015-512879 1st Office Action (translated) dated Apr. 11, 2017.
JP-2015-512887 1st Office Action (translated) dated Feb. 7, 2017.
JP-2015-512896 1st Office Action (translated) dated May 9, 2017.
JP-2015-512901 1st Office Action dated Mar. 28, 2017.
JP-2015-512905 1st Office Action (translated) dated Feb. 7, 2017.
KR-20137015775 Office action (translated) dated Oct. 18, 2016.
Lipton: "Stereoscopic Composition Lenny Lipton", Feb. 15, 2009 (Feb. 15, 2009), XP055335930, Retrieved from the Internet: URL:https:///lennylipton.wordpress.com/2009/02/15/stereoscopic-composition/ [retrieved on Jan. 17, 2017].
Lucio et al: "RGBD Camera Effects", Aug. 1, 2012 (Aug. 1, 2012), XP055335831, SIBGRAPI—Conference on Graphics, Patterns and Images Retrieved from the Internet: URL:https://www.researchgate.net/profile/Leandro Cruz/publication/233398182 RGBD Camera Effects/links/0912f50a2922010eb2000000.pdf [retrieved on Jan. 17, 2017].
PCT/US2015/054523 International search report and written opinion of international searching authority dated Mar. 18, 2016.
PCT/US2016/058695 International search report and written opinion of international searching authority dated Feb. 28, 2017.
PCT/US2017/012203 International search report and written opinion of international searching authority dated Apr. 18, 2017.

* cited by examiner

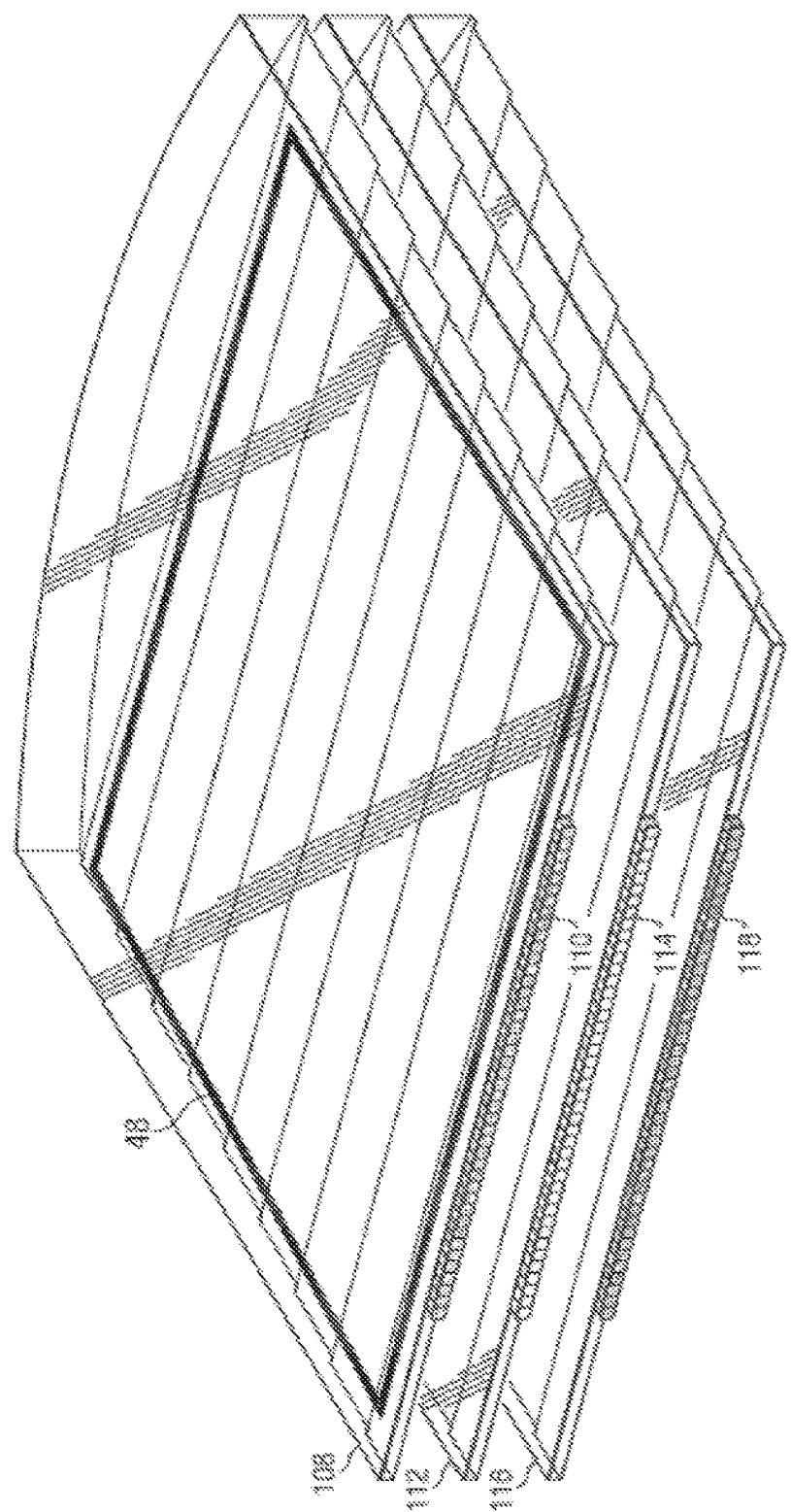

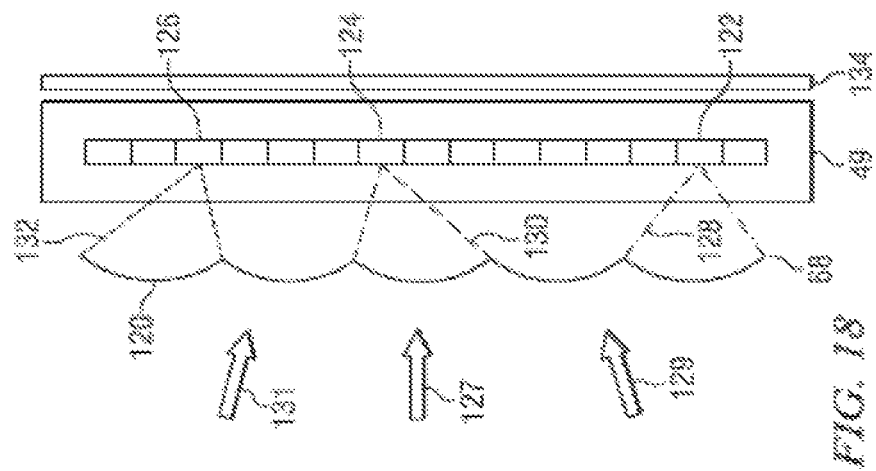
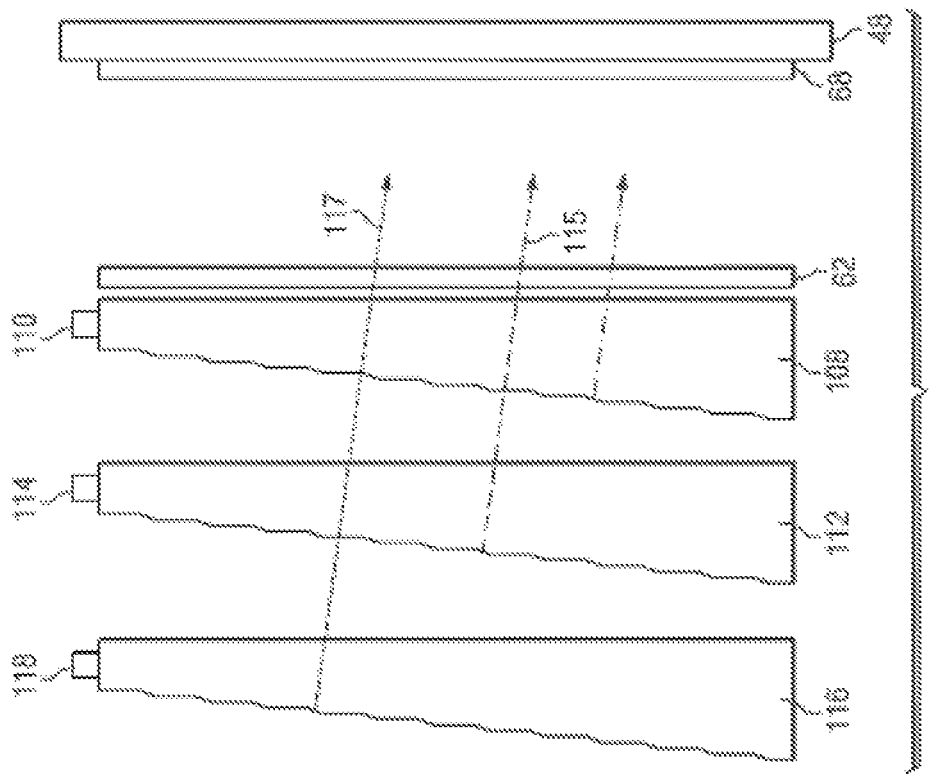

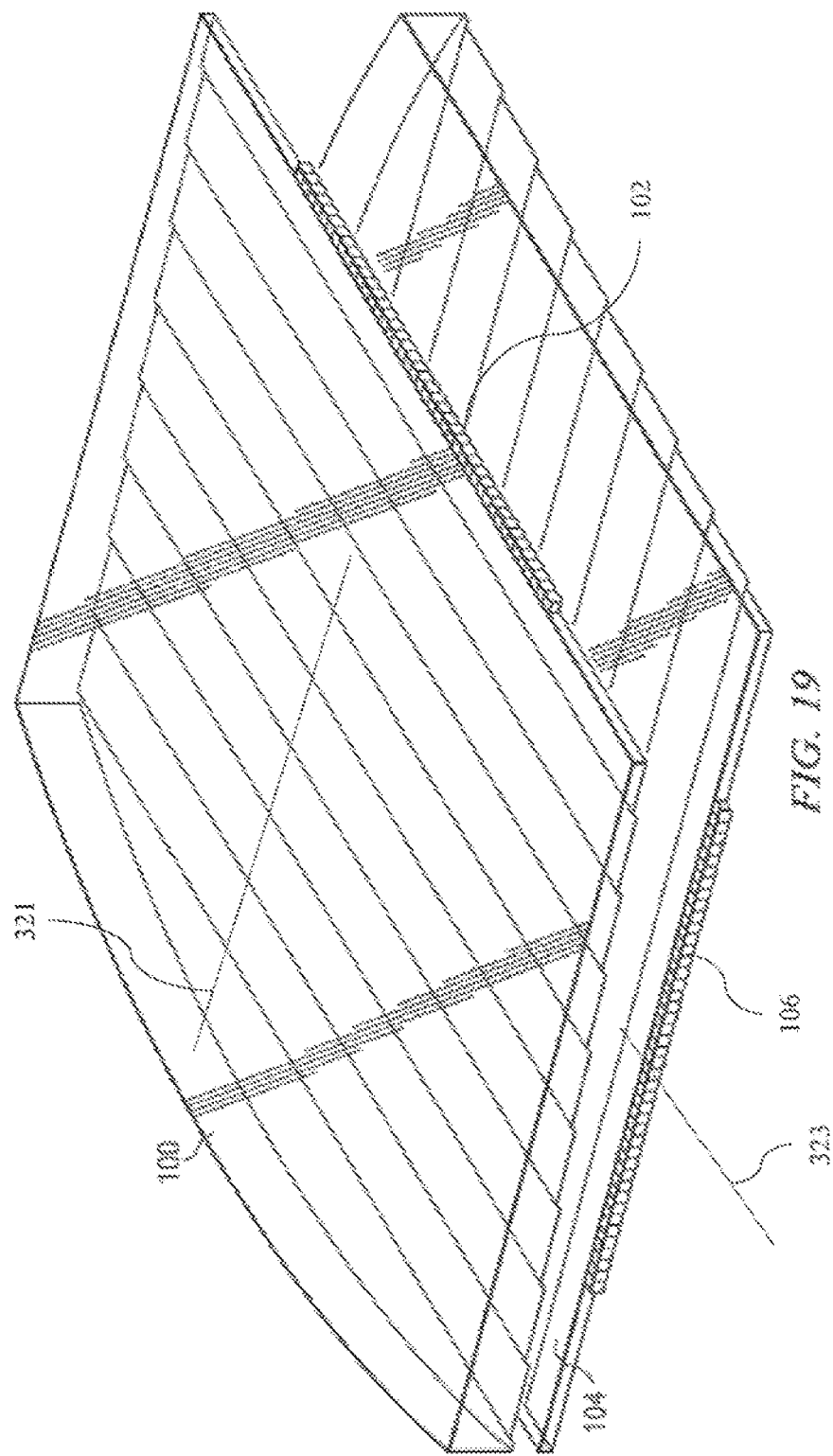

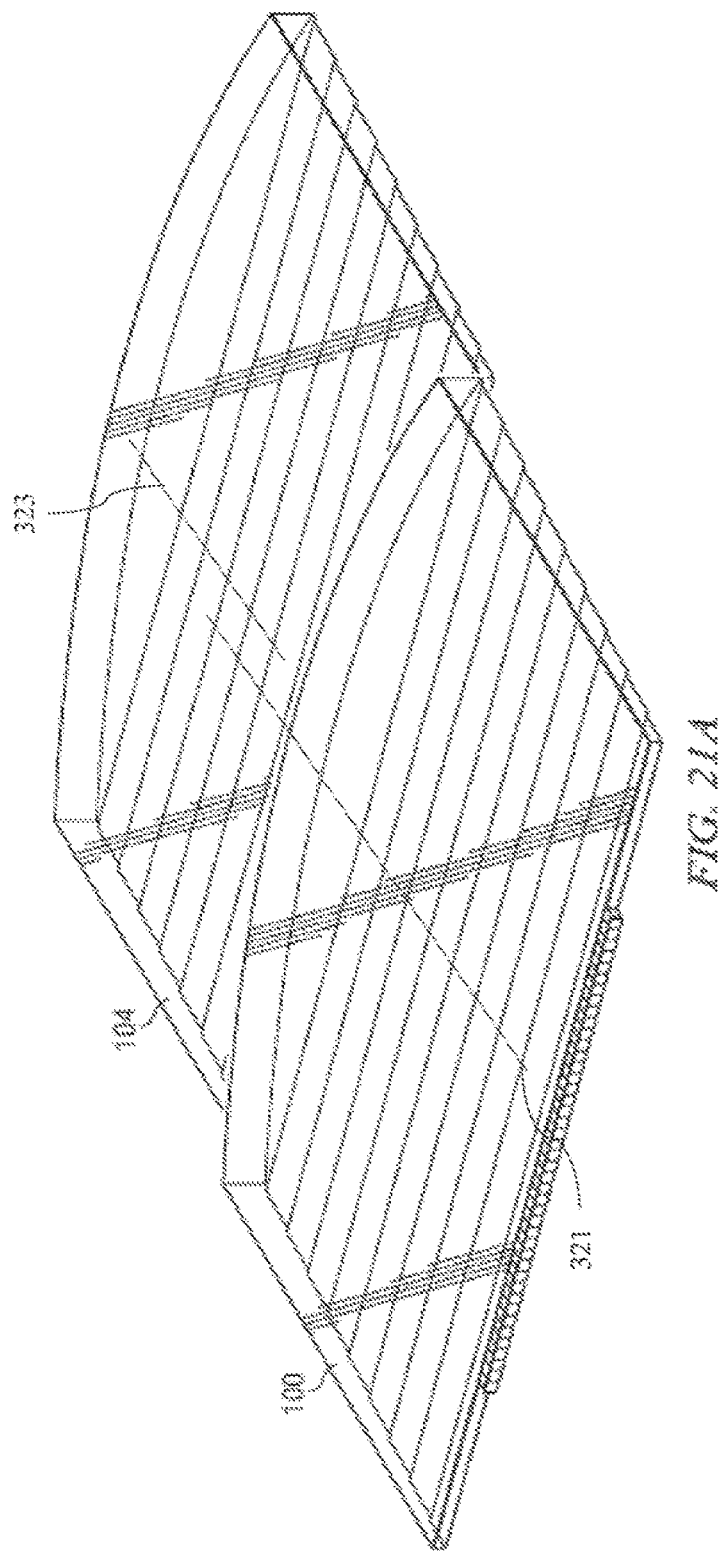

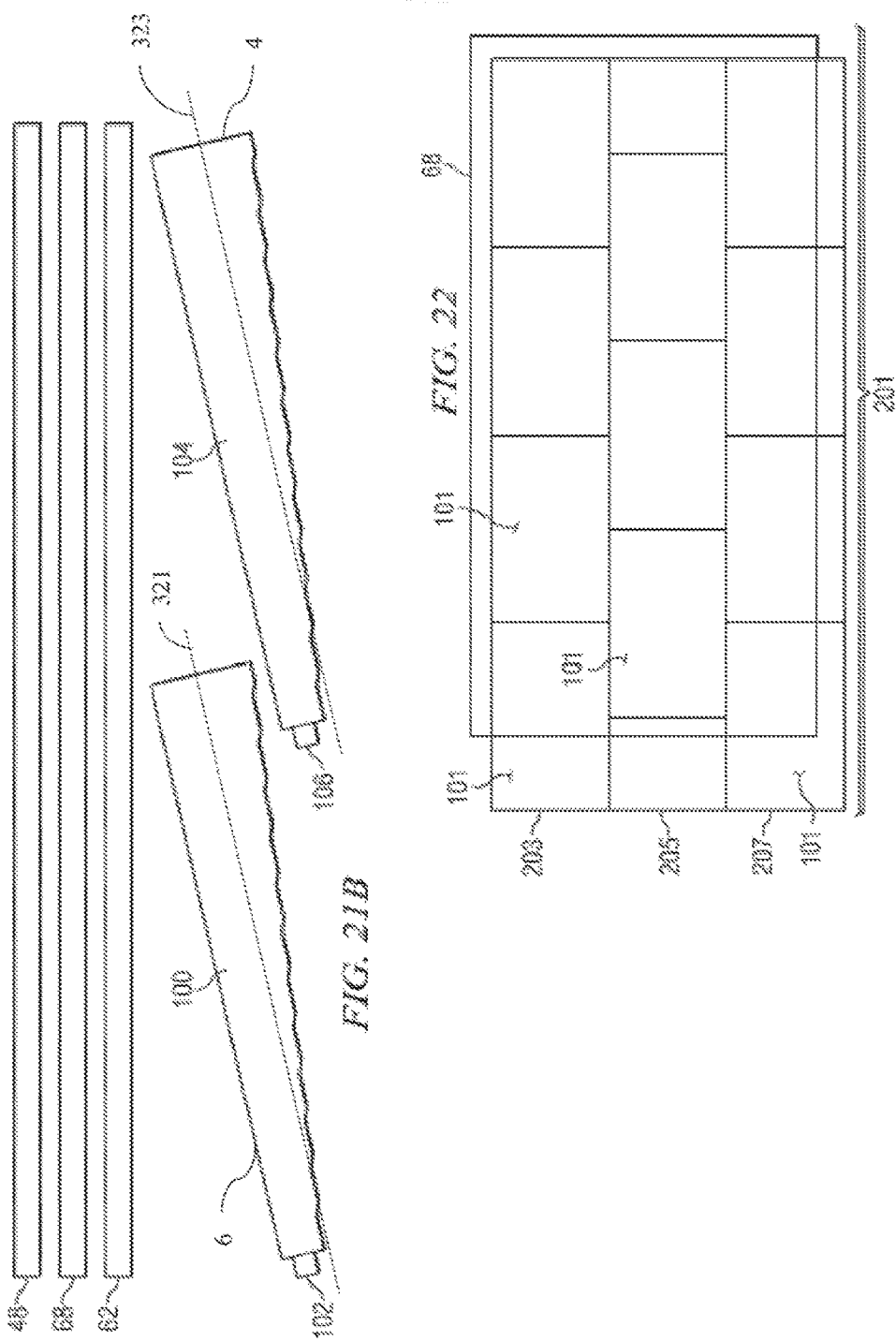

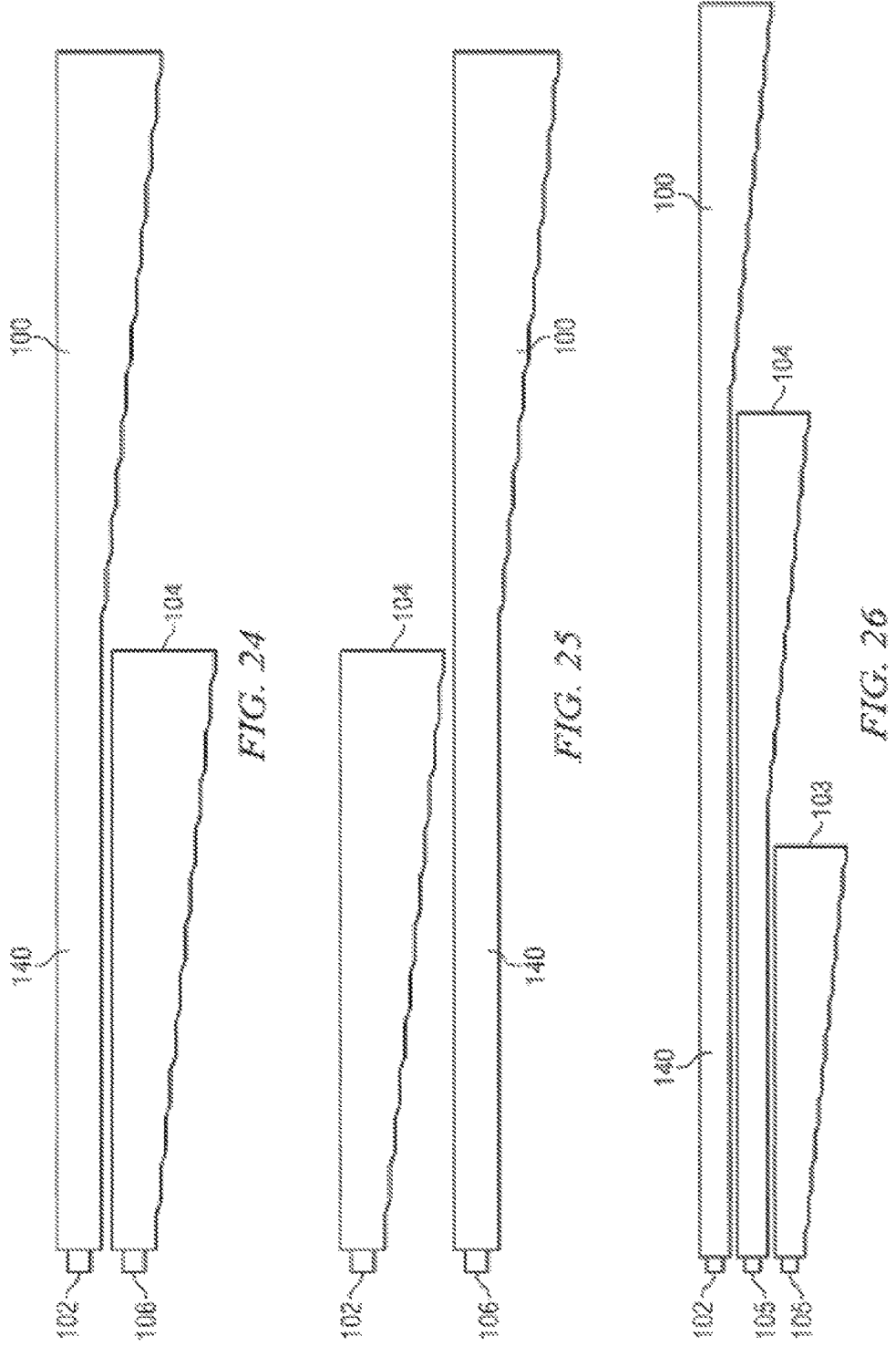

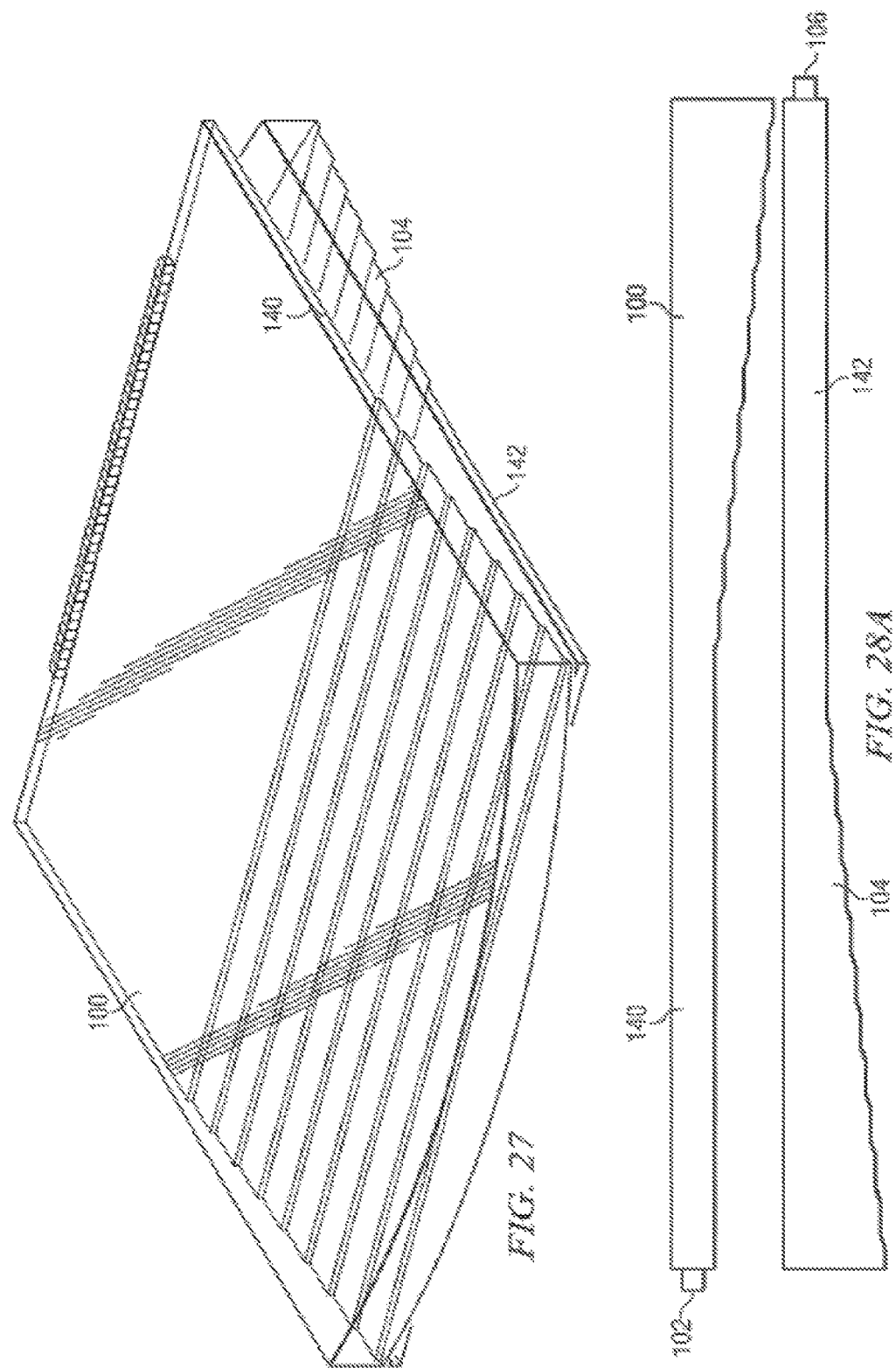

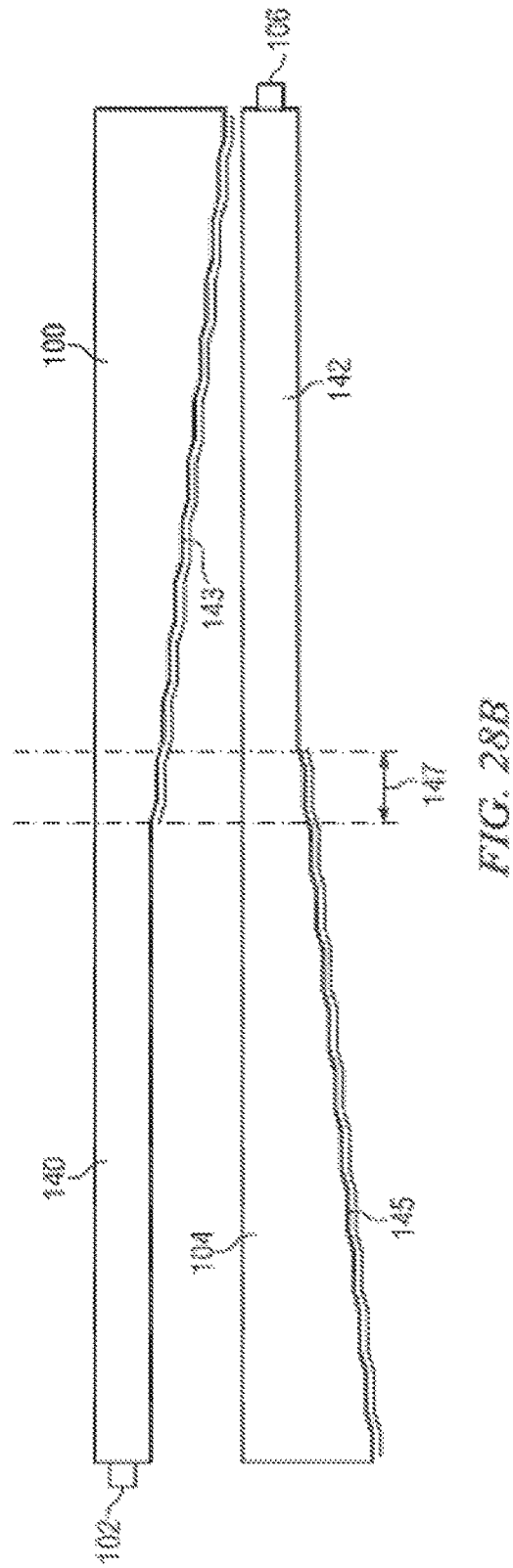

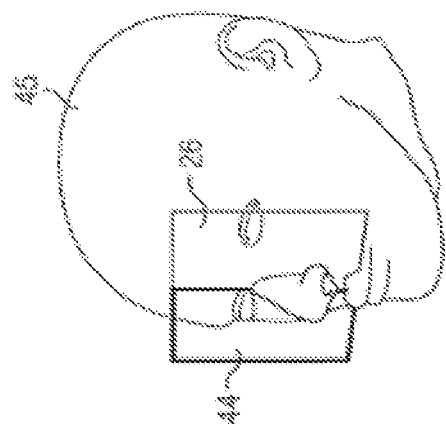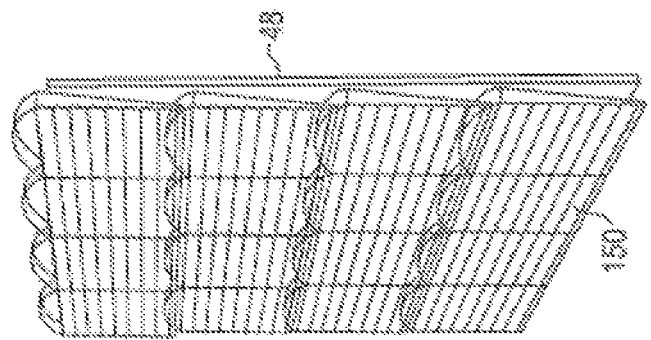
FIG. 29

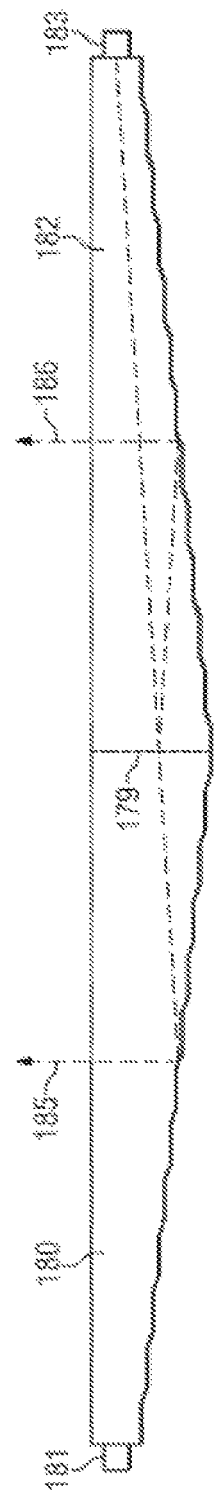

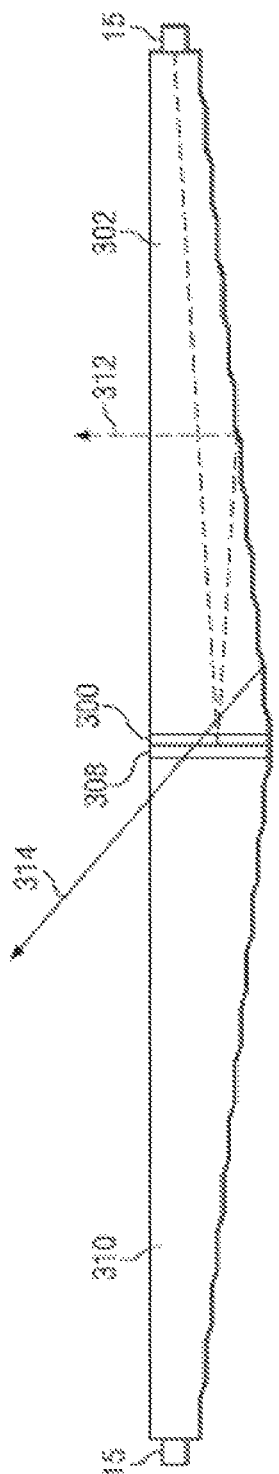

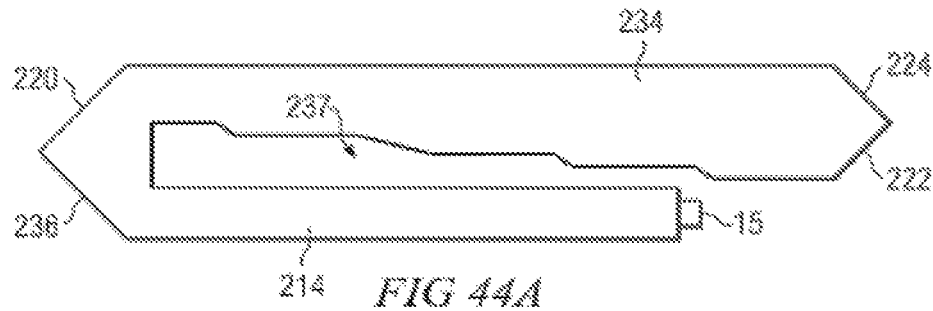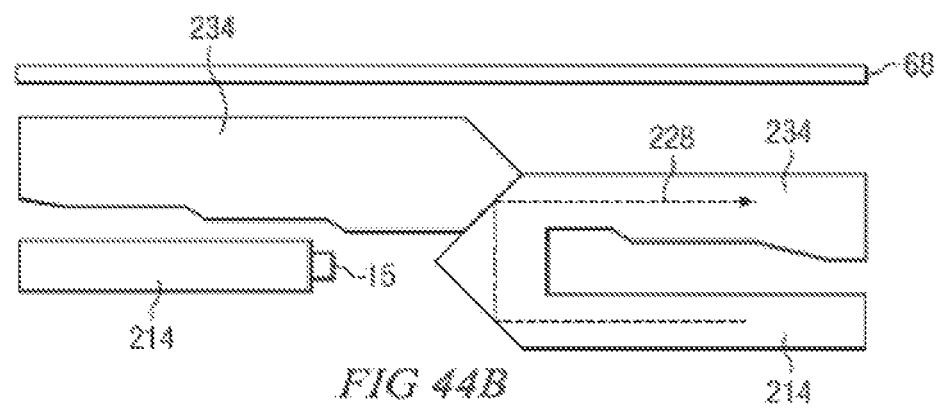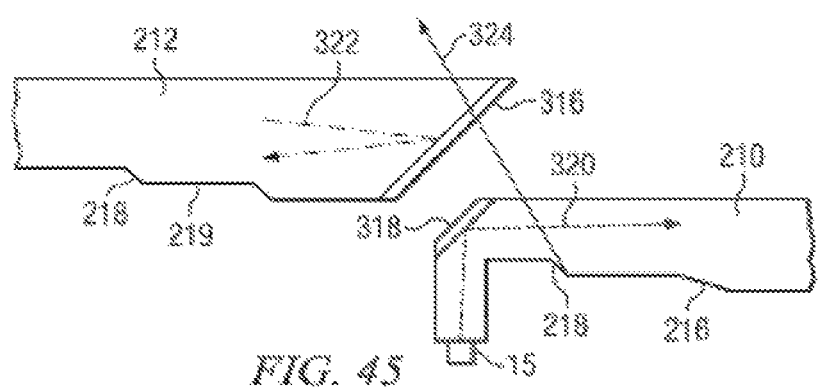

DIRECTIONAL BACKLIGHT

CROSS-REFERENCE TO RELATED APPLICATIONS

This application is a continuation of U.S. patent application Ser. No. 13/838,936 filed Mar. 15, 2013, now U.S. Pat. No. 9,188,731.

TECHNICAL FIELD

This disclosure generally relates to illumination of light modulation devices, and more specifically relates to light guides for providing large area illumination from localized light sources for use in 2D, 3D, and/or autostereoscopic display devices.

BACKGROUND

Spatially multiplexed autostereoscopic displays typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

Such displays have reduced spatial resolution compared to the native resolution of the spatial light modulator and further, the structure of the viewing windows is determined by the pixel aperture shape and parallax component imaging function. Gaps between the pixels, for example for electrodes, typically produce non-uniform viewing windows. Undesirably such displays exhibit image flicker as an observer moves laterally with respect to the display and so limit the viewing freedom of the display. Such flicker can be reduced by defocusing the optical elements; however such defocusing results in increased levels of image cross talk and increases visual strain for an observer. Such flicker can be reduced by adjusting the shape of the pixel aperture, however such changes can reduce display brightness and can include addressing electronics in the spatial light modulator.

BRIEF SUMMARY

According to a first aspect of the present disclosure, there is provided a directional display device, which may include a transmissive spatial light modulator. The transmissive spatial light modulator may include an array of pixels arranged to modulate light passing therethrough and at least two directional backlights. Each of the at least two directional backlights may include a waveguide having an input end, first and second, opposed guide surfaces for guiding light along the waveguide, and a reflective end facing the input end for reflecting light from the input light back through the waveguide. The first guide surface may be arranged to guide light by total internal reflection, the second guide surface may have a plurality of light extraction features oriented to reflect light guided through the waveguide after reflection from the reflective end in directions allowing exit through the first guide surface as output light. The waveguide may be arranged to direct input light originating from different input positions in a lateral direction across the input end into respective optical windows in output directions distributed in the lateral direction in dependence on the input positions, the directional backlights each being arranged to supply output light through the spatial light modulator.

The directional backlights may be stacked and/or tiled behind the spatial light modulator, that is the spatial light modulator is arranged between the directional backlight and a window plane. In this case, the directional backlights may supply output light through different regions of the spatial light modulator.

The present embodiments may achieve a combination of optical window properties that may include but are not limited to increased brightness, increased window resolution, landscape and portrait operation, increased viewing freedom, mixing of different color directional illumination, increased longitudinal viewing freedom and increased display size.

Tiled arrangements may advantageously achieve increased display size while maintaining a desirable image luminance for given light emitting element luminous emittance. Further, longitudinal viewing freedom may be extended in cooperation with observer tracking display control systems. Further cross talk may be reduced in scanning display systems. Further optical aberrations of viewing windows may be reduced, increasing lateral viewing freedom while maintaining a desirable level of image cross talk. Further the size of display bezel may be reduced.

In one embodiment, first and second directional backlights of the directional backlights may be tiled in a direction perpendicular to the lateral direction. Stated differently, the directional backlights may be tiled in the direction of the optical axes of the waveguides. Further, the first directional backlight may have a reflective end, and the reflective end of the first directional backlight may overlap the second directional backlight. Additionally, a third directional backlight may also be tiled in the lateral direction.

In another embodiment, the directional backlights may be tiled in the lateral direction. Stated differently, the directional backlights may be tiled in a direction perpendicular to the optical axes of the waveguides.

In some embodiments, the directional backlights may be formed from a common piece of material.

Advantageously embodiments including directional backlights that are tiled in the lateral direction may achieve extended longitudinal viewing freedom. The individual directional backlights may have a width that is smaller than the width of the spatial light modulator that achieves an increased range of longitudinal viewing freedom for the respective directional backlight from geometrical considerations. The individual directional backlights may cooperate with an observer tracking systems so that each directional backlight may be arranged to direct light to an observer that achieves the longitudinal viewing freedom of the display apparatus that is substantially the same as the longitudinal viewing freedom of the individual directional backlights.

The directional backlights may be stacked behind the spatial light modulator. In this case, the directional backlights may each supply output light through the spatial light modulator and through any other directional backlight intermediate the directional backlight and the spatial light modulator. The directional backlights may be oriented around the approximate normal to the spatial light modulator so that the optical windows of the directional backlights may be approximately aligned with each other. The optical windows of the directional backlights may extend at an angle relative to each other in an approximate range from 85 to 95 degrees.

Additionally, the first guide surfaces of the respective directional backlights may be substantially coplanar. Further, the first guide surfaces may be substantially coplanar whether or not the directional backlights are oriented around the approximate normal to the spatial light modulator.

Continuing the discussion of this case, the directional backlights may be arranged in inverted orientations around the approximate normal to the spatial light modulator with the input end of each directional backlight on the same side as the reflective end of the other directional backlight. The optical windows of the directional backlights may or may not be approximately aligned with each other. The first guide surfaces of the respective directional backlights may or may not be substantially coplanar. Also, the guide surfaces of the facing guide surfaces of the two directional backlights may be arranged in inverted orientations which may extend in a generally parallel direction.

The directional backlight may include a reflective end which may have positive optical power in a lateral direction across the waveguide and may also include an input end that is an extension of one of the guide surfaces, and a coupler facing the input end which may be arranged to deflect input light along the waveguide.

Each of the directional backlights may include light extraction features which may be facets of the second guide surface. The second guide surface may have regions alternating with the facets which may be arranged to direct light through the waveguide without extracting it. In one example, the light extraction features of each directional backlight may have positive optical power in a lateral direction across the waveguide.

A directional display device may also include in respect of each directional backlight, an array of light sources at different input positions across the input end of the respective waveguide. In one example of the directional display device, the directional backlights may be oriented around the approximate normal to the spatial light modulator so that the optical windows of the directional backlights may be approximately aligned with each other and the array of light sources in respect of each directional backlight may be arranged to output light of a different color.

A directional display apparatus including this display device may also include a control system which may be arranged to selectively operate the light sources to direct light into viewing windows corresponding to output directions. Further, this directional display apparatus may be an autostereoscopic display apparatus in which the control system may be further arranged to control the display device to display temporally multiplexed light and right images and also to display substantially synchronously to direct the displayed images into viewing windows in positions approximately corresponding to left and right eyes of an observer. The control system may also be arranged to direct the displayed images into viewing windows in positions approximately corresponding to left and right eyes of an observer, which may primarily depend on the detected position of the observer. The control system of this display apparatus may include a sensor system which may be arranged to detect the position of an observer relative to the display device. The sensor system may be arranged to detect the position of an observer relative to the display device laterally and longitudinally to the normal to the spatial light modulator. The control system may be arranged to direct the displayed images into viewing windows in positions corresponding to left and right eyes of an observer, which may primarily depend on the detected position of the observer.

The above descriptions may apply to each or all of the following apparatuses, modifications and/or additional features, individually, or any combination thereof, which will now be described.

Advantageously the directional backlights of the present embodiments may be arranged in stacked arrangements. Such directional backlights may be arranged to be substantially transparent to incident light from an external light source and so may substantially have no effect on light from other directional backlights and may be independently controlled, achieving the advantageous combination of window arrangements including increased window resolution, increased window brightness, multiple window orientations and other advantageous window arrangements described herein.

Known wedge waveguides such as described in [Travis] may achieve light extraction by means of breaking total internal reflection between two planar guiding sides and require a light deflection element to deflect light towards a direction around a normal direction of the surface of the spatial light modulator. The present embodiments do not require a light deflection element and do not substantially direct light close to parallel to a planar guiding surface. If such wedge waveguides were to be stacked in a first arrangement, each including a light deflection element, the second light deflection element would further deflect light from the first waveguide, so that the angular outputs could not be independently controlled. If such wedge waveguides were stacked in a second arrangement with a single shared output light deflection element, then light from the first wedge waveguide incident on the second wedge waveguide would show high light loss due to Fresnel reflections for light incident near parallel to the surface. Advantageously the present embodiments do not have the undesirable properties of stacked wedge waveguides.

According to a further aspect of the present disclosure, there may be provided a directional illumination apparatus may include a first light extraction element for guiding and extracting light. The first light extraction element may include a first light guiding surface and a second light guiding surface, opposite the first light guiding surface, and a first illumination input surface located between the first and second light guiding surfaces. The first illumination input surface may be operable to receive light from a first array of light sources and a second light extraction element for guiding and extracting light. The second light extraction element may include a third light guiding surface, and a fourth light guiding surface opposite the third light guiding surface. Additionally, the second light extraction element may include a second illumination input surface located between the third and fourth light guiding surfaces, and the second illumination input surface may be operable to receive light from a second array of light sources. The light from the second light extraction light element may be directed at least in part through a surface of the first light extraction element other than the first illumination input.

According to a further aspect of the present disclosure, there may be provided a directional illumination system, which may include a first light extraction element for guiding and extracting light. The first light extraction element may include a first section operable to allow light rays to spread and a second section. The second section may include a first light guiding surface, and a second light guiding surface opposite the first light guiding surface, and a first illumination input surface located between the first and second light guiding surfaces. The first illumination input surface may be operable to receive light from a first array of light sources and from a second light extraction element for guiding and extracting light. The second light extraction element may include a third section operable to allow light rays to spread and a fourth section which may further include a third light guiding surface, a fourth light guiding surface opposite the third light guiding surface, and a second illumination input surface located between the third and fourth light guiding surfaces. The second illumination input surface may be operable to receive light from a second array of light sources, in which light from the second light extraction light element may be directed at least in part through a surface of the first light extraction element other than the first illumination input surface.

According to a further aspect of the present disclosure, there may be provided a directional illumination apparatus which may include at least two optical valves for guiding light, in which each optical valve further may include a first light guiding surface. The first light guiding surface may be substantially planar and a second light guiding surface, opposite the first light guiding surface, may include a plurality of guiding features and a plurality of extraction features, in which the plurality of extraction features may be operable to allow light to pass with substantially low loss when the light is propagating in a first direction. The optical valves in cooperation with respective approximately aligned light sources may be arranged to provide different directional illuminations.

According to a further aspect of the present disclosure, there may be provided a light guiding system that provides directional distributions, which may include a directional illumination apparatus. The directional illumination apparatus may include at least two optical valves for guiding light, in which each optical valve may further include a first light guiding surface that may be substantially planar, and a second light guiding surface, opposite the first light guiding surface. The second light guiding surface may include at least one guiding feature and a plurality of extraction features, in which the plurality of extraction features may be operable to allow light to pass with substantially low loss when the light is propagating in a first direction and further operable to reflect light to exit the optical valve when the light is propagating in a second direction. A spatial light modulator may be operable to receive light from at least one of the two optical valves in which the optical valves in cooperation with respective approximately aligned light sources may be arranged to provide different directional illuminations.

Devices and apparatuses in accordance with the present disclosure may employ any of the following features.

Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in patent application Ser. No. 13/300,293, which is herein incorporated by reference, in its entirety.

Backlight units (BLUs) that employ folded optical systems such as stepped imaging directional backlights may be advantageously transparent to normally incident light. The transparency property enables valve array apparatuses such as stacked and tiled composite illumination systems of the present embodiments, where for example at least part of adjacent illuminators are hidden by or illuminate through each other. Such valve array illumination apparatus embodiments lead to increased brightness, local independent illumination and directional capabilities.

Combining backlights, for example by means of stacking or tiling backlight illumination units increases brightness and provides for local spatial and directional independence of respective backlights. In time multiplexed LCD systems, local illumination increases visible contrast and minimizes frame to frame contamination in stereoscopic systems providing scrolling illumination schemes. In the specific case of the optical valve, the ability to tile illuminators in a mosaic by means of stacking and/or tiling alleviates many of the optical issues present in large area illumination. Stacking and tiling also enables mixed illumination systems where a transparent directional backlight can be illuminated by a more conventional 2D illumination apparatus.

Additionally, embodiments may relate to a directional backlight apparatus and a directional display device which may incorporate the directional backlight. Such an apparatus may be used for autostereoscopic displays, privacy displays, multi-user displays and other directional display applications.

In embodiments, the optical function of the directional backlights can be provided by multiple stepped waveguides in which light passes from an external light source passes through a surface of the stepped waveguide in addition to the input aperture of the stepped waveguide. Advantageously such an arrangement provides additional optical functions to be provided in addition to the optical function provided by the respective stepped waveguide while preserving the advantages of high efficiency, large back working distance and thin form factor of the respective stepped waveguide.

Advantageously such an arrangement achieves a combination of optical functions including, but not limited to, increased brightness autostereoscopic display, a controllable landscape/portrait display, a 2D/3D switchable display, increased display area, and high efficiency color display illumination. Further the optical properties of the output can be modified to increase uniformity and widen viewing angle. Further, multiple viewers can be tracked independently.

The stepped waveguide does not require substantial redirection of the output illumination beam using serrated polymer films and asymmetric diffusers and as such, the optical valve discussed herein may be transparent to near normal incident light, or may not substantially change the directionality of light passing through the light guiding surfaces of the stepped waveguide. Advantageously, such an arrangement enables a stacking of stepped imaging directional backlights to be provided wherein the operation of the stepped imaging directional backlights may be substantially independent, thus achieving multiple functionalities. Further, arrays of stepped waveguides can be arranged as tiles in which light from adjacent stepped waveguide tiles may be directed within guiding layers to provide an increased cone angle.

Embodiments herein may provide an autostereoscopic directional display device with large area and thin structure. Further, as will be described, the optical valves of the present disclosure may achieve thin optical components with large back working distances. Such components can be used in directional backlights, to provide directional displays including autostereoscopic displays. Further, embodiments may provide a controlled illuminator for the purposes of an efficient autostereoscopic directional display device.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is only provided over a small angular directional distribution; alternating left and right eye viewing for time sequential stereoscopic and autostereoscopic display; and low cost and efficient illumination of color filter array free LCDs.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 16 is a schematic diagram illustrating stacked directional backlights of a directional display device including three directional backlights arranged in series to provide respective red, green and blue illumination directions for illumination of a transmissive spatial light modulator, in accordance with the present disclosure;

FIG. 17 is a schematic diagram illustrating in side view, a directional display device including three directional backlights arranged in series to provide respective red, green and blue illumination of a transmissive spatial light modulator, in accordance with the present disclosure;

FIG. 18 is a schematic diagram in top view, a detail of the spatial light modulator of FIG. 16 arranged to achieve efficient illumination of red, green and blue pixels of the respective spatial light modulator, in accordance with the present disclosure;

FIG. 19 is a schematic diagram of a directional display device including two directional backlights arranged in series to provide landscape and portrait autostereoscopic viewing, in accordance with the present disclosure;

FIG. 21A is a schematic diagram illustrating tiled directional backlights of a directional display device arranged to achieve increased illumination area, in accordance with the present disclosure;

FIG. 21B is a schematic diagram illustrating in side view, a directional display device including two tiled directional backlights arranged to achieve increased display area, in accordance with the present disclosure;

FIG. 22 is a schematic diagram illustrating an array of tiled directional backlights including rows of stepped waveguides, in accordance with the present disclosure;

FIG. 24 is a schematic diagram illustrating in side view, tiled directional backlights of a directional display device arranged to achieve increased display area, in accordance with the present disclosure;

FIG. 25 is a schematic diagram illustrating in side view, tiled directional backlights of a directional display device arranged to achieve increased display area, in accordance with the present disclosure;

FIG. 26 is a schematic diagram illustrating in side view, tiled directional backlights of a directional display device arranged to achieve increased display area, in accordance with the present disclosure;

FIG. 27 is a schematic diagram illustrating tiled directional backlights of a directional display device arranged to achieve increased illumination area, in accordance with the present disclosure;

FIG. 28A is a schematic diagram illustrating in side view, tiled directional backlights of a directional display device arranged to achieve increased display area, in accordance with the present disclosure;

FIG. 28B is a schematic diagram illustrating in side view, tiled directional backlights of a directional display device arranged to achieve increased display area, in accordance with the present disclosure;

FIG. 29 is a schematic diagram illustrating an array of directional backlights arranged to provide an autostereoscopic directional display device, in accordance with the present disclosure;

FIG. 34B is a schematic diagram illustrating in side view, an array of directional backlights to provide an increased illumination area, in accordance with the present disclosure;

FIG. 34C is a schematic diagram illustrating in side view, an array of directional backlights to provide an increased illumination area, in accordance with the present disclosure;

FIG. 34F is a schematic diagram illustrating light propagation for light output in a tiled array of directional backlights including a diffractive reflector, in accordance with the present disclosure;

FIG. 44A is a schematic diagram illustrating in side view, a stepped waveguide suitable for an array of directional backlights, in accordance with the present disclosure;

FIG. 44B is a schematic diagram illustrating in side view, first and second ends of a stepped waveguide assembled in an array of directional backlights, in accordance with the present disclosure;

FIG. 45 is a schematic diagram illustrating in side view, first and second ends of a stepped waveguide including diffractive reflectors, in accordance with the present disclosure;

DETAILED DESCRIPTION

Figure 1A:
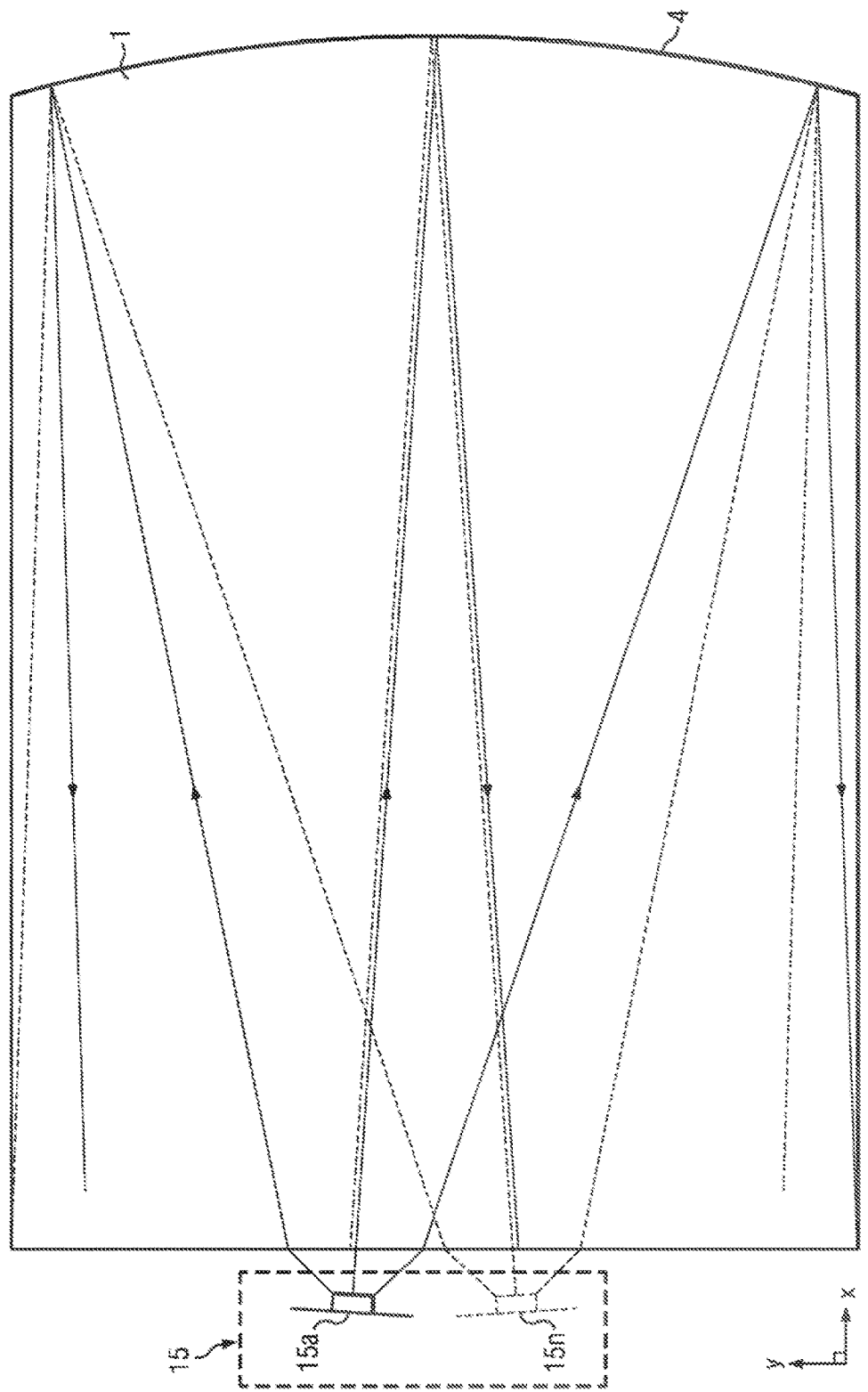
FIG. 1A is a schematic diagram illustrating a front view of light propagation in one embodiment of a directional display device, in accordance with the present disclosure.

Time multiplexed autostereoscopic displays can advantageously improve the spatial resolution of autostereoscopic display by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

For the purposes of the present embodiments, an optical window defines the illumination profile that is produced by a single light emitting element of an array of light emitting elements in cooperation with the optical system. A viewing window defines the illumination profile that is seen by one eye of a viewer and may thus include multiple optical windows. Thus an observer's eye placed in a viewing window may see a single image across at least part of the area of a spatial light modulator. The window plane is a nominal plane at which an image of the light emitting elements is formed, the separation of the window plane from the spatial light modulator being the nominal viewing distance of the display system.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionately. For example, a 16 mm wide illuminator imaged to a 65 mm wide viewing window (that may include multiple optical windows, typically between five and ten optical windows in displays that can achieve low flicker observer tracking) may require a 200 mm back working distance. Thus, the increased thickness of the optical elements can prevent useful application, for example, to mobile displays, or large area displays.

Addressing the aforementioned shortcomings, optical valves as described in commonly-owned U.S. patent application Ser. No. 13/300,293 advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or viewing windows, that can display different images in a first, typically horizontal, direction, but contain the same images when moving in a second, typically vertical, direction.

Conventional non-imaging display backlights commonly employ optical waveguides and have edge illumination from light sources such as LEDs. However, it should be appreciated that there are many fundamental differences in the function, design, structure, and operation between such conventional non-imaging display backlights and the imaging directional backlights discussed in the present disclosure.

Generally, for example, in accordance with the present disclosure, imaging directional backlights are arranged to direct the illumination from multiple light sources through a display panel to respective multiple viewing windows in at least one axis. Each viewing window is substantially formed as an image in at least one axis of a light source by the imaging system of the imaging directional backlight. An imaging system may be formed between multiple light sources and the respective optical windows. In this manner, the light from each of the multiple light sources is substantially not visible for an observer's eye outside of the respective viewing window.

In contradistinction, conventional non-imaging backlights or light guiding plates (LGPs) are used for illumination of 2D displays. See, e.g., Kälil Käläntär et al., *Backlight Unit With Double Surface Light Emission*, J. Soc. Inf. Display, Vol. 12, Issue 4, pp. 379-387 (December 2004). Non-imaging backlights are typically arranged to direct the illumination from multiple light sources through a display panel into a substantially common viewing zone for each of the multiple light sources to achieve wide viewing angle and high display uniformity. Thus non-imaging backlights do not form viewing windows. In this manner, the light from each of the multiple light sources may be visible for an observer's eye at substantially all positions across the viewing zone. Such conventional non-imaging backlights may have some directionality, for example, to increase screen gain compared to Lambertian illumination, which may be provided by brightness enhancement films such as BEF™ from 3M. However, such directionality may be substantially the same for each of the respective light sources. Thus, for these reasons and others that should be apparent to persons of ordinary skill, conventional non-imaging backlights are different to imaging directional backlights. Edge lit non-imaging backlight illumination structures may be used in liquid crystal display systems such as those seen in 2D Laptops, Monitors and TVs. Light propagates from the edge of a lossy waveguide which may include sparse features; typically local indentations in the surface of the guide which cause light to be lost regardless of the propagation direction of the light.

One example of an imaging directional backlight is an optical valve that may employ a folded optical system. Light may propagate substantially without loss in one direction through the optical valve, may be incident on an imaging reflector, and may counter-propagate such that the light may be extracted by reflection off tilted light extraction features, and directed to viewing windows as described in patent application Ser. No. 13/300,293, which is herein incorporated by reference in its entirety.

As used herein, examples of an imaging directional backlight include a stepped waveguide imaging directional backlight, a folded imaging directional backlight, a wedge type directional backlight, or an optical valve.

Additionally, as used herein, a stepped waveguide imaging directional backlight may be an optical valve. A stepped waveguide is a waveguide for an imaging directional backlight including a waveguide for guiding light, further including a first light guiding surface; and a second light guiding surface, opposite the first light guiding surface, further including a plurality of light guiding features interspersed with a plurality of extraction features arranged as steps.

Moreover, as used, a folded imaging directional backlight may be at least one of a wedge type directional backlight, or an optical valve.

In operation, light may propagate within an exemplary optical valve in a first direction from an input side to a reflective side and may be transmitted substantially without loss. Light may be reflected at the reflective side and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction.

The optical valve may achieve time sequential directional illumination of large display areas. Additionally, optical elements may be employed that are thinner than the back working distance of the optical elements to direct light from macroscopic illuminators to a window plane. Such displays may use an array of light extraction features arranged to extract light counter propagating in a substantially parallel waveguide.

Thin imaging directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight;" by RealD, for example U.S. patent application Ser. No. 13/300,293 which may be referred to herein as an "optical valve" or "optical valve directional backlight," all of which are herein incorporated by reference in their entirety.

The present disclosure provides stepped waveguide imaging directional backlights in which light may reflect back and forth between the internal faces of, for example, a stepped waveguide which may include a first side and a first set of features. As the light travels along the length of the stepped waveguide, the light may not substantially change angle of incidence with respect to the first side and first set of surfaces and so may not reach the critical angle of the medium at these internal faces. Light extraction may be advantageously achieved by a second set of surfaces (the step "risers") that are inclined to the first set of surfaces (the step "treads"). Note that the second set of surfaces may not be part of the light guiding operation of the stepped waveguide, but may be arranged to provide light extraction from the structure. By contrast, a wedge type imaging directional backlight may allow light to guide within a wedge profiled waveguide having continuous internal surfaces. The optical valve is thus not a wedge type imaging directional backlight.

Figure 1B:
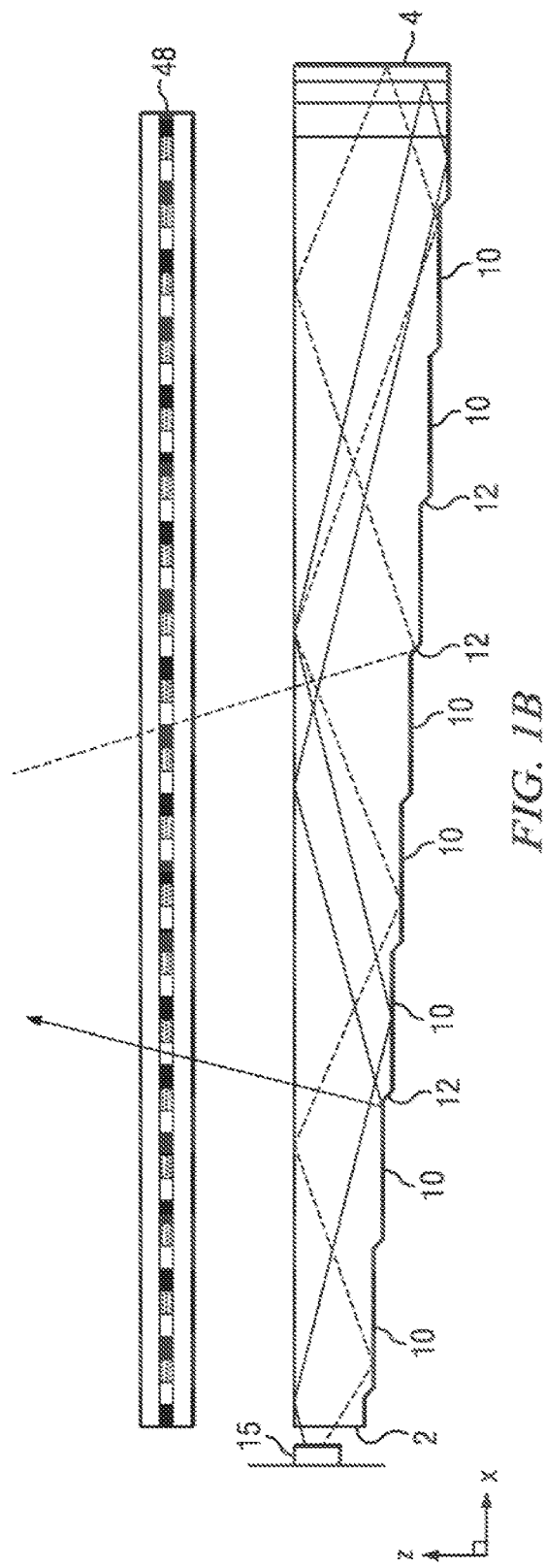
FIG. 1B is a schematic diagram illustrating a side view of light propagation in one embodiment of the directional display device of FIG. 1A, in accordance with the present disclosure.

FIG. 1A is a schematic diagram illustrating a front view of light propagation in one embodiment of a directional display device, and FIG. 1B is a schematic diagram illustrating a side view of light propagation in the directional display device of FIG. 1A.

FIG. 1A illustrates a front view in the xy plane of a directional backlight of a directional display device, and includes an illuminator array 15 which may be used to illuminate a stepped waveguide 1. Illuminator array 15 includes illuminator elements 15a through illuminator element 15n (where n is an integer greater than one). In one example, the stepped waveguide 1 of FIG. 1A may be a stepped, display sized waveguide 1. Illumination elements 15a through 15n are light sources that may be light emitting diodes (LEDs). Although LEDs are discussed herein as illuminator elements 15a-15n, other light sources may be used such as, but not limited to, diode sources, semiconductor sources, laser sources, local field emission sources, organic emitter arrays, and so forth. Additionally, FIG. 1B illustrates a side view in the xz plane, and includes illuminator array 15, SLM (spatial light modulator) 48, extraction features 12, guiding features 10, and stepped waveguide 1, arranged as shown. The side view provided in FIG. 1B is an alternative view of the front view shown in FIG. 1A. Accordingly, the illuminator array 15 of FIGS. 1A and 1B corresponds to one another and the stepped waveguide 1 of FIGS. 1A and 1B may correspond to one another.

Further, in FIG. 1B, the stepped waveguide 1 may have an input end 2 that is thin and a reflective end 4 that is thick. Thus the waveguide 1 extends between the input end 2 that receives input light and the reflective end 4 that reflects the input light back through the waveguide 1. The length of the input end 2 in a lateral direction across the waveguide is greater than the height of the input end 2. The illuminator elements 15a-15n are disposed at different input positions in a lateral direction across the input end 2.

The waveguide 1 has first and second, opposed guide surfaces extending between the input end 2 and the reflective end 4 for guiding light forwards and back along the waveguide 1 by total internal reflection. The first guide surface is planar. The second guide surface has a plurality of light extraction features 12 facing the reflective end 4 and inclined to reflect at least some of the light guided back through the waveguide 1 from the reflective end in directions that break the total internal reflection at the first guide surface and allow output through the first guide surface, for example, upwards in FIG. 1B, that is supplied to the SLM 48.

In this example, the light extraction features 12 are reflective facets, although other reflective features could be used. The light extraction features 12 do not guide light through the waveguide, whereas the intermediate regions of the second guide surface intermediate the light extraction features 12 guide light without extracting it. Those regions of the second guide surface are planar and may extend parallel to the first guide surface, or at a relatively low inclination. The light extraction features 12 extend laterally to those regions so that the second guide surface has a stepped shape including of the light extraction features 12 and intermediate regions. The light extraction features 12 are oriented to reflect light from the light sources, after reflection from the reflective end 4, through the first guide surface.

The light extraction features 12 are arranged to direct input light from different input positions in the lateral direction across the input end in different directions relative to the first guide surface that are dependent on the input position. As the illumination elements 15a-15n are arranged at different input positions, the light from respective illumination elements 15a-15n is reflected in those different directions. In this manner, each of the illumination elements 15a-15n directs light into a respective optical window in output directions distributed in the lateral direction in dependence on the input positions. The lateral direction across the input end 2 in which the input positions are distributed corresponds with regard to the output light to a lateral direction to the normal to the first guide surface. The lateral directions as defined at the input end 2 and with regard to the output light remain parallel in this embodiment where the deflections at the reflective end 4 and the first guide surface are generally orthogonal to the lateral direction. Under the control of a control system, the illuminator elements 15a-15n may be selectively operated to direct light into a selectable optical window. The optical windows may be used individually or in groups as viewing windows.

The SLM 48 extends across the waveguide is transmissive and modulates the light passing therethrough. Although the SLM 48 may be a liquid crystal display (LCD) but this is merely by way of example, and other spatial light modulators or displays may be used including LCOS, DLP devices, and so forth, as this illuminator may work in reflection. In this example, the SLM 48 is disposed across the first guide surface of the waveguide and modulates the light output through the first guide surface after reflection from the light extraction features 12.

The operation of a directional display device that may provide a one dimensional array of viewing windows is illustrated in front view in FIG. 1A, with its side profile shown in FIG. 1B. In operation, in FIGS. 1A and 1B, light may be emitted from an illuminator array 15, such as an array of illuminator elements 15a through 15n, located at different positions, y, along the surface of thin end side 2, x=0, of the stepped waveguide 1. The light may propagate along +x in a first direction, within the stepped waveguide 1, while at the same time, the light may fan out in the xy plane and upon reaching the far curved end side 4, may substantially or entirely fill the curved end side 4. While propagating, the light may spread out to a set of angles in the xz plane up to, but not exceeding the critical angle of the guide material. The extraction features 12 that link the guiding features 10 of the bottom side of the stepped waveguide 1 may have a tilt angle greater than the critical angle and hence may be missed by substantially all light propagating along +x in the first direction, ensuring the substantially lossless forward propagation.

Continuing the discussion of FIGS. 1A and 1B, the curved end side 4 of the stepped waveguide 1 may be made reflective, typically by being coated with a reflective material such as, for example, silver, although other reflective techniques may be employed. Light may therefore be redirected in a second direction, back down the guide in the direction of −x and may be substantially collimated in the xy or display plane. The angular spread may be substantially preserved in the xz plane about the principal propagation direction, which may allow light to hit the riser edges and reflect out of the guide. In an embodiment with approximately 45 degree tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xz angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15a-15n in illuminator array 15 from the input edge center. Having independent illuminator elements 15a-15n along the input edge 2 then enables light to exit from the entire first light directing side 6 and propagate at different external angles, as illustrated in FIG. 1A.

Figure 2A:
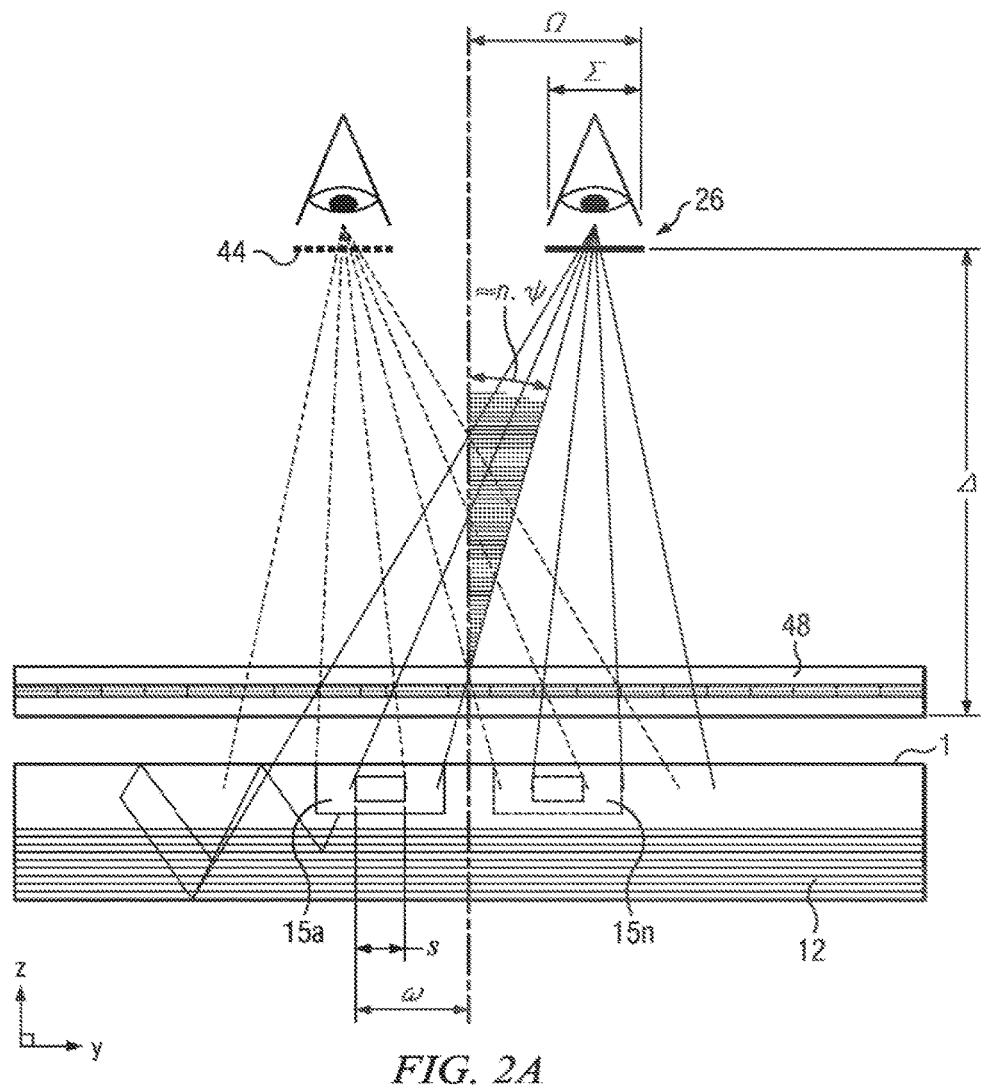
FIG. 2A is a schematic diagram illustrating in a top view of light propagation in another embodiment of a directional display device, in accordance with the present disclosure.
Figure 2B:
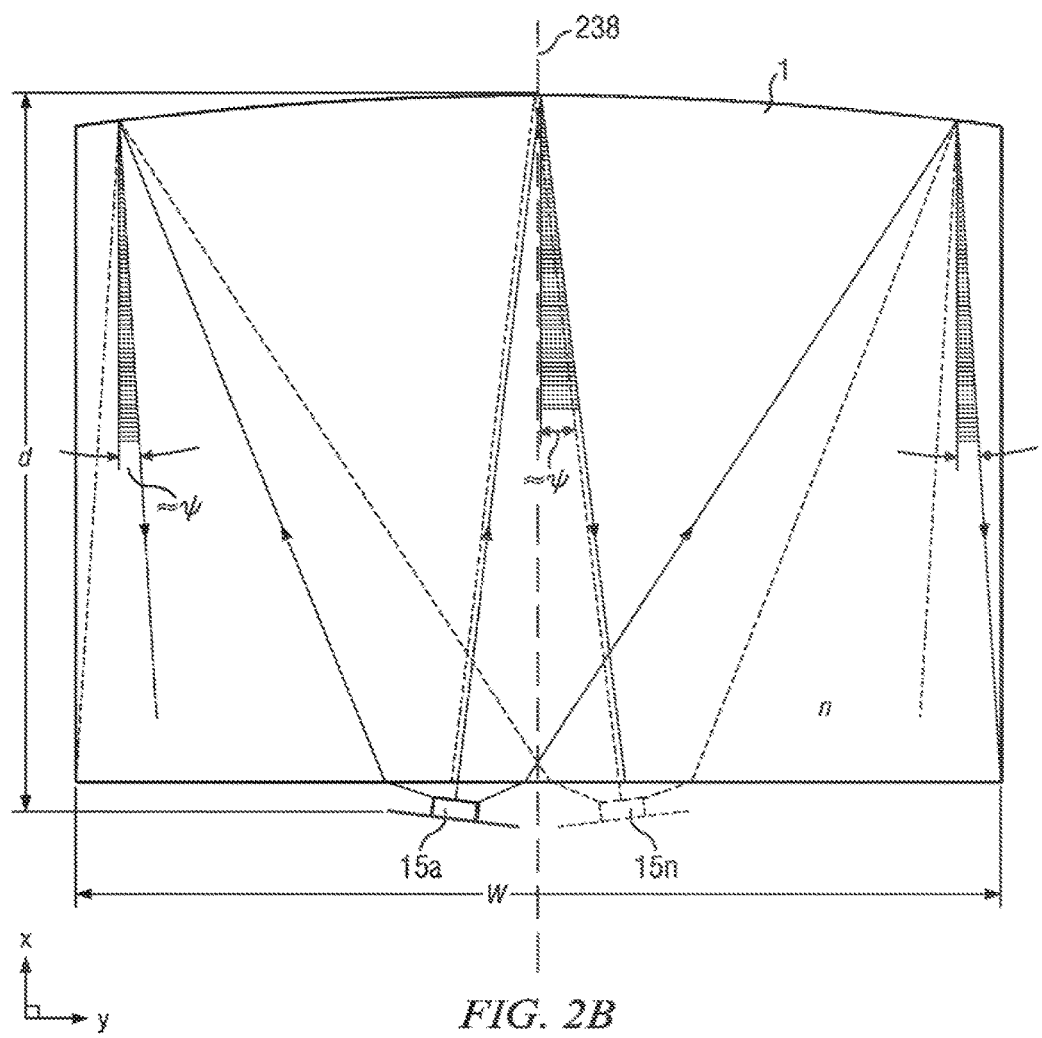
FIG. 2B is a schematic diagram illustrating light propagation in a front view of the directional display device of FIG. 2A, in accordance with the present disclosure.
Figure 2C:
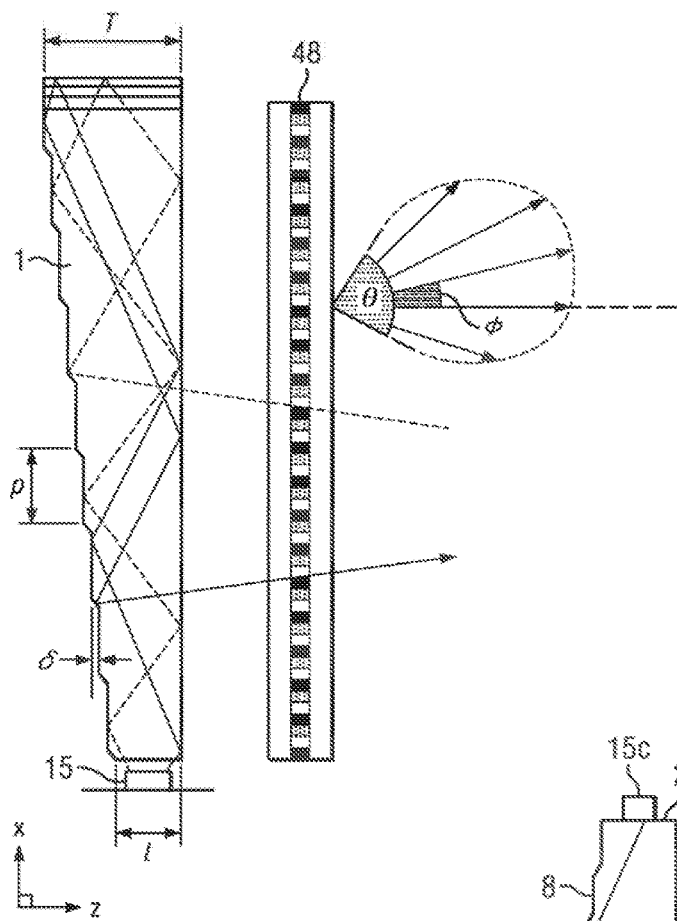
FIG. 2C is a schematic diagram illustrating light propagation in a side view of the directional display device of FIG. 2A, in accordance with the present disclosure.

Illuminating a spatial light modulator (SLM) 48 such as a fast liquid crystal display (LCD) panel with such a device may achieve autostereoscopic 3D as shown in top view or yz-plane viewed from the illuminator array 15 end in FIG. 2A, front view in FIG. 2B and side view in FIG. 2C. FIG. 2A is a schematic diagram illustrating in a top view, propagation of light in a directional display device, FIG. 2B is a schematic diagram illustrating in a front view, propagation of light in a directional display device, and FIG. 2C is a schematic diagram illustrating in side view propagation of light in a directional display device. As illustrated in FIGS. 2A, 2B, and 2C, a stepped waveguide 1 may be located behind a fast (e.g., greater than 100 Hz) LCD panel SLM 48 that displays sequential right and left eye images. In synchronization, specific illuminator elements 15a through 15n of illuminator array 15 (where n is an integer greater than one) may be selectively turned on and off, providing illuminating light that enters right and left eyes substantially independently by virtue of the system's directionality. In the simplest case, sets of illuminator elements of illuminator array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. In this way, 3D may be viewed when the head of a viewer is approximately centrally aligned. Movement to the side away from the central position may result in the scene collapsing onto a 2D image.

The reflective end 4 may have positive optical power in the lateral direction across the waveguide. In embodiments in which typically the reflective end 4 has positive optical power, the optical axis may be defined with reference to the shape of the reflective end 4, for example being a line that passes through the centre of curvature of the reflective end 4 and coincides with the axis of reflective symmetry of the end 4 about the x-axis. In the case that the reflecting surface 4 is flat, the optical axis may be similarly defined with respect to other components having optical power, for example the light extraction features 12 if they are curved, or the Fresnel lens 62 described below. The optical axis 238 is typically coincident with the mechanical axis of the waveguide 1. The cylindrical reflecting surface at end 4 may typically be a spherical profile to optimize performance for on-axis and off-axis viewing positions. Other profiles may be used.

Figure 3:
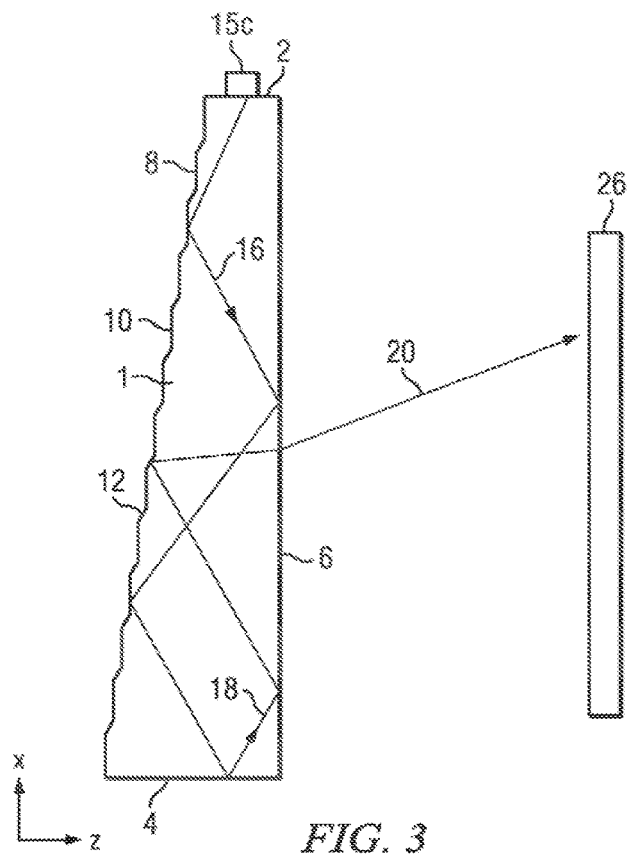
FIG. 3 is a schematic diagram illustrating in a side view of a directional display device, in accordance with the present disclosure.

FIG. 3 is a schematic diagram illustrating in side view a directional display device. Further, FIG. 3 illustrates additional detail of a side view of the operation of a stepped waveguide 1, which may be a transparent material. The stepped waveguide 1 may include an illuminator input side 2, a reflective side 4, a first light directing side 6 which may be substantially planar, and a second light directing side 8 which includes guiding features 10 and light extraction features 12. In operation, light rays 16 from an illuminator element 15c of an illuminator array 15 (not shown in FIG. 3), that may be an addressable array of LEDs for example, may be guided in the stepped waveguide 1 by means of total internal reflection by the first light directing side 6 and total internal reflection by the guiding feature 10, to the reflective side 4, which may be a mirrored surface. Although reflective side 4 may be a mirrored surface and may reflect light, it may in some embodiments also be possible for light to pass through reflective side 4.

Continuing the discussion of FIG. 3, light ray 18 reflected by the reflective side 4 may be further guided in the stepped waveguide 1 by total internal reflection at the reflective side 4 and may be reflected by extraction features 12. Light rays 18 that are incident on extraction features 12 may be substantially deflected away from guiding modes of the stepped waveguide 1 and may be directed, as shown by ray 20, through the side 6 to an optical pupil that may form a viewing window 26 of an autostereoscopic display. The width of the viewing window 26 may be determined by at least the size of the illuminator, output design distance and optical power in the side 4 and extraction features 12. The height of the viewing window may be primarily determined by the reflection cone angle of the extraction features 12 and the illumination cone angle input at the input side 2. Thus each viewing window 26 represents a range of separate output directions with respect to the surface normal direction of the spatial light modulator 48 that intersect with a plane at the nominal viewing distance.

Figure 4A:
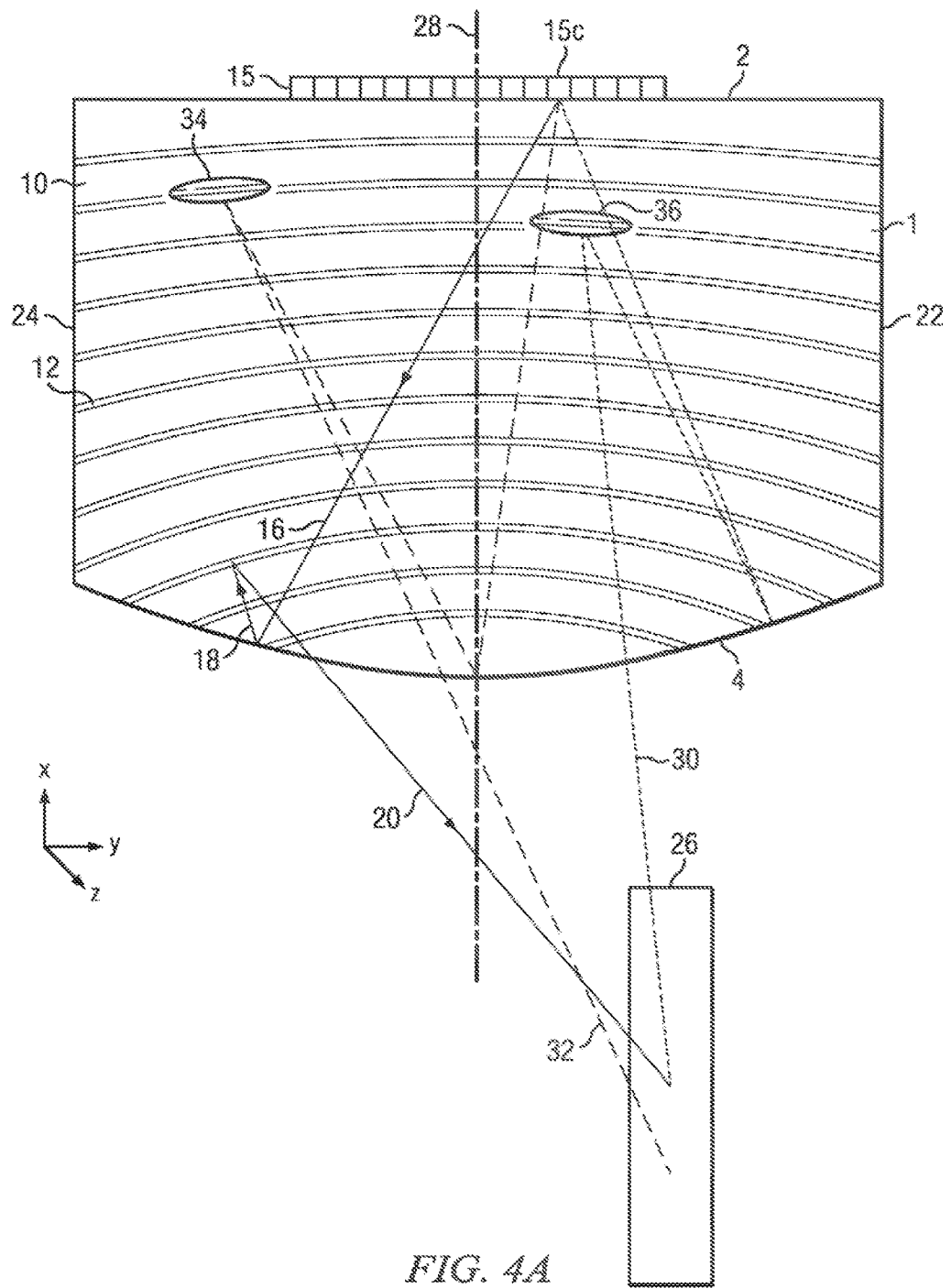
FIG. 4A is schematic diagram illustrating in a front view, generation of a viewing window in a directional display device and including curved light extraction features, in accordance with the present disclosure.

FIG. 4A is a schematic diagram illustrating in front view a directional display device which may be illuminated by a first illuminator element and including curved light extraction features. Further, FIG. 4A shows in front view further guiding of light rays from illuminator element 15c of illuminator array 15, in the stepped waveguide 1 having an optical axis 28. In FIG. 4A, the directional backlight may include the stepped waveguide 1 and the light source illuminator array 15. Each of the output rays are directed from the input side 2 towards the same viewing window 26 from the respective illuminator 15c. The light rays of FIG. 4A may exit the reflective side 4 of the stepped waveguide 1. As shown in FIG. 4A, ray 16 may be directed from the illuminator element 15c towards the reflective side 4. Ray 18 may then reflect from a light extraction feature 12 and exit the reflective side 4 towards the viewing window 26. Thus light ray 30 may intersect the ray 20 in the viewing window 26, or may have a different height in the viewing window as shown by ray 32. Additionally, in various embodiments, sides 22, 24 of the waveguide 1 may be transparent, mirrored, or blackened surfaces. Continuing the discussion of FIG. 4A, light extraction features 12 may be elongate, and the orientation of light extraction features 12 in a first region 34 of the light directing side 8 (light directing side 8 shown in FIG. 3, but not shown in FIG. 4A) may be different to the orientation of light extraction features 12 in a second region 36 of the light directing side 8. Similar to other embodiments discussed herein, for example as illustrated in FIG. 3, the light extraction features of FIG. 4A may alternate with the guiding features 10. As illustrated in FIG. 4A, the stepped waveguide 1 may include a reflective surface on reflective side 4. In one embodiment, the reflective end of the stepped waveguide 1 may have positive optical power in a lateral direction across the stepped waveguide 1.

In another embodiment, the light extraction features 12 of each directional backlight may have positive optical power in a lateral direction across the waveguide.

In another embodiment, each directional backlight may include light extraction features 12 which may be facets of the second guide surface. The second guide surface may have regions alternating with the facets that may be arranged to direct light through the waveguide without substantially extracting it.

Figure 4B:
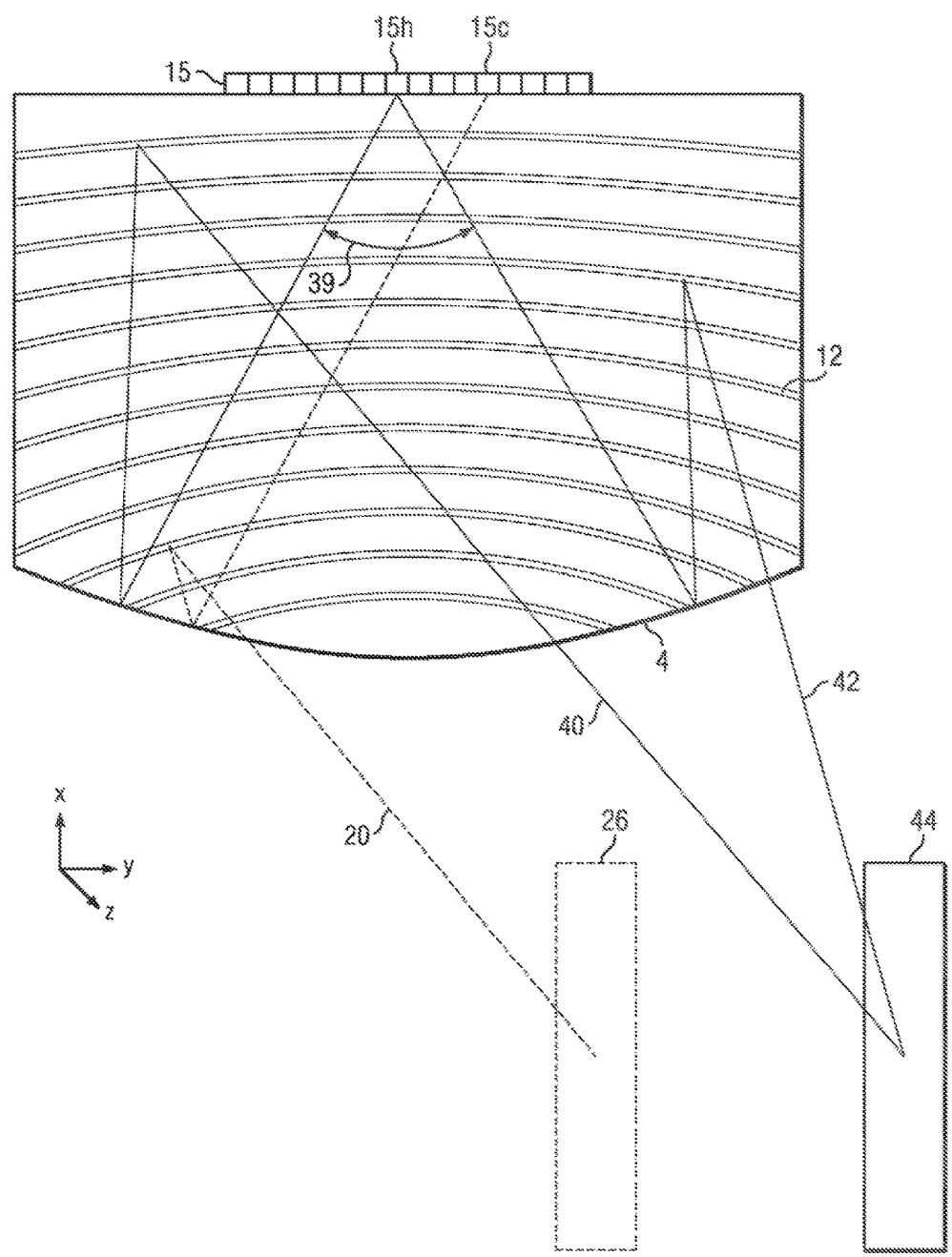
FIG. 4B is a schematic diagram illustrating in a front view, generation of a first and a second viewing window in a directional display device and including curved light extraction features, in accordance with the present disclosure.

FIG. 4B is a schematic diagram illustrating in front view a directional display device which may illuminated by a second illuminator element. Further, FIG. 4B shows the light rays 40, 42 from a second illuminator element 15h of the illuminator array 15. The curvature of the reflective surface on the side 4 and the light extraction features 12 cooperatively produce a second viewing window 44 laterally separated from the viewing window 26 with light rays from the illuminator element 15h.

Advantageously, the arrangement illustrated in FIG. 4B may provide a real image of the illuminator element 15c at a viewing window 26 in which the real image may be formed by cooperation of optical power in reflective side 4 and optical power which may arise from different orientations of elongate light extraction features 12 between regions 34 and 36, as shown in FIG. 4A. The arrangement of FIG. 4B may achieve improved aberrations of the imaging of illuminator element 15c to lateral positions in viewing window 26. Improved aberrations may achieve an extended viewing freedom for an autostereoscopic display while achieving low cross talk levels.

Figure 5:
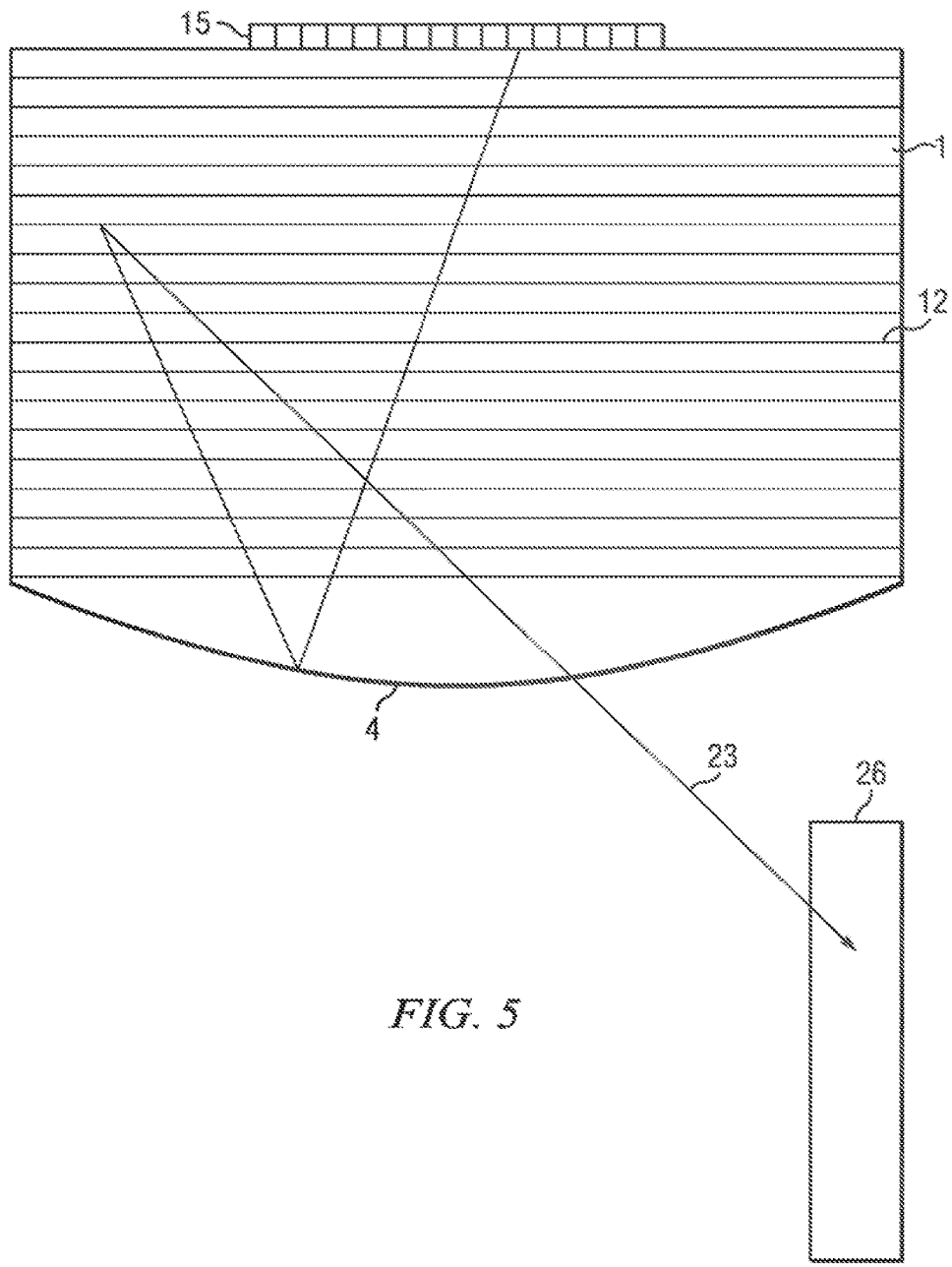
FIG. 5 is a schematic diagram illustrating generation of a first viewing window in a directional display device including linear light extraction features, in accordance with the present disclosure.

FIG. 5 is a schematic diagram illustrating in front view an embodiment of a directional display device having substantially linear light extraction features. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 4A and FIG. 4B. The optical axis 28 of the directional waveguide 1 may be the optical axis direction of the surface at side 4. The optical power of the side 4 is arranged to be across the optical axis direction, thus rays incident on the side 4 will have an angular deflection that varies according to the lateral offset of the incident ray from the optical axis 28.

Figure 6A:
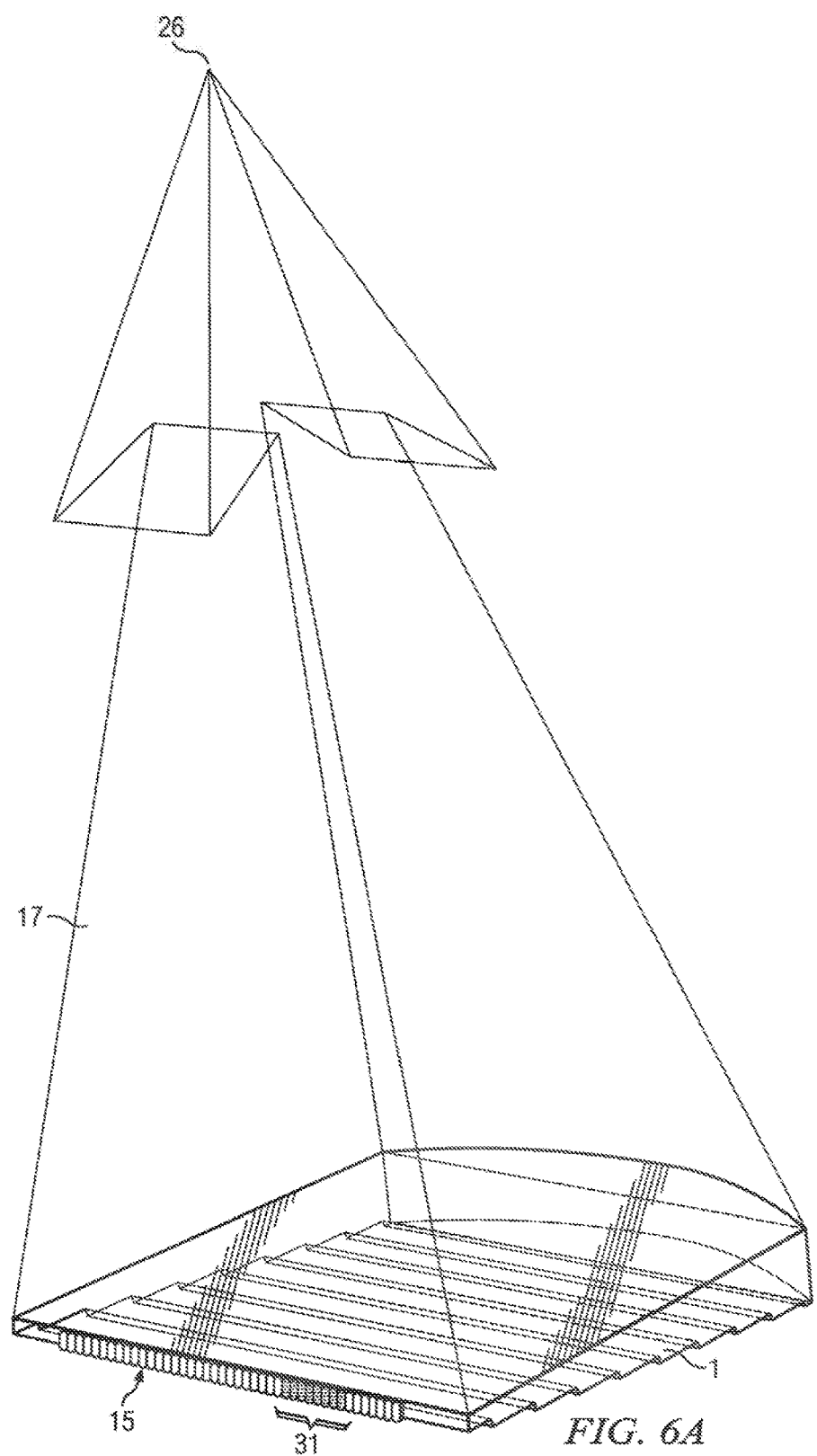
FIG. 6A is a schematic diagram illustrating one embodiment of the generation of a first viewing window in a time multiplexed directional display device, in accordance with the present disclosure.
Figure 6B:
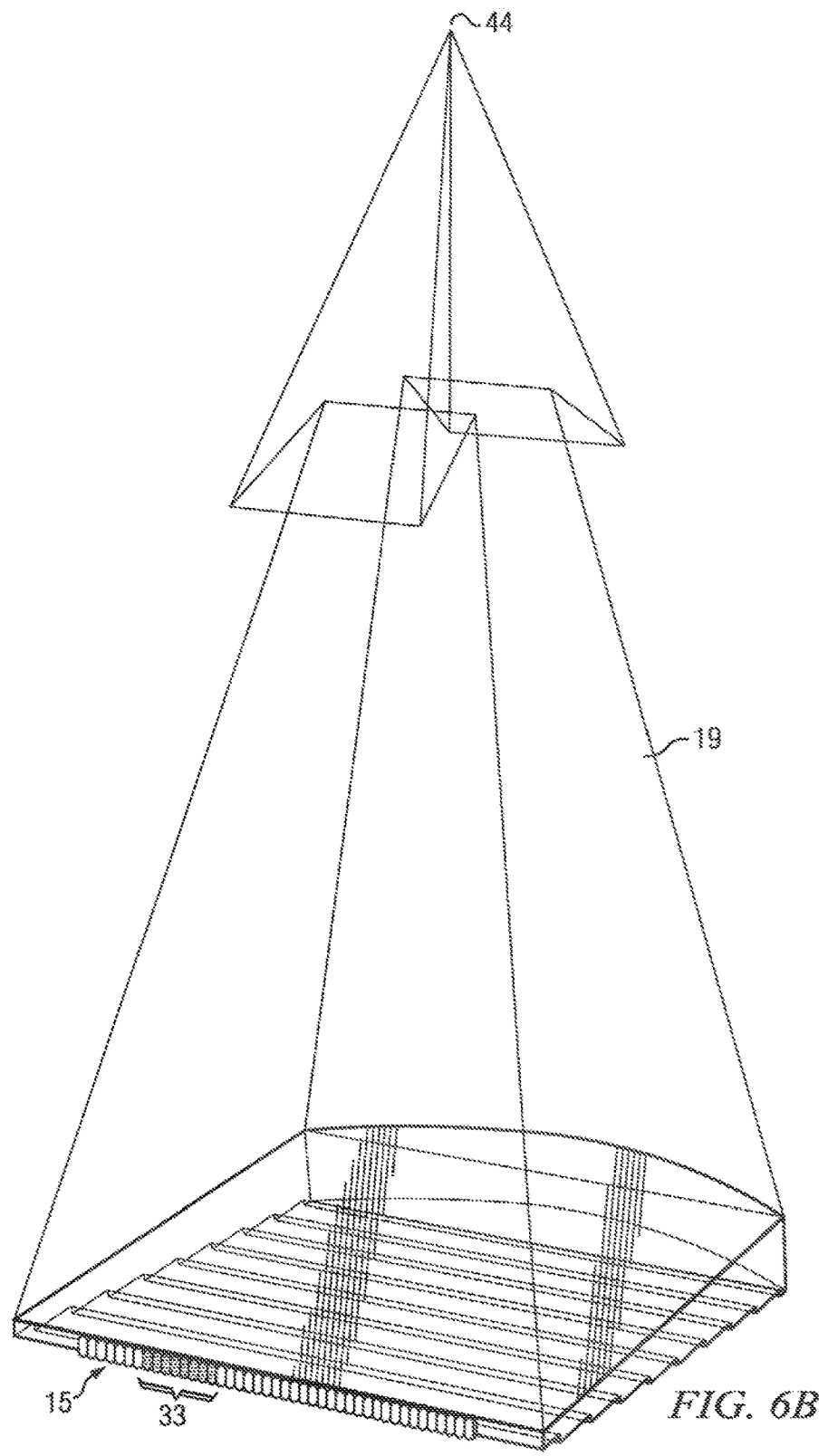
FIG. 6B is a schematic diagram illustrating another embodiment of the generation of a second viewing window in a time multiplexed directional display device in a second time slot, in accordance with the present disclosure.
Figure 6C:
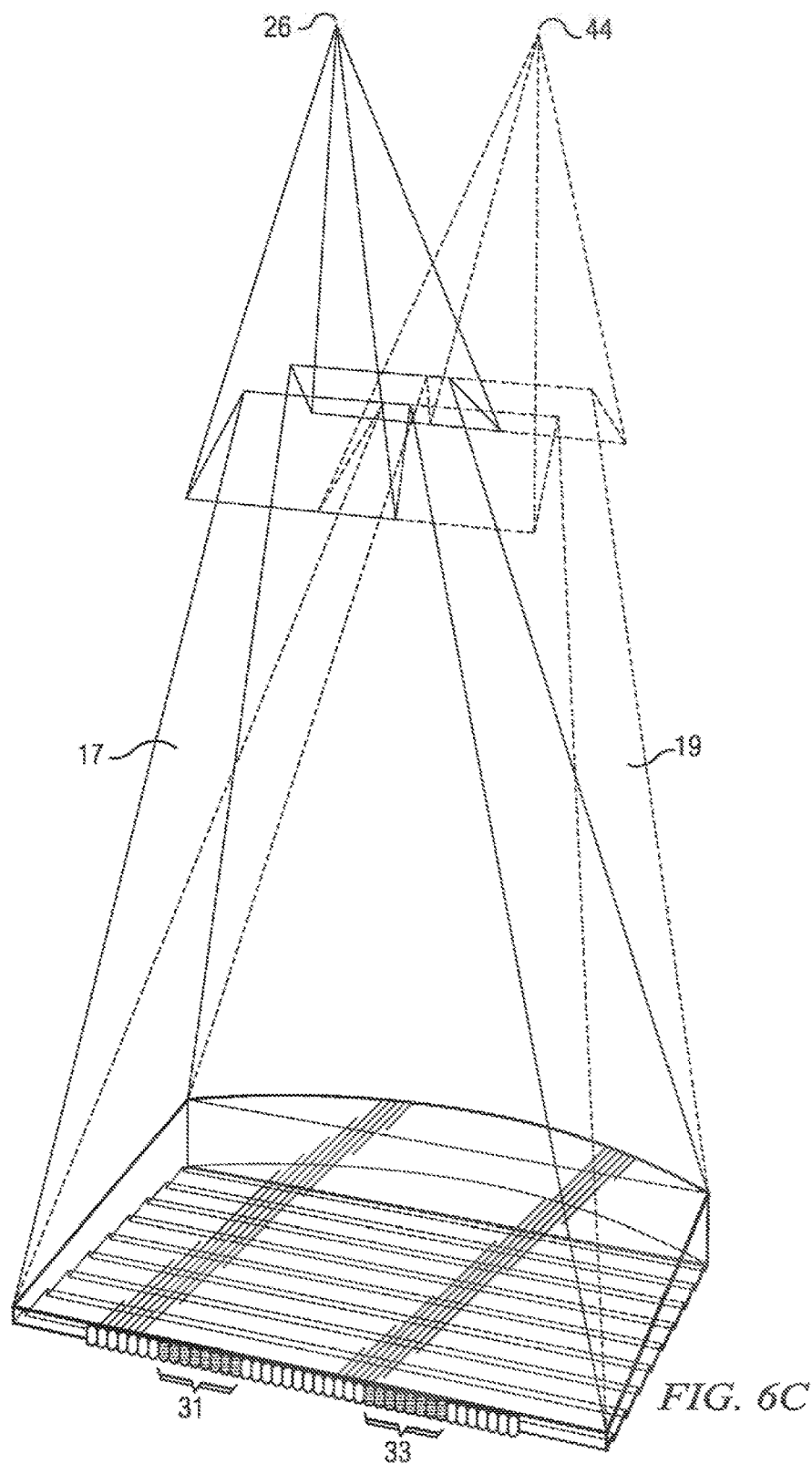
FIG. 6C is a schematic diagram illustrating another embodiment of the generation of a first and a second viewing window in a time multiplexed directional display device, in accordance with the present disclosure.

FIG. 6A is a schematic diagram illustrating one embodiment of the generation of a first viewing window in a time multiplexed imaging directional display device in a first time slot, FIG. 6B is a schematic diagram illustrating another embodiment of the generation of a second viewing window in a time multiplexed imaging directional backlight apparatus in a second time slot, and FIG. 6C is a schematic diagram illustrating another embodiment of the generation of a first and a second viewing window in a time multiplexed imaging directional display device. Further, FIG. 6A shows schematically the generation of viewing window 26 from stepped waveguide 1. Illuminator element group 31 in illuminator array 15 may provide a light cone 17 directed towards a viewing window 26. FIG. 6B shows schematically the generation of viewing window 44. Illuminator element group 33 in illuminator array 15 may provide a light cone 19 directed towards viewing window 44. In cooperation with a time multiplexed display, windows 26 and 44 may be provided in sequence as shown in FIG. 6C. If the image on a spatial light modulator 48 (not shown in FIGS. 6A, 6B, 6C) is adjusted in correspondence with the light direction output, then an autostereoscopic image may be achieved for a suitably placed viewer. Similar operation can be achieved with all the imaging directional backlights described herein. Note that illuminator element groups 31, 33 each include one or more illumination elements from illumination elements 15a to 15n, where n is an integer greater than one.

Figure 7:
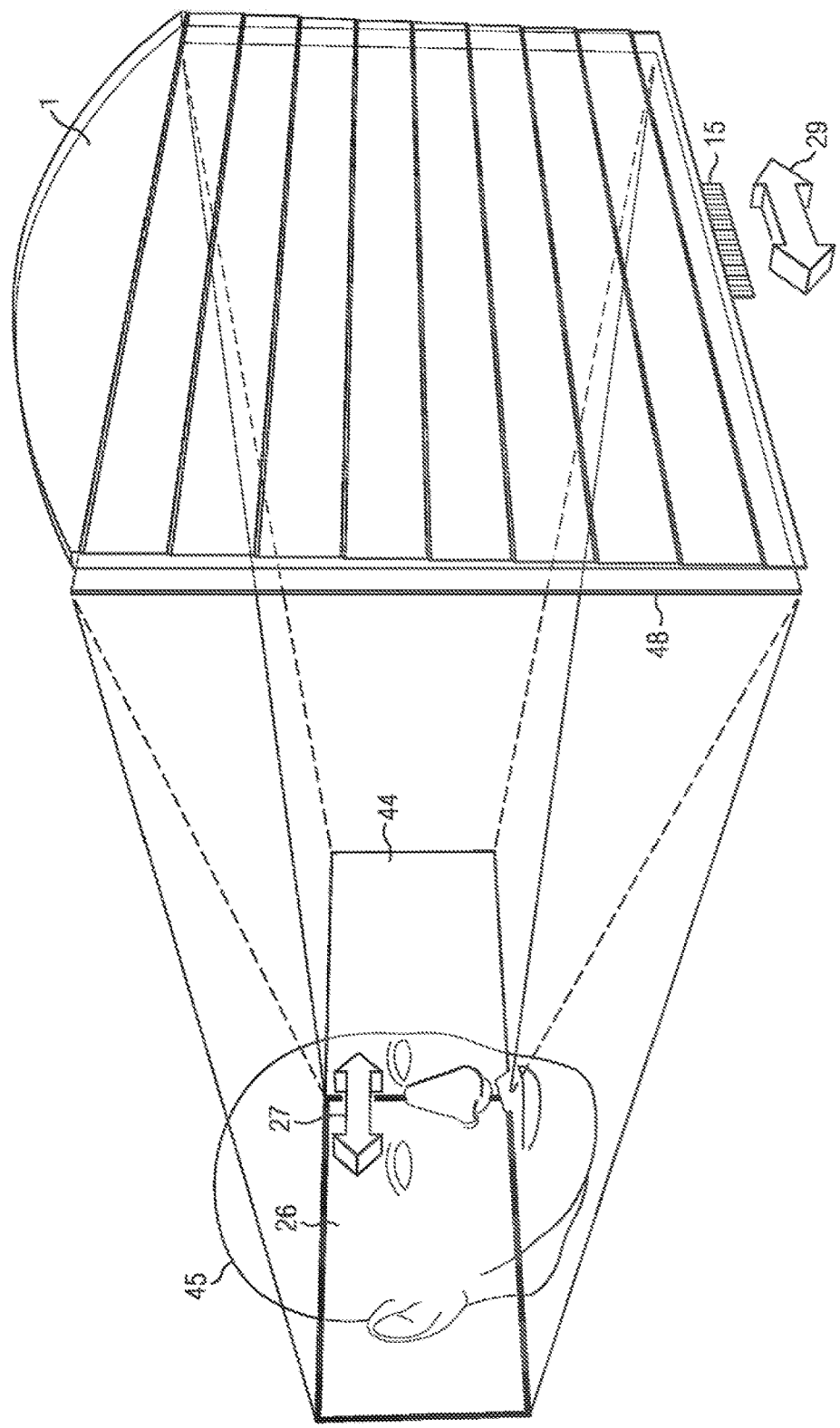
FIG. 7 is a schematic diagram illustrating an observer tracking autostereoscopic directional display device, in accordance with the present disclosure.

FIG. 7 is a schematic diagram illustrating one embodiment of an observer tracking autostercoscopic display apparatus including a time multiplexed directional display device. As shown in FIG. 7, selectively turning on and off illuminator elements 15a to 15n along axis 29 provides for directional control of viewing windows. The head 45 position may be monitored with a camera, motion sensor, motion detector, or any other appropriate optical, mechanical or electrical means, and the appropriate illuminator elements of illuminator array 15 may be turned on and off to provide substantially independent images to each eye irrespective of the head 45 position. The head tracking system (or a second head tracking system) may provide monitoring of more than one head 45, 47 (head 47 not shown in FIG. 7) and may supply the same left and right eye images to each viewers' left and right eyes providing 3D to all viewers. Again similar operation can be achieved with all the imaging directional backlights described herein.

Figure 8:
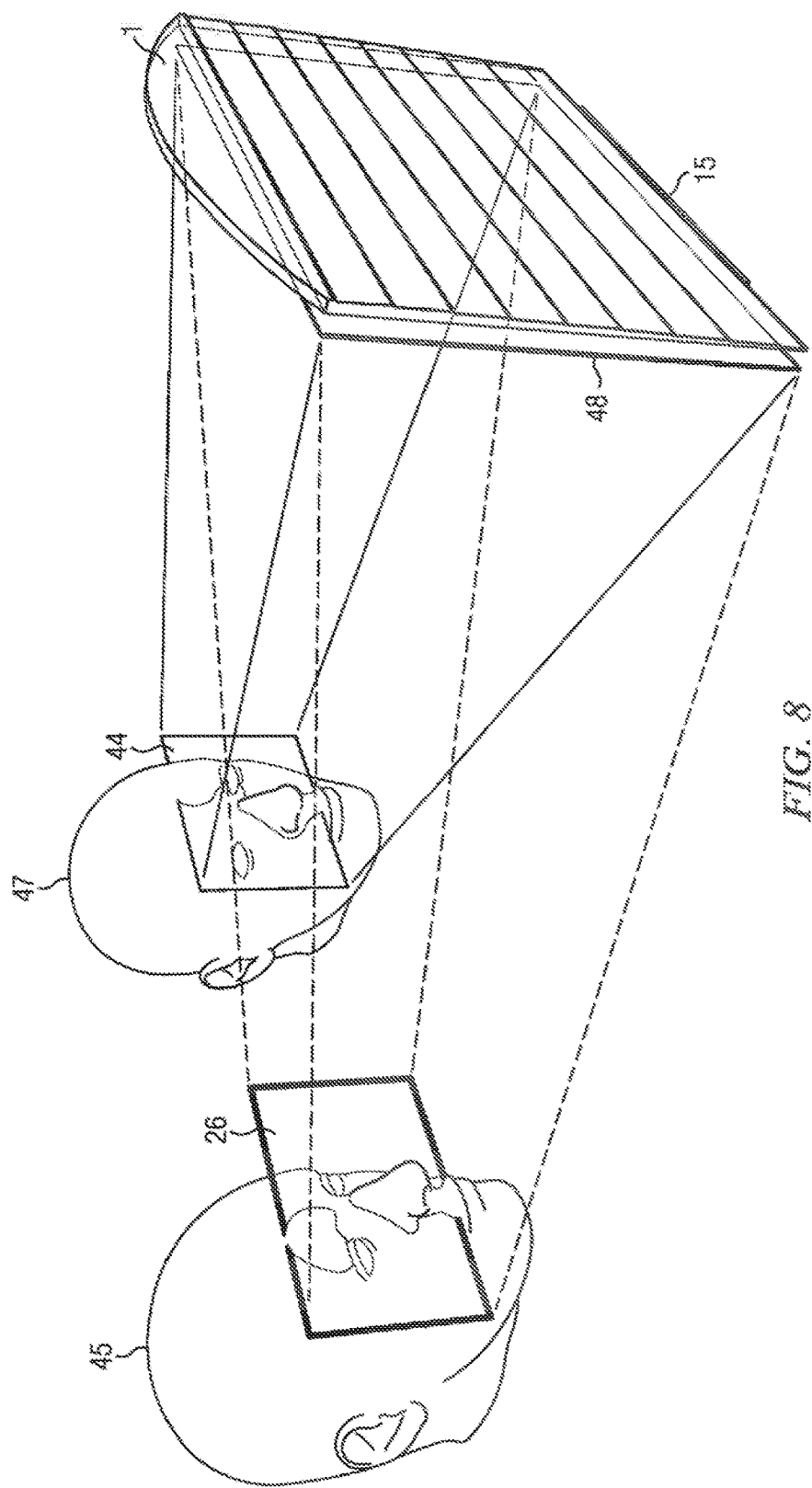
FIG. 8 is a schematic diagram illustrating a multi-viewer directional display device, in accordance with the present disclosure.

FIG. 8 is a schematic diagram illustrating one embodiment of a multi-viewer directional display device as an example including an imaging directional backlight. As shown in FIG. 8, at least two 2D images may be directed towards a pair of viewers 45, 47 so that each viewer may watch a different image on the spatial light modulator 48. The two 2D images of FIG. 8 may be generated in a similar manner as described with respect to FIG. 7 in that the two images would be displayed in sequence and in synchronization with sources whose light is directed toward the two viewers. One image is presented on the spatial light modulator 48 in a first phase, and a second image is presented on the spatial light modulator 48 in a second phase different from the first phase. In correspondence with the first and second phases, the output illumination is adjusted to provide first and second viewing windows 26, 44 respectively. An observer with both eyes in viewing window 26 will perceive a first image while an observer with both eyes in viewing window 44 will perceive a second image.

Figure 9:
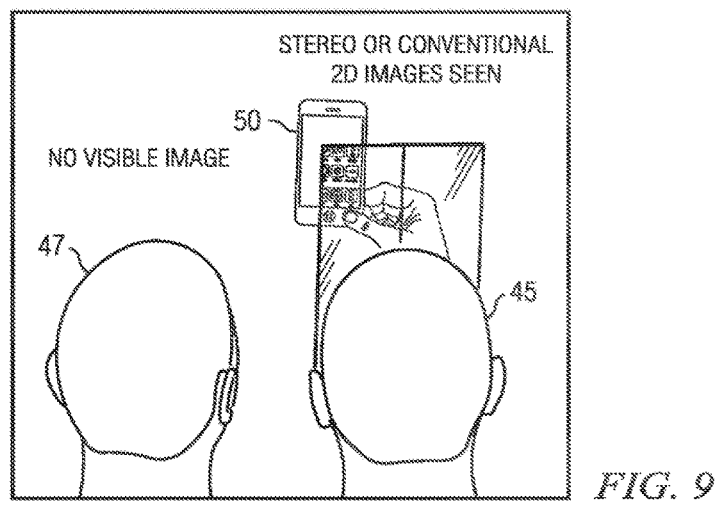
FIG. 9 is a schematic diagram illustrating a privacy directional display device, in accordance with the present disclosure.

FIG. 9 is a schematic diagram illustrating a privacy directional display device which includes an imaging directional backlight. 2D display systems may also utilize directional backlighting for security and efficiency purposes in which light may be primarily directed at the eyes of a first viewer 45 as shown in FIG. 9. Further, as illustrated in FIG. 9, although first viewer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 10:
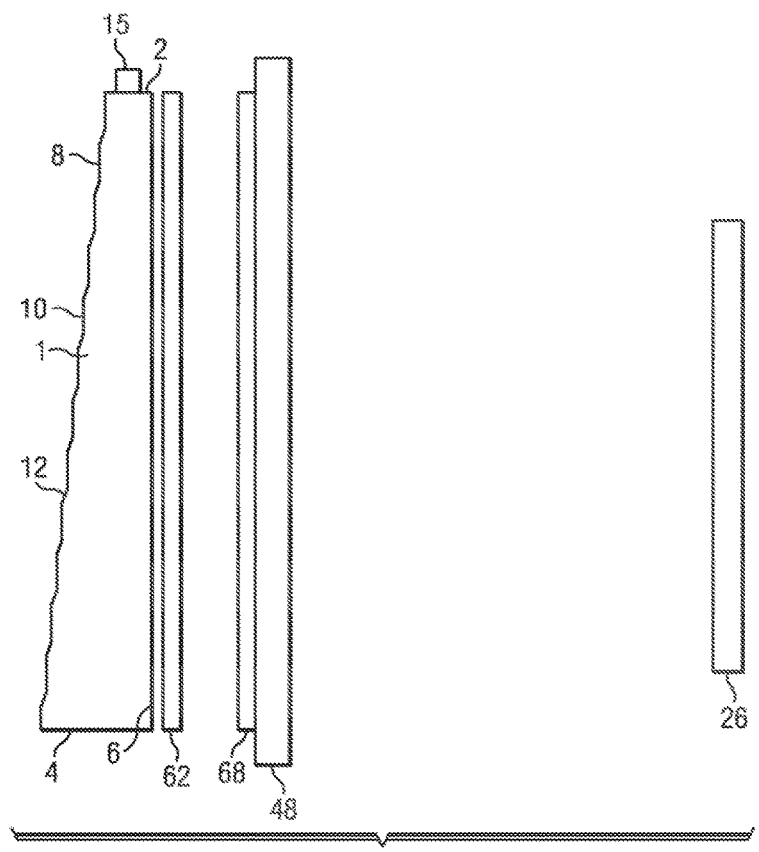
FIG. 10 is a schematic diagram illustrating in side view, the structure of a directional display device, in accordance with the present disclosure.

FIG. 10 is a schematic diagram illustrating in side view the structure of a time multiplexed directional display device as an example including an imaging directional backlight. Further, FIG. 10 shows in side view an autostercoscopic directional display device, which may include the stepped waveguide 1 and a Fresnel lens 62 arranged to provide the viewing window 26 for a substantially collimated output across the stepped waveguide 1 output surface. A vertical diffuser 68 may be arranged to extend the height of the viewing window 26 further. The light may then be imaged through the spatial light modulator 48. The illuminator array 15 may include light emitting diodes (LEDs) that may, for example, be phosphor converted blue LEDs, or may be separate RGB LEDs. Alternatively, the illuminator elements in illuminator array 15 may include a uniform light source and spatial light modulator arranged to provide separate illumination regions. Alternatively the illuminator elements may include laser light source(s). The laser output may be directed onto a diffuser by means of scanning, for example, using a galvo or MEMS scanner. In one example, laser light may thus be used to provide the appropriate illuminator elements in illuminator array 15 to provide a substantially uniform light source with the appropriate output angle, and further to provide reduction in speckle. Alternatively, the illuminator array 15 may be an array of laser light emitting elements. Additionally in one example, the diffuser may be a wavelength converting phosphor, so that illumination may be at a different wavelength to the visible output light.

The above description relates to display devices including a single directional backlight. There will now be described some display devices including plural directional backlights that may in some cases be stacked and in some cases be tiled. However, the individual directional backlights are based on and incorporate the structures of FIGS. 1 to 10 above. Accordingly, except for the modifications and/or additional features which will now be described, the above description applies to the following display devices but for brevity will not be repeated.

Figure 11:
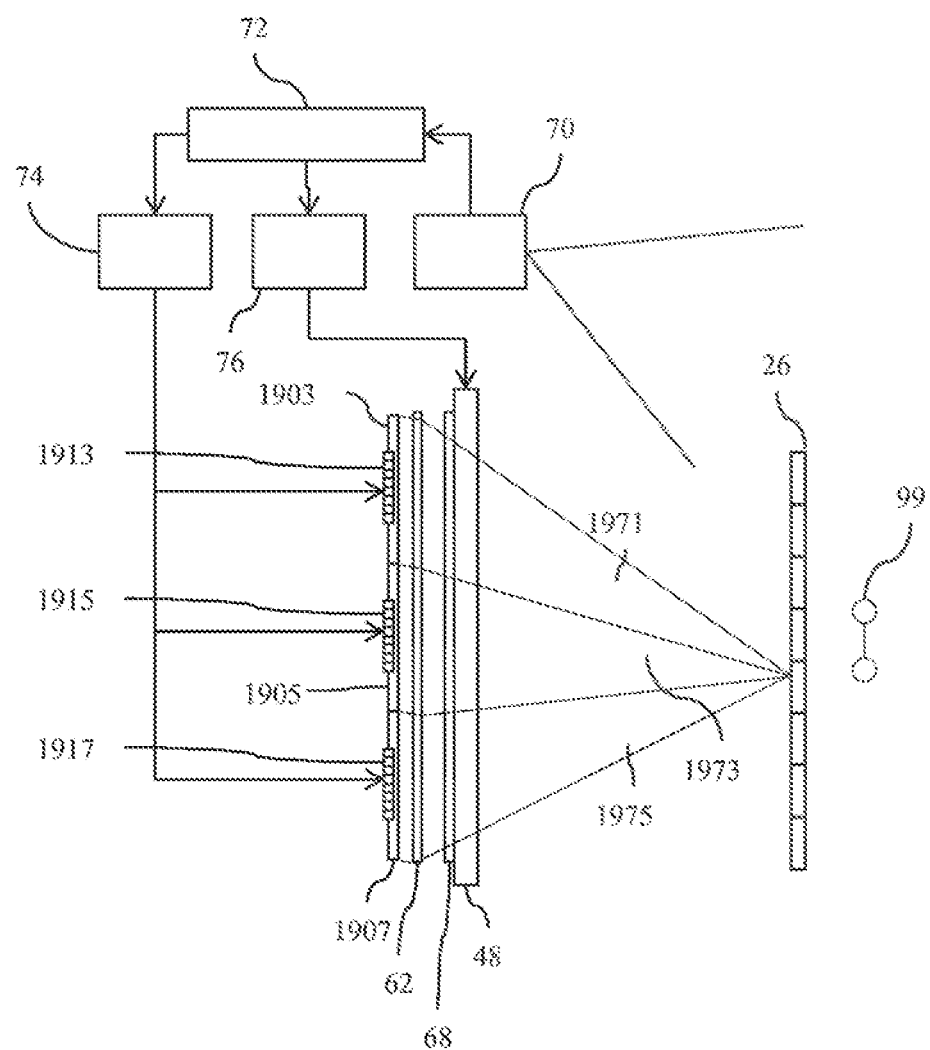
FIG. 11 is a schematic diagram illustrating in side view, directional display apparatus including a control system for a directional display device, in accordance with the present disclosure.

FIG. 11 is a schematic diagram illustrating a directional display apparatus including a display device and a control system. The arrangement and operation of the control system will now be described and may be applied, with changes as necessary, to each of the display devices disclosed herein.

The directional display device includes three directional backlights 1903, 1905, 1907 in this example, although in general there may be any number of directional backlights, such as one, two, three, four, five, and so forth. Each directional backlight 1903, 1905, 1907 includes a respective illuminator array 1913, 1915, 1917. The control system is arranged to selectively operate the illumination elements of the illuminator arrays 1913, 1915, 1917 to direct light into selectable viewing windows.

Each directional backlight 1903, 1905, 1907 includes a waveguide which may be arranged as in the embodiments described below. A Fresnel lens 62 may be provided to direct collimated output light substantially from the directional backlights 1903, 1905, 1907 to the viewing windows, thus pupillating the display output across the output of the directional backlights 1903, 1905, 1907 so that viewing windows from each backlight 1903, 1905, 1907 substantially overlap in a window plane. A transmissive spatial light modulator (SLM) 48 may be arranged to receive the light from the directional backlights 1903, 1905, 1907.

Further a diffuser 68 may be provided to substantially remove Moiré beating between the directional backlights 1903, 1905, 1907 and the pixels of the SLM 48 as well as the Fresnel lens structure.

The control system may include a sensor system arranged to detect the position of the observer 99 relative to the display device 100. The sensor system may include a position sensor 70, such as a camera, and a head position measurement system 72 that may, for example, include a computer vision image processing system.

In FIG. 11, the position sensor 70 may include known sensors including those with cameras and image processing units arranged to detect the position of observer faces. Position sensor 70 may further include a stereo sensor arranged to improve the measure of longitudinal position compared to a monoscopic camera. Alternatively position sensor 70 may include measurement of eye spacing to give a measure of required placement of respective arrays of viewing windows from tiles of the directional display.

The control system may further include an illumination controller 74 and an image controller 76 that are both supplied with the detected position of the observer supplied from the head position measurement system 72.

The illumination controller 74 selectively operates the illuminator elements 15 to direct light to into the viewing windows 26 in cooperation with waveguide 1. The illumination controller 74 selects the illuminator elements 15 to be operated in dependence on the position of the observer detected by the head position measurement system 72, so that the viewing windows 26 into which light is directed are in positions corresponding to the left and right eyes of the observer 99. In this manner, the lateral output directionality of the waveguide 1 corresponds with the observer position.

The image controller 76 controls the SLM 48 to display images. To provide an autosterescopic display, the image controller 76 and the illumination controller 74 may operate as follows. The image controller 76 controls the SLM 48 to display temporally multiplexed left and right eye images. The illumination controller 74 operate the light sources 15 to direct light into viewing windows in positions corresponding to the left and right eyes of an observer synchronously with the display of left and right eye images. In this manner, an autostereoscopic effect is achieved using a time division multiplexing technique.

In operation, light cones 1971, 1973, 1975 may be produced by respective light emitting element illuminator arrays 1913, 1915, 1917 and respective aligned directional backlights 1903, 1905, 1907. As shown in FIG. 11, the light cones 1971, 1973, 1975 direct light to a viewing window 26. Thus the respective illumination of arrays 1913, 1915, 1917 can be modified in response to lateral, vertical (out of page) and longitudinal observer movement.

Advantageously, the light emitting element illuminator arrays 1913, 1915, 1917 of such tiled arrays of waveguides can be addressed to achieve extended longitudinal viewing freedom for tracked observers as will be described below.

In the above embodiments, the image controller 76 may use the observer location data from position sensor 70 and head position measurement system 72 to achieve an image display that varies in response to the observer 99 location. Advantageously this may be used to provide a "look around" facility in which, for example, the image perspective displayed on spatial light modulator 48 may be varied in response to movement of the observer 99.

In an illustrative embodiment in which the spatial light modulator 48 uses a liquid crystal material, and is line by line addressed, the electro optic response characteristics of the LC material may be important. Furthermore the pulsed illumination may interact with the scanning and the LC response in such a way that may result in different appearances of pixels located at different spatial positions on the spatial light modulator 48 even if they were addressed with the same original data. This effect may be eliminated by pre-processing the raw image data to make a correction. A modification of image data may also be made to compensate for predicated crosstalk between left and right views.

Further advantageously the knowledge of the observer 99 location may be used to provide a more effective adjustment of the image data to spatial light modulator 48 in order to compensate for the effects described above.

Figure 12:
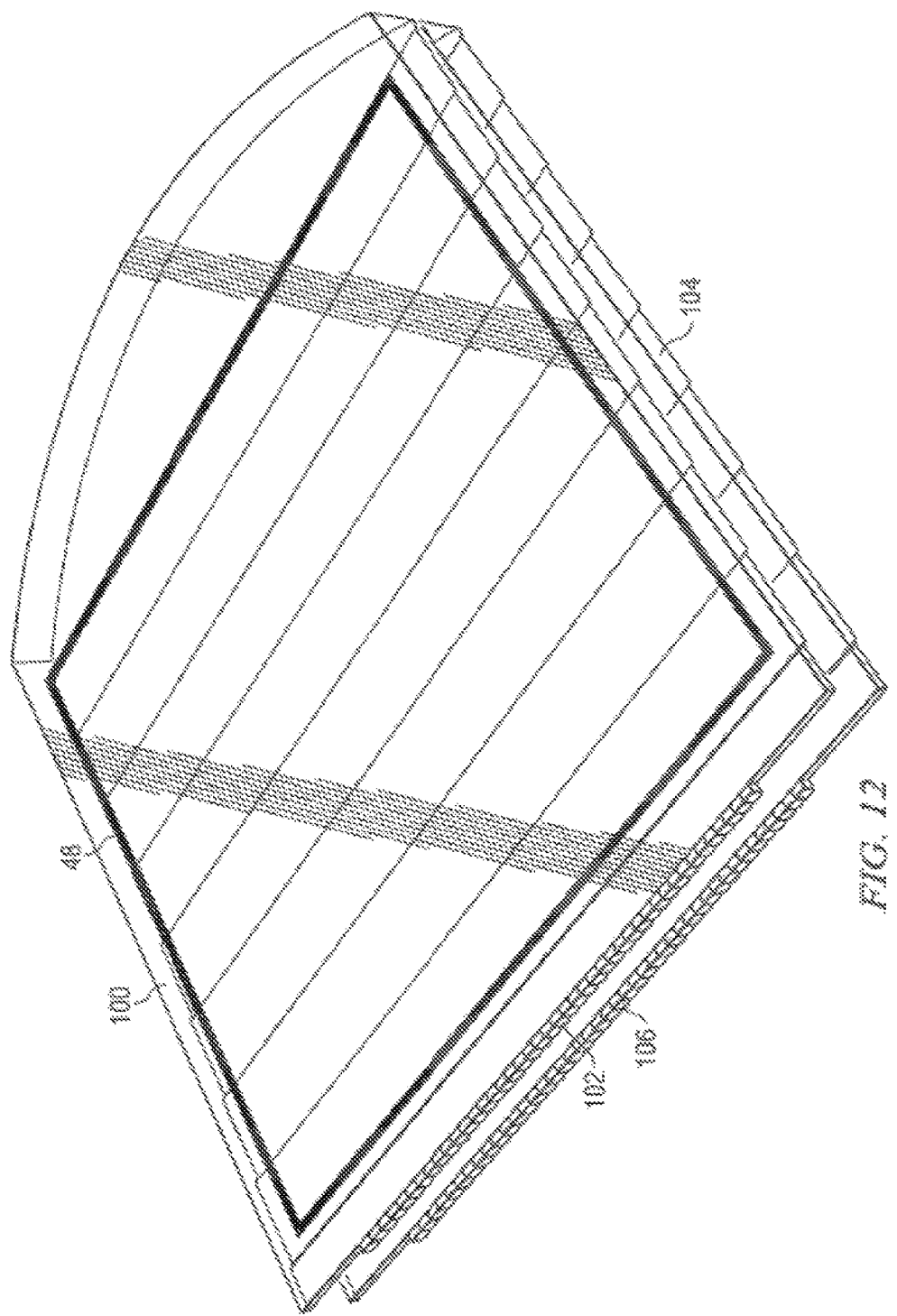
FIG. 12 is a schematic diagram illustrating stacked directional backlights of a directional display device, in accordance with the present disclosure.
Figure 13:
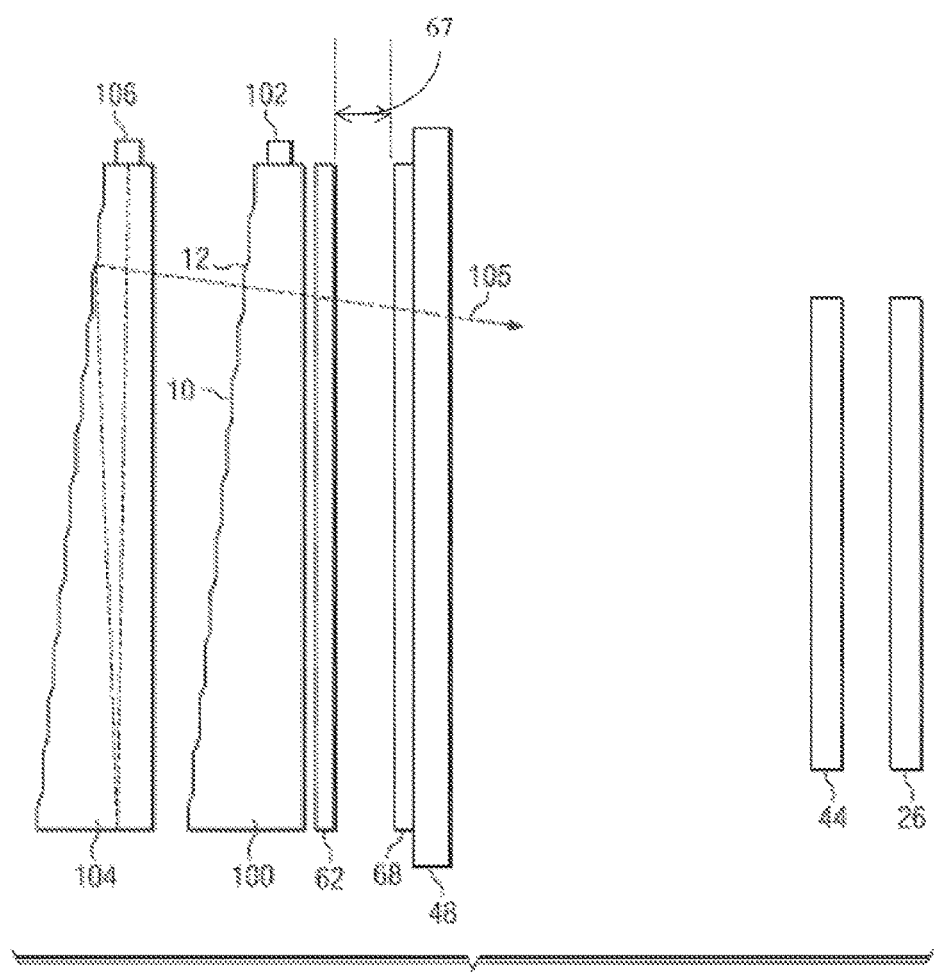
FIG. 13 is a schematic diagram illustrating in side view, a directional display device that provides at least first and second viewing windows, in accordance with the present disclosure.

FIG. 12 is a schematic diagram illustrating stacked directional backlights of a directional display device including at least a first and second stepped waveguide arranged in series and FIG. 13 is a schematic diagram illustrating in side view a directional display device incorporating the stacked directional backlights of FIG. 12. A first embodiment may be provided by a stack of two stepped waveguides such as stepped waveguides 100, 104 and respective light source arrays 102, 106 arranged in series as shown schematically in FIG. 12 and in side view in FIG. 13. A first directional backlight may include the stepped waveguide 100 and the light source array 102 and a second directional backlight may include the stepped waveguide 104 and the light source illuminator array 106. The first and second directional backlight may be stacked behind a spatial light modulator 48. Further as illustrated in FIG. 12, the first and second directional backlights may include a reflective surface. In FIG. 12, the reflective surface is on the curved end of the first and second directional backlights. In one embodiment, the reflective surface or reflective end of either one or both of the stepped waveguides 100, 104 may have positive optical power in a lateral direction across the stepped waveguides 100, 104

As illustrated in FIG. 13, the first and second directional backlights may be stacked behind the spatial light modulator 48. Each of the first and second directional backlights may supply output light through the spatial light modulator 48 and through any other directional backlight which may be intermediate to the first and second directional backlights and the spatial light modulator 48.

In the operation of FIGS. 12 and 13, light from light source array 106 may pass through the stepped waveguide 104 and subsequently may be substantially directed through the stepped waveguide 100. For example as shown in FIG. 13, light ray 105 from light source array 106 after counter propagating in stepped waveguide 104 may be passed through stepped waveguide 100, due to the transparent features 10 of the stepped waveguide 100. The light extraction features 12 of stepped waveguide 100 may further be substantially uncoated to achieve further light transmission through the stepped waveguide 100. Continuing the description of FIG. 13, the directional backlights may be oriented around the normal to the spatial light modulator 48 so that the optical windows provided by the directional backlights may be substantially aligned with each other. Additionally, in FIG. 13, the first guide surfaces of the respective directional backlights may be substantially coplanar with one another, as generally illustrated in FIG. 29.

Advantageously such an arrangement can achieve increased display brightness as each illuminator array 102, 106 may be arranged to provide substantially simultaneous illumination of a viewing window 26 or viewing window 44, depending on the display phase. Although similar increased brightness may be provided by thickening a single illuminator allowing larger sources to be used, there may be an advantage to employing more numerous smaller sources. The greater number of smaller sources may allow for increased uniformity and improved thermal characteristics. Further, the optical output of the two stepped waveguides can be slightly different to improve output optical uniformity in the window plane when the two viewing windows are substantially overlaid or to provide wider vertical viewing angles. For example, losses such as reflection losses arising from transmission through stepped waveguide 100 can be compensated by increasing the relative output luminance of illuminator 106 compared to illuminator 102.

Additionally, in the embodiment of FIGS. 12 and 13 the thicker sides 4 of the guides are arranged together, as are the LEDs, thus resulting in a thick combined structure with LED mechanical interference issues, for example increasing package size and total display thickness.

In one illustrative embodiment, the individual directional backlights may each have a maximum thickness of 2 mm, and may be placed in a stack including Fresnel lens 62 with a combined thickness of for example 5 mm, positioned with a separation 67 to the spatial light modulator 48 and diffuser 68 of 1 mm or less. Alternatively the separation 67 can be increased to greater thicknesses to reduce the appearance of Moiré patterning between the repetitive structures of the Fresnel lens 62, backlights 100, 104 and spatial light modulator 48.

Figure 14:
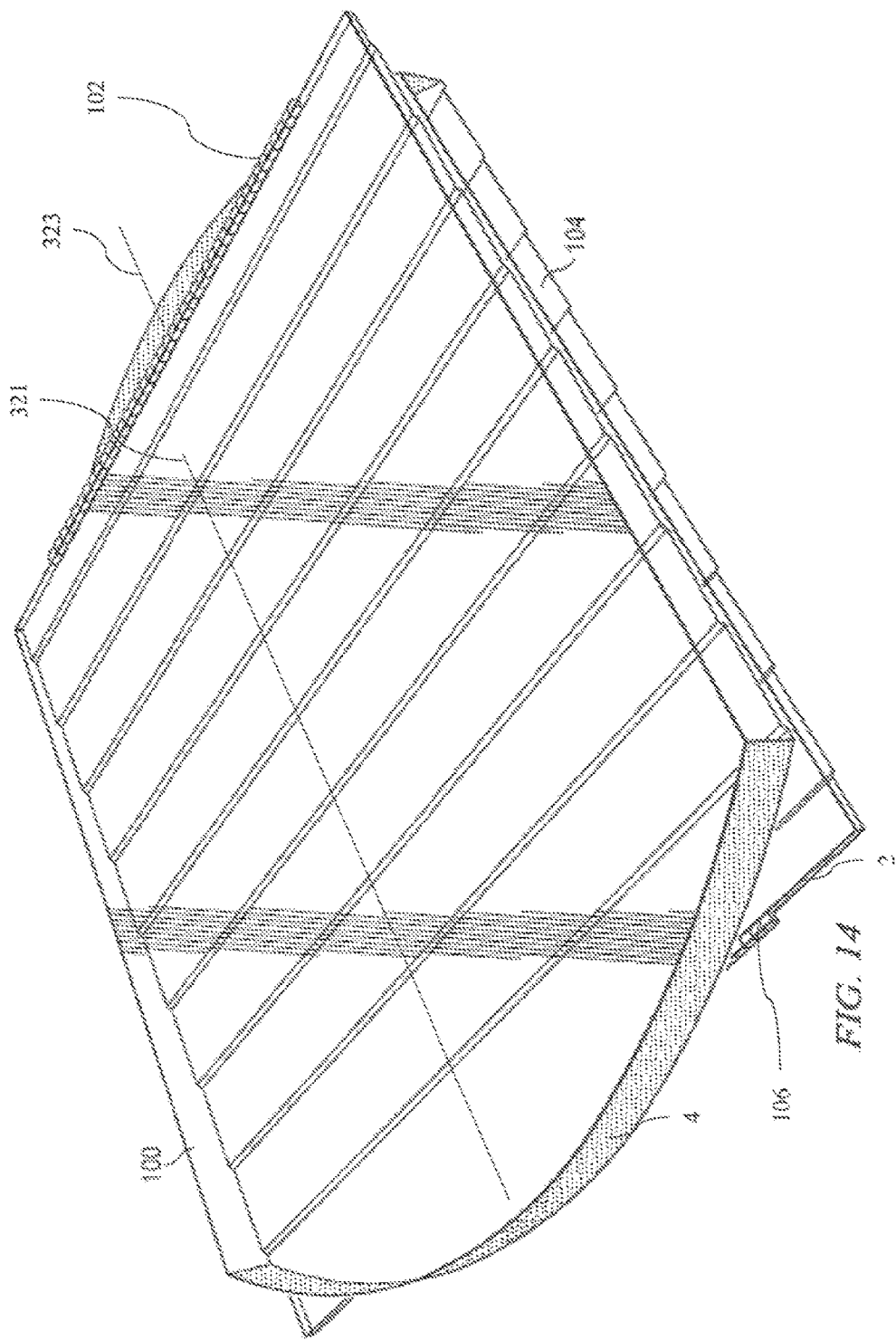
FIG. 14 is a schematic diagram illustrating stacked directional backlights of a directional display device, in accordance with the present disclosure.
Figure 15:
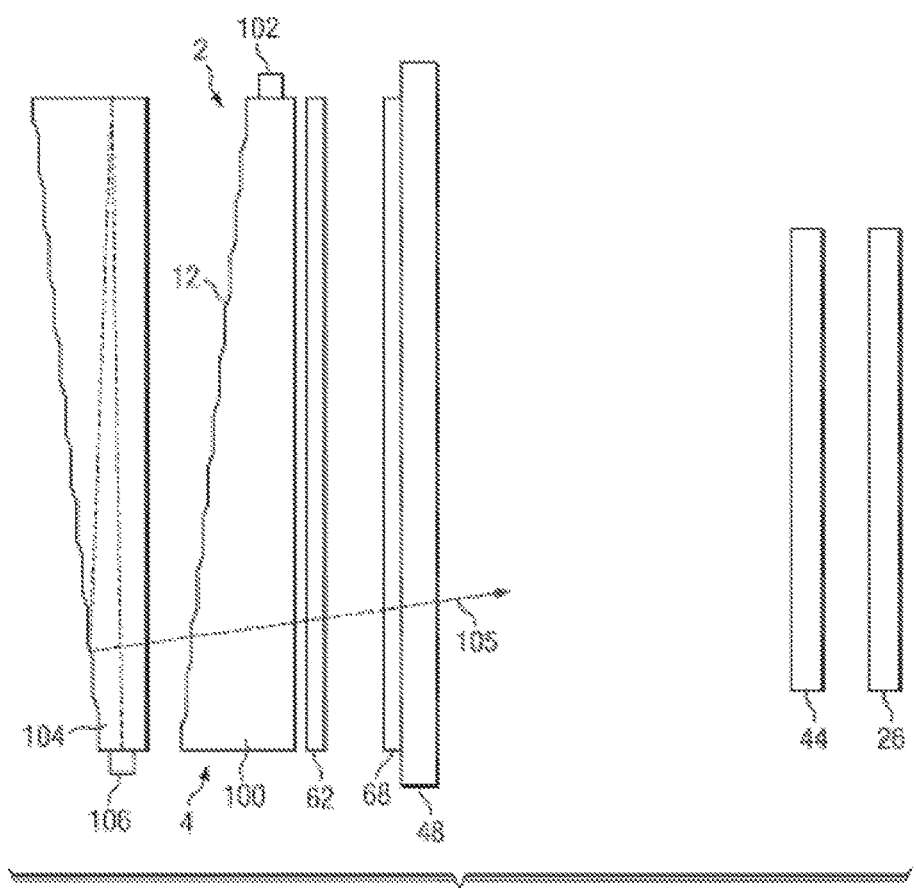
FIG. 15 is a schematic diagram illustrating in side view, a directional display device arranged to provide at least first and second viewing windows, in accordance with the present disclosure.

FIG. 14 is a schematic diagram illustrating stacked directional backlights of a directional display device which includes two stepped waveguides arranged in series and FIG. 15 is a schematic diagram illustrating in side view a directional display device incorporating the stacked directional backlights of FIG. 14 arranged to provide at least first and second viewing windows. This embodiment is similar to that of FIGS. 12 and 13 except for the following modifications. As illustrated in FIGS. 14 and 15, the directional backlights may be arranged in inverted orientations around the normal to the spatial light modulator 48 with the input end 2 of each directional backlight on the same side as the reflective end 4 of the other directional backlight. In FIGS. 14 and 15, the directional backlights 100 and 104 may have reflective ends 4 and input ends 2. In the embodiment of FIGS. 14 and 15, the directional backlight 100 may be oriented such that the reflective end 4 may be on the same side as the input end 2 of the directional backlight 104.

As shown in FIG. 14, a first directional backlight may include the stepped waveguide 100 and the light source array 102 and a second directional backlight may include the stepped waveguide 104 and the light source illuminator array 106 The first and second directional backlight may be stacked behind a spatial light modulator 48. Further as illustrated in FIG. 14, the first and second directional backlights may include a reflective surface. In FIG. 14, the reflective surface is on the curved end of the first and second directional backlights. In one embodiment, the reflective surface or reflective end 4 of either one or both of the stepped waveguides 100, 104 may have positive optical power in a lateral direction across the stepped waveguides 100, 104.

As illustrated in FIG. 14, the first and second directional backlights may be stacked behind the spatial light modulator. Each of the first and second directional backlights may supply output light through the spatial light modulator and through any other directional backlight which may be intermediate to the first and second directional backlights and the spatial light modulator.

Continuing the description of FIG. 14, the directional backlights may be oriented around the normal to the spatial light modulator so that the optical windows provided by the directional backlights may be substantially aligned with each other. Additionally, in FIG. 14, the first guide surfaces of the respective directional backlights may be substantially coplanar with one another, as generally illustrated in FIG. 29.

Further, FIG. 15 shows the stack in side view in which light ray 105 propagates through the stepped waveguide 100 and the stepped waveguides may be arranged inverted with respect to each other. Advantageously this embodiment may provide physically separated LED arrays 102, 106. The embodiment of FIG. 15 may achieve improved thermal control as the thermal management of the LED arrays 102, 106 may be physically separated. Further, better vertical angular uniformity can be achieved through approximate symmetry of output cone directions when the light extraction features are uncoated. Since most to substantially all light travels back from the thick end 4 to thin end 2 and may be extracted when the light is incident on a light extraction feature 12, the light that makes it back to the thin side 2 without encountering extraction may be lost to the system. The ratio of height of the thin side 2 to thick side 4 is a measure of an efficiency factor. By way of comparison, using a single stepped waveguide and doubling the thin end to enable twice the source emission can only be as efficient if the side 4 thickness is increased accordingly. The present embodiment may provide approximately twice the light with a much smaller overall thickness increase. Further, advantageously the horizontally aligned light extraction features 12 may use reflection as a means of extraction. Any angular variation in reflection such as that seen with total internal reflection (TIR) may introduce significant vertical angular variation in illumination. Inverse stacking may provide vertical symmetry, which may result in a more uniform intensity in the vertical viewing window.

FIG. 16 is a schematic diagram illustrating stacked directional backlights of a directional display device which includes three stepped waveguides arranged in series to provide respective red, green and blue illumination directions for illumination of a transmissive spatial light modulator and FIG. 17 is a schematic diagram illustrating in side view a directional display device incorporating the stacked directional backlights of FIG. 16. The directional backlights may include at least a stepped waveguide and a light source illuminator array. This embodiment is similar to that of FIGS. 12 and 13 except for the following modifications.

As shown in FIG. 16, a first directional backlight may include the stepped waveguide 108 and the light source array 110, a second directional backlight may include the stepped waveguide 112 and the light source illuminator array 114, and a third directional backlight which may include the stepped waveguide 116 and the light source illuminator array 118. In one example, at least the first, second, and third directional backlights may be stacked behind a spatial light modulator 48. Further as illustrated in FIG. 16, the first, second, and third directional backlights may include a reflective surface. In FIG. 16, the reflective surface is on the curved end of the first, second, and third directional backlights. In one embodiment, the reflective surface or reflective end 4 of either one or any combination thereof of the stepped waveguides 108, 112, 116 may have positive optical power in a lateral direction across the stepped waveguides 108, 112, 116.

As illustrated in FIG. 16, the first, second, and third directional backlights may be stacked behind the spatial light modulator 48. Each of the first and second directional backlights may supply output light through the spatial light modulator 48 and through any other directional backlight which may be intermediate to the first and second directional backlights and the spatial light modulator.

Continuing the description of FIG. 16, the directional backlights may be oriented around the normal to the spatial light modulator 48 so that the optical windows provided by the directional backlights may be substantially aligned with each other. Additionally, in FIG. 16, the first guide surfaces of the respective directional backlights may be substantially coplanar with one another, as generally illustrated in FIG. 29.

In one embodiment, with respect to each of the directional backlights, an array of light sources may be located at different input positions across the input end of the respective waveguide.

In another embodiment, the directional backlights may be oriented around the approximate normal to the spatial light modulator so that the optical windows provided by the directional backlights may be approximately aligned with each other and the array of light sources in respect of each directional backlight may be arranged to output light of a different color.

As shown in FIG. 17, a transmissive SLM 48 may be, in turn, illuminated by a stepped waveguide 108 illuminated by a red LED light source array 110; a second stepped waveguide 112 may be illuminated by a green LED light source array 114 and a third stepped waveguide 116 may be illuminated by a blue LED light source array 118. Each viewing window may be provided by a summation of the light from the respective LEDs in the arrays 110, 114, 118. Blue ray 117 and green ray 115 may pass through at least one stepped waveguide of the stack because of the advantageous transparency properties of the stepped waveguide structure. As shown in FIGS. 14 and 15, the stepped waveguide 112 may be inverted to reduce the mechanical size and improve the thermal management of the respective LED light source array 114. In further embodiments, two or more stepped waveguide units may be used. For example a first stepped waveguide may include a green light source array while a second stepped waveguide may include a red and blue light source array. Advantageously such an embodiment can achieve compensation for the reduced luminous emittance of green inorganic LEDs.

Advantageously, separate color LEDs can be provided compared to the white LEDs typically used in other embodiments. Separate color LEDs may achieve a higher spectral gamut and may operate with high efficiency. By way of comparison, if the separate red, green and blue LEDs were combined into a single illumination array for a single stepped waveguide, the total display luminance that can be achieved may be reduced due to the limited size of the input aperture on the narrow side 2 of the respective stepped waveguide.

FIG. 18 is a schematic diagram in top view, a detail of one embodiment of spatial light modulator of FIG. 16 arranged to achieve efficient illumination of red, green, and blue pixels of the respective spatial light modulator. Further, FIG. 18 shows an embodiment in which the directional red, green and blue illumination of the respective stepped waveguides 108, 112, 116 can be used to illuminate a monochromatic SLM 49. A microlens array 120 is provided in approximate alignment with red pixels 122, green pixels 124 and blue pixels 126. Red stepped waveguide 108 may provide a substantially collimated wavefront with direction 129 and which may be focused into a light cone 128 incident onto red data pixels 122; green stepped waveguide 112 may provide a substantially collimated wavefront with direction 127 which may be focused into a light cone 130 incident onto green data pixels 124; and blue stepped waveguide 116 may provide a substantially collimated wavefront with direction 131 which may be focused into a light cone 132 incident onto blue data pixels 126. A final diffuser 134 may be provided to enable some color mixing and redistribution of light output cones to achieve a wider panel viewing angle. Alternatively, the red, green and blue LEDs can be arranged in series at the input aperture on the narrow side 2 of a single stepped waveguide to provide a more compact arrangement. Advantageously this embodiment may remove the requirement for individual color filters in the SLM and so can achieve higher efficiency.

Figure 20A:
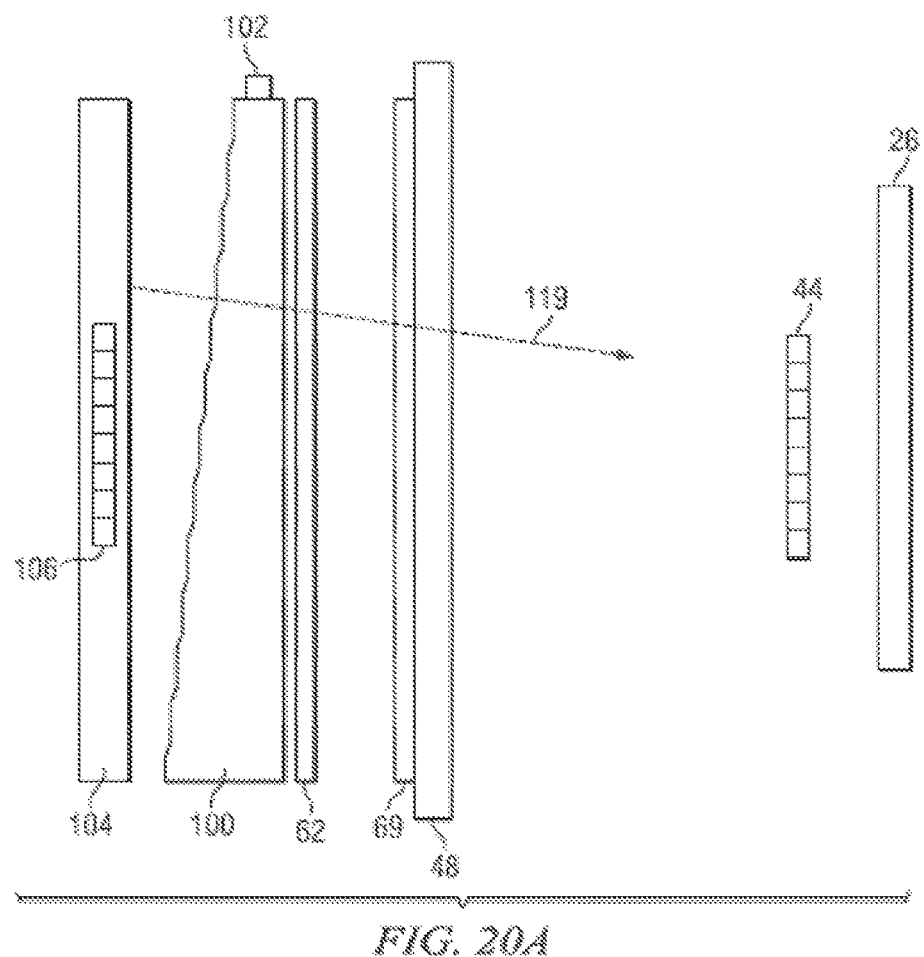
FIG. 20A is a schematic diagram in side view, a directional display device including two directional backlights arranged in series to provide landscape and portrait autostereoscopic viewing, in accordance with the present disclosure.

FIG. 19 is a schematic diagram of stacked directional backlights of a directional display device that includes two stepped waveguides arranged in series to provide landscape and portrait autostereoscopic viewing and FIG. 20A is a schematic diagram in side view of a directional display device incorporating the stacked directional backlights of FIG. 19. Further, FIG. 19 shows an embodiment schematically and FIG. 20A shows in side view the embodiment including a crossed stack of stepped waveguides, each of which may provide a substantially one dimensional array of viewing windows. This embodiment is similar to that of FIGS. 12 and 13 except for the following modifications.

The first directional backlight of FIGS. 19 and 20A may include a stepped waveguide 100 and a light source illuminator array 102 and the second directional backlight may include a stepped waveguide 104 and a light source illuminator array 106. As illustrated in FIGS. 19 and 20A, the first and second directional backlights are approximately oriented around the normal to the spatial light modulator 48 so that the sets of optical windows 26 and 44 provided by the first and second directional backlights may extend at an angle relative to each other in a range from 85 to 95 degrees. The limits of this range are approximate.

As shown in FIG. 19, a first directional backlight may include the stepped waveguide 100 and the light source array 102 and a second directional backlight may include the stepped waveguide 104 and the light source illuminator array 106. The first and second directional backlight may be stacked behind a spatial light modulator. Further as illustrated in FIG. 19, the first and second directional backlights may include a reflective surface. In FIG. 19, the reflective surface is on the curved end of the first and second directional backlights. In one embodiment, the reflective surface or reflective end of either one or both of the stepped waveguides 100, 104 may have positive optical power in a lateral direction across the stepped waveguides 100, 104.

As illustrated in FIG. 19, the first and second directional backlights may be stacked behind a spatial light modulator. Each of the first and second directional backlights may supply output light through the spatial light modulator and through any other directional backlight which may be intermediate to the first and second directional backlights and the spatial light modulator.

Continuing the description of FIG. 19, the directional backlights may be oriented around the normal to the spatial light modulator so that the optical windows provided by the directional backlights may be substantially aligned with each other. Additionally, in FIG. 19, the first waveguide surfaces of the respective directional backlights may be substantially coplanar with one another, as generally illustrated in FIG. 29. Additionally the optical axes 321, 323 of respective stacked directional backlights 100, 104 are arranged to be substantially orthogonal.

As shown in FIG. 20A, stepped waveguide 100 may be arranged to transmit light rays 119 from the stepped waveguide 104 without substantially altering the directionality of the light rays. Thus, a first set of viewing windows 26 can be provided by stepped waveguide 100 while a second set of viewing windows 44 can be provided by the stepped waveguide 104 that may be inclined to, for example approximately orthogonal to, the viewing windows 26. The Fresnel lens 62 may have approximately rotational symmetry, while a weak rotationally symmetric diffuser 69 may be provided to improve viewing window uniformity.

Advantageously the arrangement of FIGS. 19 and 20A may provide a switchable landscape-portrait mode of operation. When illuminator 102 is switched on, a tracked landscape autostereoscopic mode can be produced. In one example, if an observer rotates a handset (not illustrated in FIGS. 19 and 20A), the viewing orientation may be sensed as having changed and the illuminator 102 may be switched off and illuminator 106 may be switched on. Further, the image data may be rotated on the panel. In this manner, a full resolution observer tracked autostereoscopic display may be provided in both panel orientations.

[Adapt to Use Wording Consistent with Claims 11 and 12]

Figure 20B:
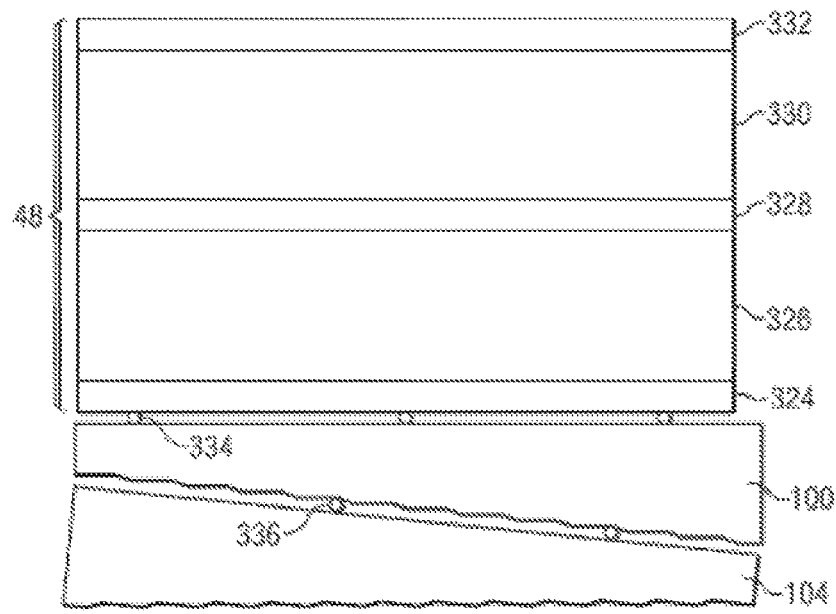
FIG. 20B is a schematic diagram in side view a directional display device including two directional backlights arranged in series with a spatial light modulator, in accordance with the present disclosure.

FIG. 20B is a schematic diagram in side view a stacked imaging directional backlight apparatus including two stepped waveguides arranged in series with a spatial light modulator. As illustrated in FIG. 20B, a first directional backlight may include at least a stepped waveguide 100 and a second directional backlight may include at least a stepped waveguide 104. Similar to the embodiment of FIGS. 14 and 15, the stepped waveguides 100 and 104 may be arranged in inverted orientations around the normal to the spatial light modulator with the input end of each stepped waveguide on the same side as the reflective end of the other stepped waveguide. Stated differently, the stepped waveguide 100 may be oriented such that the reflective end may be on the same side as the input end of the stepped waveguide 104. Additionally, in FIG. 20B, the first guide surfaces of the respective directional backlights may be substantially coplanar with one another, as generally illustrated in FIG. 29. Further as illustrated in FIG. 20B, the facing waveguide surfaces of the directional backlights may be arranged in inverted orientations and may extend in a generally parallel direction.

Further, FIG. 20B shows an embodiment arranged to reduce the package thickness of the stack. Spacer elements 334, 336 may be arranged between the spatial light modulator 48 and the stepped waveguide 100, and between adjacent stepped waveguides 100, 104 respectively. The spacer elements 334, 336 may be, but are not limited to, spacer balls, adhesive spacer balls, may be photospacers or may be linear in form, and so forth. Further, the spacer elements may be formed with the stepped waveguide during molding. Advantageously such spacer elements may achieve an air gap between the structures while minimizing the gap and maintaining flat surfaces. The size of the features may be small enough to have reduced visibility and scattering during operation, and in one example may be spheres or cylinders with diameters of approximately 25 micrometers.

Figure 20C:
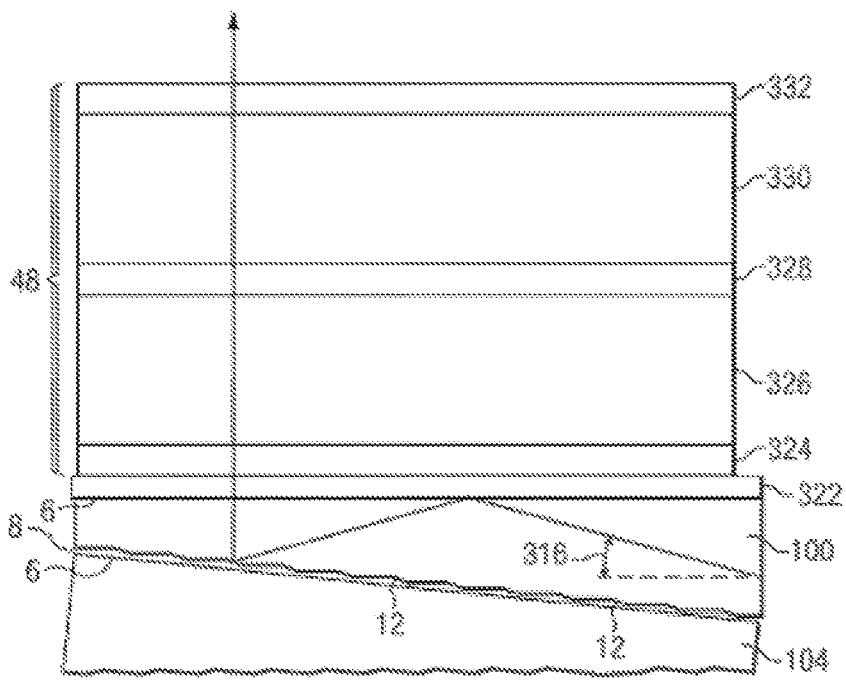
FIG. 20C is a schematic diagram in side view, and further illustrates a directional display device including two directional backlights arranged in series with a spatial light modulator, in accordance with the present disclosure.

FIG. 20C is a schematic diagram in side view and further illustrates stacked directional backlights of a directional display device which includes two stepped waveguides arranged in series with a spatial light modulator. Further, FIG. 20C shows a stepped waveguide stack including a low refractive index coating 322 between the stepped waveguide 100 and a spatial light modulator 48 which may include a liquid crystal display including polarizers 324, 332, substrates 326, 330 and switchable liquid crystal layer 328. A limited cone angle 316 may be provided within the stepped waveguide 100 so that the critical angle that can be provided at the surface of the stepped waveguide 100 at the side 6 is increased. In an illustrative example, a total cone angle of approximately 26° may be guided within a stepped waveguide with the critical angle at the surface interface of side 6 of less than approximately 77°. Such an interface may, for example, be provided by a bulk refractive index of the stepped waveguide 1 of approximately 1.5, with a low index coating layer 322 of approximate refractive index 1.4, providing a critical angle of approximately 71°. For example, material of layer 322 may include, but is not limited to, a silicone, an aerogel, a fluorinated polymer, and so forth. Advantageously such an arrangement may provide a reduced thickness device that may be mechanically stabilized by the liquid crystal panel. Further light losses due to Fresnel reflections may be minimized for the output light from the extraction features 12 (not shown in FIG. 20C), thus reducing cross talk in the display system.

Further, the side 6 of stepped waveguide 104 may contact the cusps of light extraction features 12 in side 8 of stepped waveguide 100 to provide a low package thickness with low coupling between the respective stepped waveguides. Advantageously these embodiments may provide low total package thicknesses.

FIG. 21A is a schematic diagram illustrating tiled directional backlights of a directional display device which includes two stepped waveguides arranged to achieve increased illumination area, and FIG. 21B is a schematic diagram illustrating in side view, a directional display device incorporating the tiled directional backlights of FIG. 21A.

As shown in FIGS. 21A and 21B, the directional backlights may include the stepped waveguides 100, 104, and light source illuminator arrays 102 and 106 respectively. As shown in FIG. 21B, the directional backlights may be tiled behind the display 48, which in one example, may be a spatial light modulator. Additionally as illustrated in FIG. 211B, the directional backlights may be tiled behind a diffuser 68 and a Fresnel lens 62 and may supply output light through different regions of the SLM 48. The diffuser 68 and the Fresnel lens may be omitted, used individually, or in combination in the tiled imaging directional backlight apparatus of FIG. 21B. Continuing the description of FIGS. 21A and 21B, the directional backlights may be tiled in the direction of the optical axis of the stepped waveguides 100 and 104 so as to supply output light through different regions of the SLM 48. The stepped waveguide 100 may have a reflective end and the reflective end of the stepped waveguide 100 may overlap the stepped waveguide 104. The reflective end of the directional backlight may have positive optical power in the direction across the waveguide.

Thus the optical axes 321, 323 of the directional backlights 100, 104 are aligned and parallel and the first and second directional backlights 100, 104 may be tiled in a direction perpendicular to the lateral direction. Stated differently, the first and second directional backlights 100, 104 may be tiled in the direction of the optical axes 321, 323 of the waveguides 100, 104.

Further, a tiled imaging directional backlight embodiment is shown schematically in FIG. 21A and in side view in FIG. 21B in which the stepped waveguides 100, 104 are provided with curved end sections and offset to achieve differential top and bottom panel illumination. This configuration may achieve higher brightness at a given thickness over a single stepped waveguide as well as allowing independent local illumination for improved contrast and efficiency. The stepped waveguides 100, 104 may be arranged with side 6 of stepped waveguide 104 inclined to the display 48 for example as shown, or may be parallel. Advantageously inclined elements may provide a lower total thickness. As will be described with reference to FIG. 32, such an arrangement can further provide improved cross talk and brightness in scanned time sequential autostereoscopic displays. As will be described with reference to FIG. 28C, the sides of the respective optical valves may include Fresnel reflectors to reduce the surface sag, advantageously reducing the visibility of the seam between the respective stepped waveguides 100, 104.

FIG. 22 is a schematic diagram illustrating an array of tiled directional backlights including rows of stepped waveguides. Further, FIG. 22 shows schematically an array 201 of stepped waveguides 101 including rows 203, 205, 207 of stepped waveguides 101. Similar to the directional backlights of FIGS. 21A and 21B, the directional backlights of FIG. 22 may include stepped waveguides. The stepped waveguides 101 of FIG. 22 may be tiled in both the lateral direction and in a direction perpendicular to the lateral direction, so as to supply output light through different regions of the SLM 48.

First and second rows are offset by half the length of a stepped waveguide thus provide joins in different locations. When combined with a diffuser 68 separated from the array 201, as shown in FIG. 21B, the output of the respective stepped waveguides may be overlapped to reduce the visibility of luminance differences between the respective stepped waveguides, advantageously increasing display uniformity over a large area. A first tiled stepped waveguide array such as that shown in FIG. 22 may also be stacked with a second tiled stepped waveguide array. The joins between the respective first and second tiled arrays can be offset so as to advantageously reduce the intensity variation between the respective tiles of the waveguides.

Figure 23:
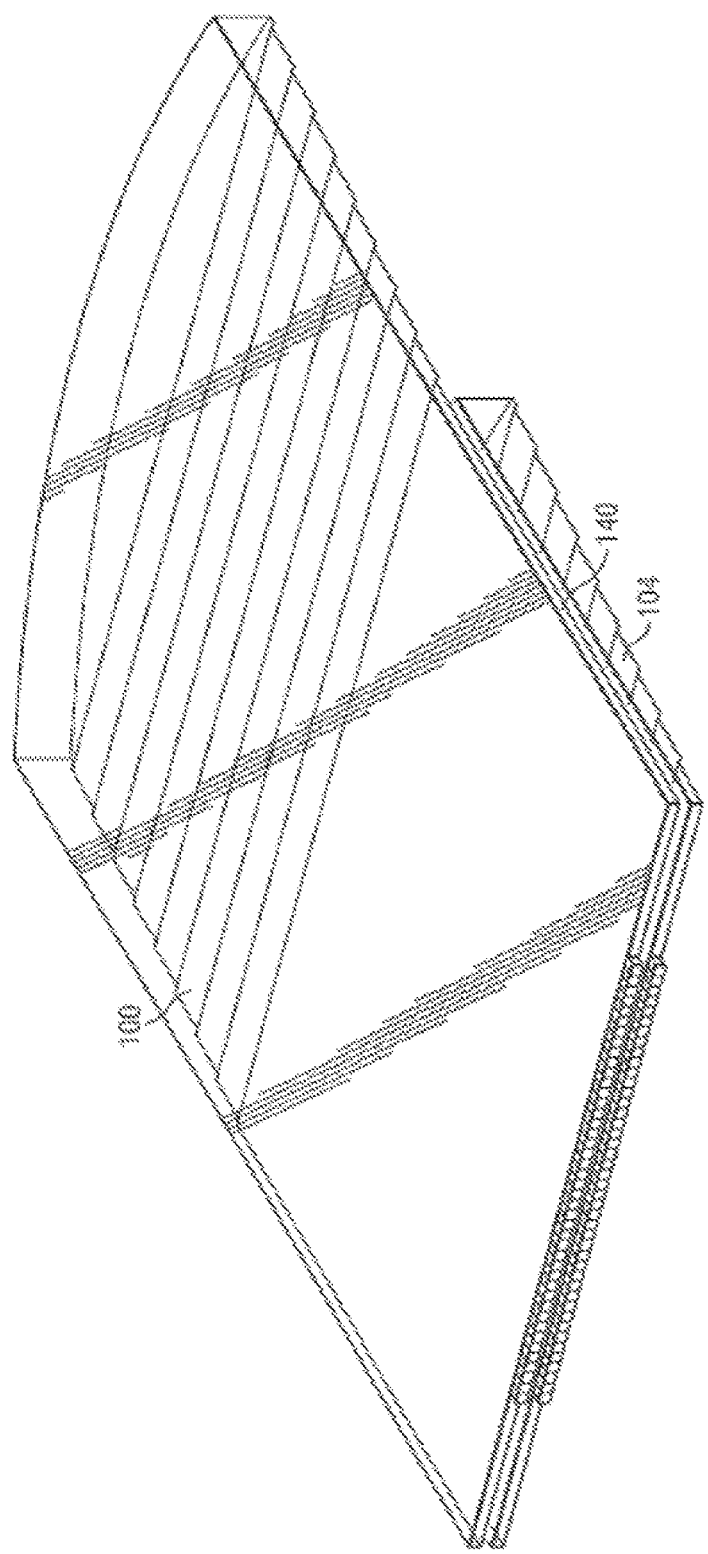
FIG. 23 is a schematic diagram illustrating tiled directional backlights of a directional display device arranged to achieve increased illumination area, in accordance with the present disclosure.

FIG. 23 is a schematic diagram illustrating tiled directional backlights of a directional display device which includes two stepped waveguides arranged to achieve increased illumination area, and FIG. 24 is a schematic diagram illustrating in side view, directional display device incorporating the tiled directional backlights of FIG. 23. Further, FIG. 23 shows schematically and FIG. 24 shows in side view a further arrangement of the tiled stepped waveguides. The arrangement is similar to that of FIGS. 21A and 21B but with the following modifications. The first and second directional backlights 100, 104 may be tiled in a direction perpendicular to the lateral direction. However, stepped waveguide 100 has a further parallel input section planar waveguide 140 incorporated at the input surface such that light from light source illuminator array 102 is directed towards the valve section without substantial loss prior to expanding in the wedge section as for a standard stepped waveguide. Light from the stepped waveguide 104 then passes through the input section planar waveguide 140 without substantially modifying directionality.

FIG. 25 is a schematic diagram illustrating in side view tiled directional backlights of a directional display device which includes two stepped waveguides arranged to achieve increased display area, and FIG. 26 is a schematic diagram illustrating in side view tiled directional backlights of a directional display device which includes two stepped waveguides arranged to achieve increased display area. Further, FIG. 25 shows a side view of an arrangement similar to that of FIG. 24 but in which the order of the components is reversed. Advantageously such an arrangement may reduce light loss due to Fresnel reflections of light transmitted through the section 104 in FIG. 24. Additionally, FIG. 26 shows a further embodiment of an arrangement similar to that of FIG. 24 but wherein an additional backlight including stepped waveguide 103 and light source array 105 may advantageously increase display size and brightness, together with cross talk reduction.

FIG. 27 is a schematic diagram illustrating tiled directional backlights of a directional display device which includes two stepped waveguides arranged to achieve increased illumination area, and FIG. 28A is a schematic diagram illustrating in side view the tiled imaging directional backlights. The arrangement is similar to that of FIGS. 23 and 24 but with the following modifications. Further, FIG. 27 shows schematically and FIG. 28A shows in side view an inverted arrangement of stepped waveguides 100, 104 incorporating parallel input section planar waveguides 140, 142 respectively. Advantageously the optical properties of the two stepped waveguides may be matched to provide improved display uniformity.

Advantageously the arrangements of FIGS. 23 to 28A may achieve a reduction in Moiré beating between the light extraction features of the first stepped waveguide 100 and the second stepped waveguide 104, while substantially maintaining brightness of the output. Further the LED light source illuminator arrays 102, 106 are substantially coplanar so can be conveniently arranged on a single heat sink and electrical connection apparatus.

FIG. 28B is a schematic diagram illustrating in side view tiled directional backlights of a directional display device which includes two stepped waveguides arranged to achieve increased display area. Light extraction side 143 (including features 10, 12) of at least the upper stepped waveguide may be provided with a reflective coating such as a metallized layer. Light extraction side 145 (including features 10, 12) of the lower stepped waveguide may also be provided with a reflective coating. An overlap region 147 may be provided between the upper and lower extraction regions. Advantageously such an arrangement may achieve a substantially continuous output illumination uniformity. Region 147 may achieve uniform output over a wide cone angle while achieving a desired separation between upper and lower stepped waveguides.

Figure 28C:
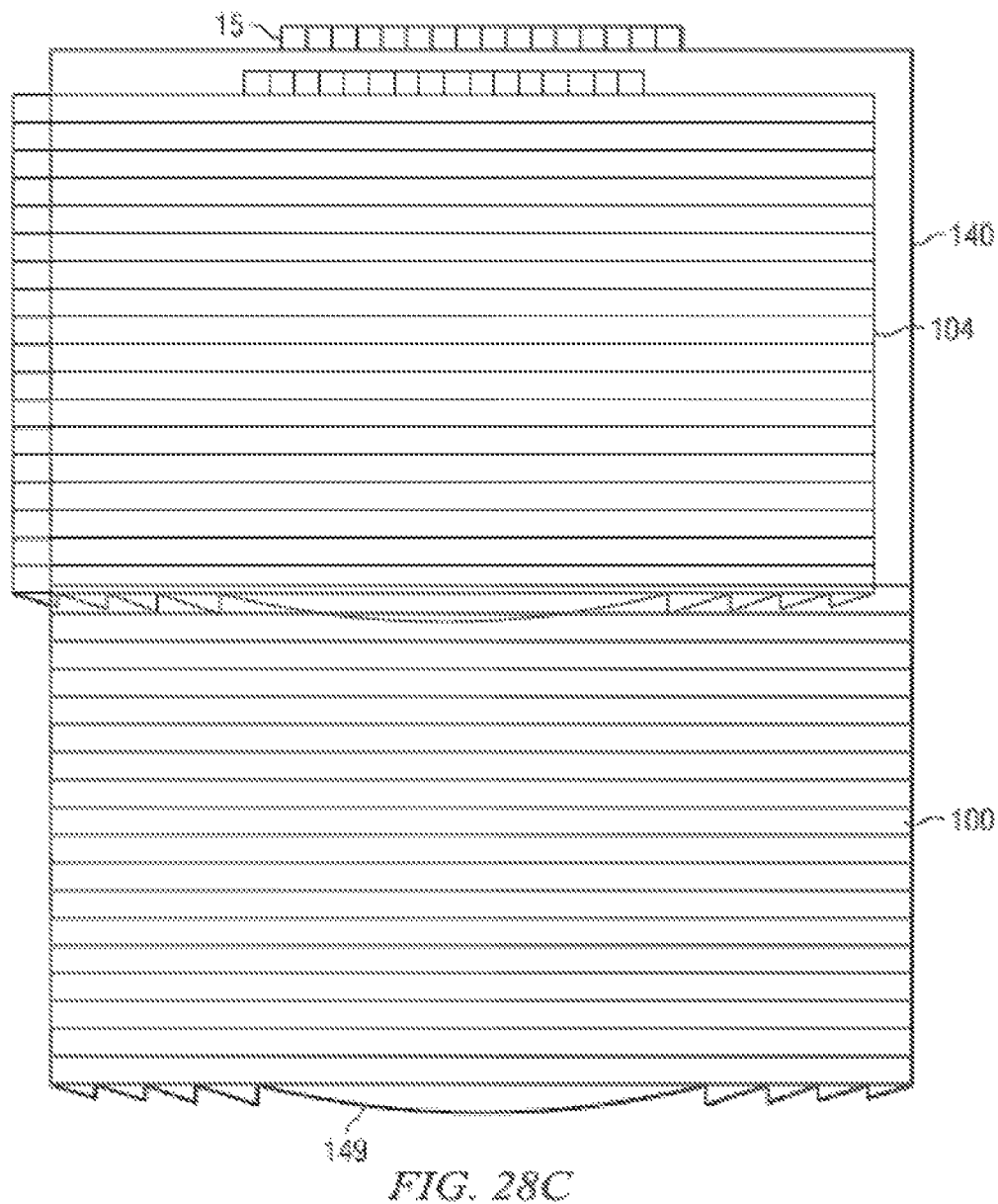
FIG. 28C is a schematic diagram illustrating tiled directional backlights of a directional display device arranged to achieve increased display area, in accordance with the present disclosure.

FIG. 28C shows a further embodiment of a stepped waveguide for stacking in tiling. Side 4 includes a Fresnel lens structure 149 arranged to reflect and focus light from the illuminator array 15. Advantageously such an arrangement can achieve a reduction in the size of the end reflector, reducing package size and visibility of seams in stacking and tilting arrangements.

FIG. 29 is a schematic diagram illustrating an array of tiled directional backlights of a directional display device. Further, FIG. 29 shows schematically another embodiment in which multiple valves or directional backlights are arranged tiled in both the lateral direction and the direction perpendicular thereto. Similar to the directional backlights of FIGS. 21A and 21B, the directional backlights of FIG. 29 may include stepped waveguides. The stepped waveguides of FIG. 29 may be tiled in both the lateral direction and the direction perpendicular thereto.

As shown in FIG. 29, the multiple stepped waveguides may be tiled in an array 150 and aligned to display 48 to advantageously achieve a large area illumination of the observer 45. The display 48 may provide a first viewing window 44 and a second viewing window 26. The first viewing window 44 may provide an image to the right eye of the observer 45 and the second viewing window 26 may provide an image to the left eye of the observer 45.

Figure 30:
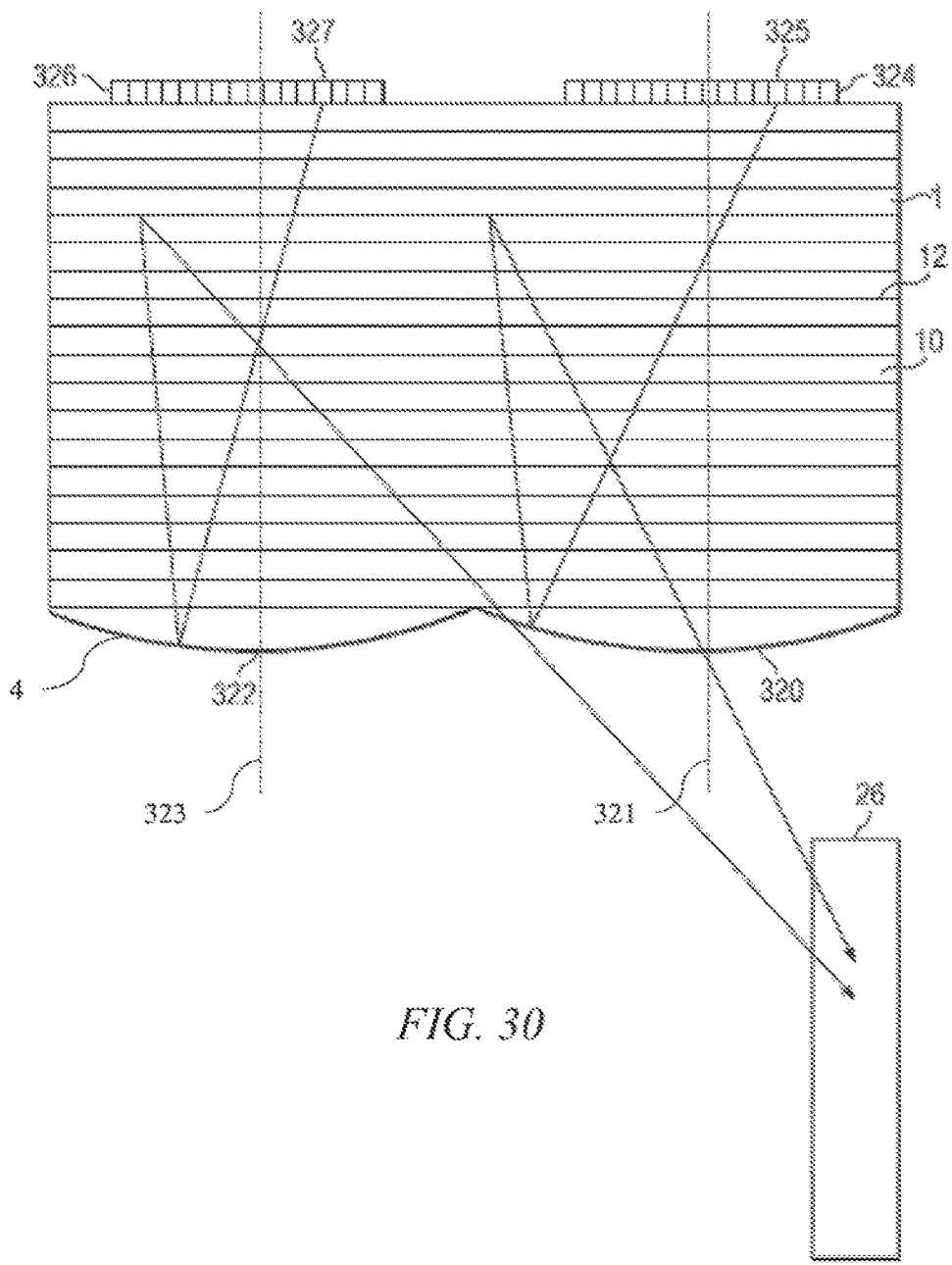
FIG. 30 is a schematic diagram illustrating propagation of light in an array of directional backlights, in accordance with the present disclosure.

FIG. 30 is a schematic diagram illustrating propagation of light in an array of tiled directional backlights. Further, FIG. 30 shows schematically a stepped waveguide in which the side 4 includes first and second reflectors 320, 322, respectively. Similar to the directional backlights of FIGS. 21A and 21B, the directional backlights of FIG. 30 may include stepped waveguides. The stepped waveguides of FIG. 30 may be tiled in the lateral direction so as to supply output light through different regions of the SLM 48. Stated differently, the waveguides may be tiled in a direction substantially perpendicular to the optical axis of the stepped waveguides 101. Further, the directional backlights of FIG. 30 may include light emitting element arrays 326, 324. The light emitting element array 326 may include a light emitting element 326 and the light emitting element array 324 may include a light emitting element 325.

Such an arrangement of stepped waveguides may be fabricated as a single molded piece, may be assembled by attaching adjacent stepped waveguides. Additionally, the stepped waveguides may be assembled by attaching curved end segments to the end of a structure including an input side 2, a side 6 and continuous linear light extraction features 10, 12 arranged as described herein, but not illustrated in FIG. 30. The stepped waveguides of the directional backlights may also be formed from a common piece of material. Light emitting element arrays 326, 324 may be arranged so that light may propagate onto respective reflectors 322, 320. Light may also propagate from array 324 to reflector 322 and vice versa, to produce viewing lobes for the particular reflector. The arrays 326, 324 may be arranged so that respective light emitting elements 327, 325 are arranged to be directed by respective reflectors 322, 320 to the viewing window 26.

Figure 31:
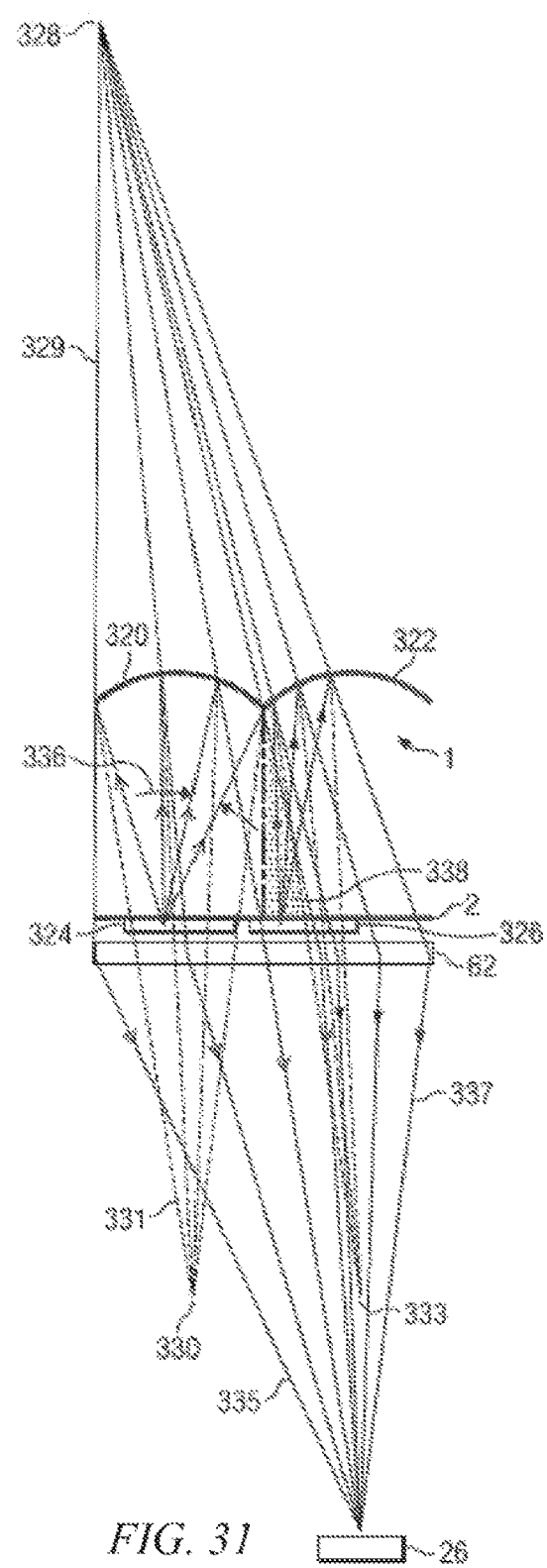
FIG. 31 is a schematic diagram illustrating further details of light propagation in an array of directional backlights and an output Fresnel lens of a directional display device, in accordance with the present disclosure.

Continuing the discussion, the output pupillation to combine light rays at viewing window 26 may be achieved by a combination of the reflectors 320, 322 and light extraction features 12. Furthermore, FIG. 31 is a schematic diagram illustrating details of light propagation in an array of stepped waveguides and an output Fresnel lens. As shown in FIG. 31 a Fresnel lens 62 may further be included. In FIG. 31, the Fresnel lens 62 is shown for illustrative purposes as being at the exit of the input side 2. However, the Fresnel lens 62 may be substantially parallel to the output surface 6, and the output light may not pass through side 2 so that light extracted by features 12 is incident thereon. Light rays 335 from array 324 are shown with open arrows while light rays 337 from array 326 are shown with closed arrows.

Advantageously the arrangement of FIG. 31 may distribute optical power between the reflectors 320, 322 and the Fresnel lens 62. The Fresnel lens 62 area may be substantially the same size as the total stepped waveguide array area. In further embodiments, the single Fresnel lens 62 may be replaced by an array of Fresnel lenses each arranged with at least one stepped waveguide of the array of stepped waveguides. In operation, light rays 335, 337 may be directed by reflectors 320, 322 with respective centers of curvature 330, 333, with reflected light cones that may be convergent, divergent or parallel; in the example illustrated in FIG. 31, divergent light beams are shown. On exiting the stepped waveguide by extraction at features 12, this light is incident onto the Fresnel lens 62 where it is imaged towards the observer. Given the divergence of the output beams in this embodiment, the Fresnel lens may have a virtual object point 328 defined by virtual light rays 329. Advantageously divergent beams may reduce the size of non-illuminated regions in stepped waveguides for off-axis viewing points.

Light cone 336 illustrates a region of illumination for light rays 335 falling on reflector 320 that forms a folded optical path to illuminate a region 338 that is not within the logical light guide section for reflector 320. The logical light guide section being the region of the stepped waveguide that is substantially directly under the reflector 320. Thus light is not reflected by reflectors 322, 320 to be entirely within respective light guide sections, but may propagate between adjacent sections of the stepped waveguide to provide illumination of the viewing window 26.

Advantageously the output of the array of stepped waveguides which may include an array of reflectors 320, 322, may achieve substantially uniform illumination to the viewing window 26 over approximately the whole of the display area while maximizing illuminated display area at the limits of lateral viewing freedom.

Figure 32:
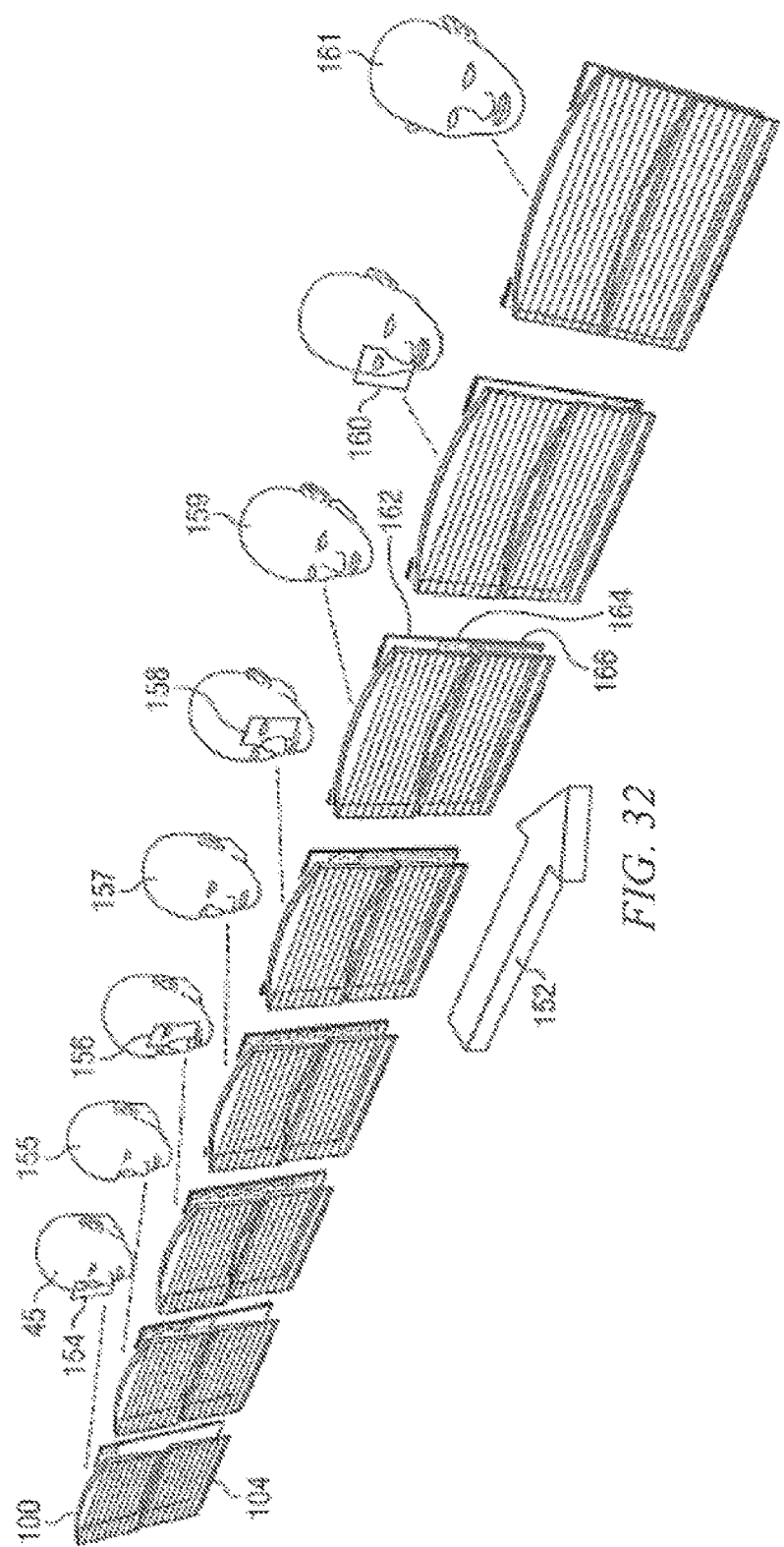
FIG. 32 is a schematic diagram illustrating scanned addressing of an autostereoscopic directional display device in cooperation with an array of directional backlights, in accordance with the present disclosure.

In field sequential autostereoscopic displays, separated top and bottom illumination can significantly improve illumination duty cycle as half-height regions of a line-by-line updated LCD provides settled imagery for a significant proportion of the overall frame time. The operation of an offset stacked illuminator within an autostereoscopic display system is illustrated schematically in FIG. 32. Further, FIG. 32 is a schematic diagram illustrating scanned addressing of an autostereoscopic display in cooperation with an array of stepped waveguides. FIG. 32 includes a viewer 45, and a SLM 48, in which the images on the SLM 48 sequentially vary in the direction 152.

In a first time slot 154, the SLM 48 is showing right eye image 162 over most of the SLM height except for the top portion which includes a switching region 164. Thus observer at time slot 154 has the right eye viewing window illuminated by just the bottom stepped waveguide 104. In the next time slot 155 the SLM shows a mixture of right image 162, mixed image 164 and left image 166. In time slot 156, the left image appears at the top of the display with mixed region at the bottom so that stepped waveguide 100 illuminates the left eye viewing window and stepped waveguide 104 is un-illuminated. In time slot 157 both top and bottom of the SLM show mixed images so both stepped waveguides are un-illuminated. In time slot 158 the bottom valve illuminates the left viewing window. In time slots 159 and 161 neither stepped waveguide is illuminated, and in time slot 160 the top stepped waveguide 100 is illuminated for the right eye viewing window. Thus, through the timing sequence each eye sees the left and right eye from the top and bottom of the array of stepped waveguides.

Figure 33:
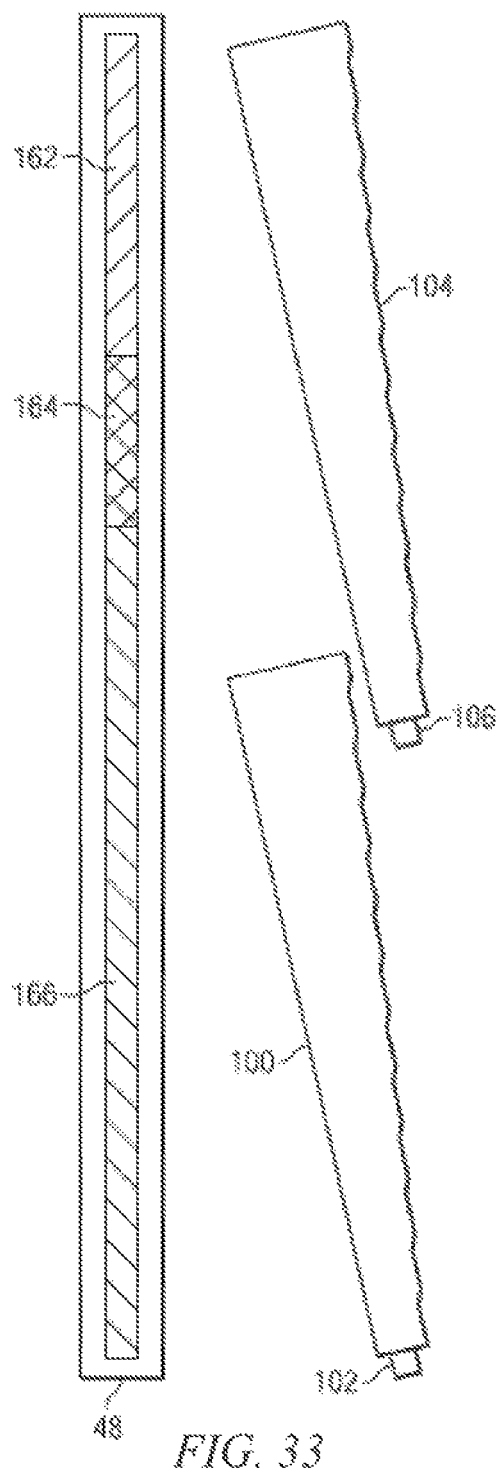
FIG. 33 is a schematic diagram illustrating in side view, scanned addressing of an autostereoscopic directional display device in cooperation with an array of directional backlights, in accordance with the present disclosure.

FIG. 33 is a schematic diagram illustrating in side view, scanned addressing of an autostereoscopic directional display device incorporating an array of tiled directional backlights. In FIG. 33, time slot 160 is illustrated in side view so that light source illuminator array 102 is arranged to provide right eye illumination through stepped waveguide 100 while light source illuminator array 106 is un-illuminated. The transparency of the stepped waveguides 100 and 104 achieves a substantially uniform output intensity over the integrated illumination from the display for left and right eye images. As the displays are not illuminated in the switching regions, the cross talk of the display is advantageously reduced, and the brightness is improved as the display may be illuminated for a longer total time slot than for single stepped waveguide illumination scheme.

Figure 34A:
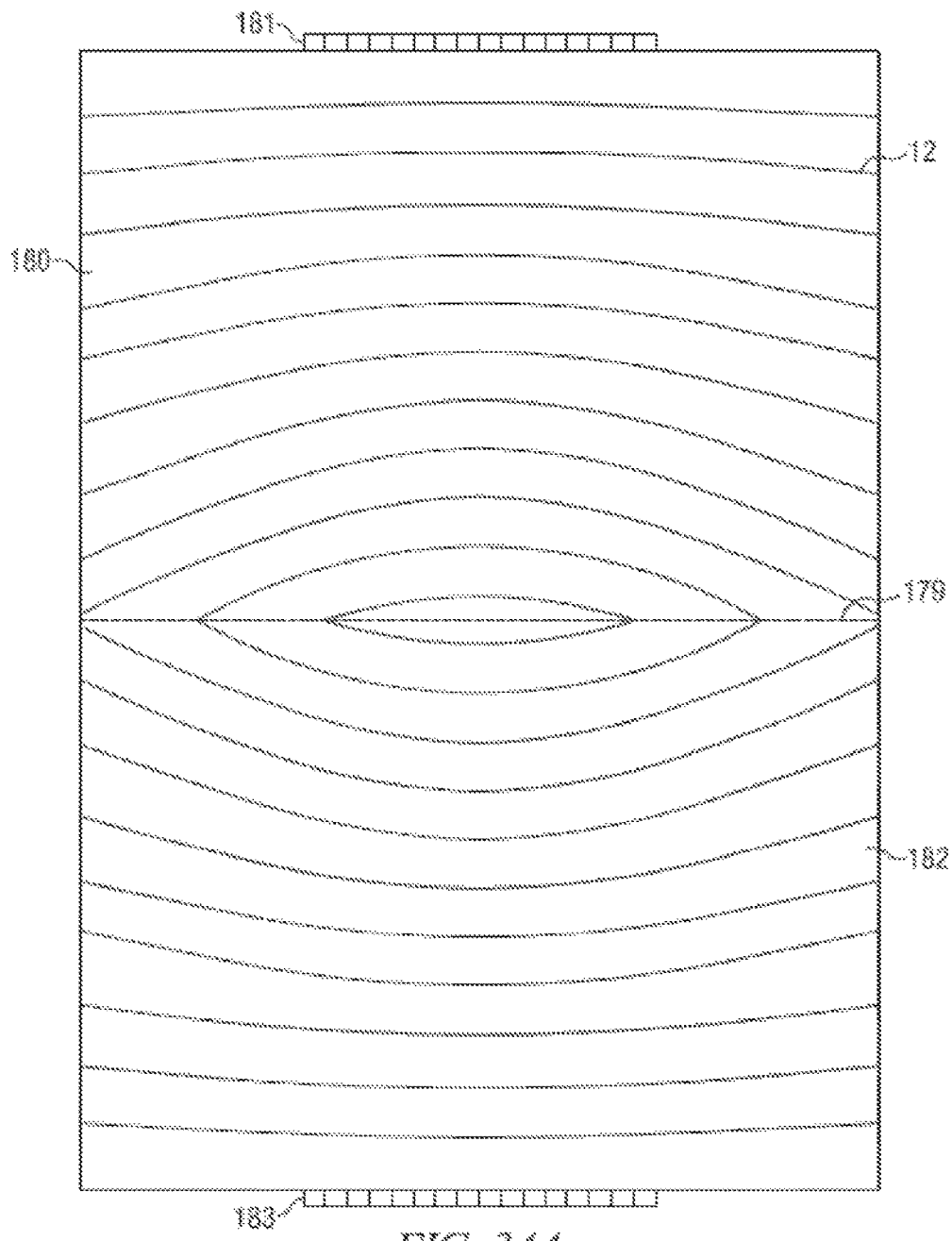
FIG. 34A is a schematic diagram illustrating in front view, an array of tiled directional backlights to provide an increased illumination area, in accordance with the present disclosure.

FIG. 34A is a schematic diagram illustrating in front view an array of tiled directional backlights of a directional display device arranged to provide an increased illumination area. FIG. 34A shows in front view the array of tiled directional backlights.

A first directional backlight includes a stepped waveguide 181 and an array of light sources 181 and a second directional backlight includes a stepped waveguide 182 and an array of light sources 183. The directional backlights are tiled behind the spatial light modulator in a direction perpendicular to the lateral direction. As a result they supply output light through different regions of the spatial light modulator. The reflective ends of each stepped waveguide are coplanar at a boundary 179. The stepped waveguides may include light extraction features 12 that are curved to provide a positive optical power in the lateral direction. This allows the boundary 179 forming the reflective ends of each stepped waveguide to be flat, and thus permitting the waveguides 180, 182 to be butted with a minimal gap between the light output section of the two units. In this context, the boundary 179 being "flat" means that it is sufficiently flat to provide consistent optical properties thereacross to allow proper functioning, and there may be some roughness at a small scale.

Such a stepped waveguide may achieve a magnification of viewing windows that varies along the length of the stepped waveguide. Preferably a further imaging element such as Fresnel lens of FIG. 28C may be provided to avoid the variation of magnification with length.

To make it reflective the boundary 179 may be a substantially or fully silvered surface as shown in FIG. 34B. FIG. 34B is a schematic diagram illustrating in side view, an array of directional backlights to provide an increased illumination area. The stepped waveguides may operate substantially independently but may include further stepped waveguide arrays to the rear to provide additional functionality as described previously. The stepped waveguide array as shown is not monolithic or formed in a single layer structure, as the mirror at the boundary 179 may provide a break in the layer.

FIG. 34C is a schematic diagram illustrating in side view an array of backlights to provide an increased illumination area, similar to that of FIG. 34A. FIG. 34C shows an embodiment in which the boundary 179 may be formed from a semi-silvered mirror, such as provided by a small gap between the stepped waveguides 180, 182, or by a semi-transparent metal layer for example. The light from the array of light sources 183 of the directional backlight also including the waveguide 182 is split into a light ray 186 that is reflected from the boundary 179 forming a reflective end of the waveguide 182 and into a light ray 185 that passes through the boundary. Thus, the light ray 186 is output as output light through the waveguide 182 and the light ray 185 is output as output light through the waveguide 180. The light from the array of light sources 181 of the directional backlight also including the waveguide 180 is split in a similar manner. Thus, light rays from source array 183 may propagate within stepped waveguides 180 and 182, thus mixing with light from light source array 181 increasing total brightness and providing mixing between the two arrays of light sources 181, 183. Furthermore, the mixing of light between the two light source arrays may advantageously compensate for differences in color and brightness between the two arrays of light sources 181, 183, increasing uniformity.

Figure 34D:
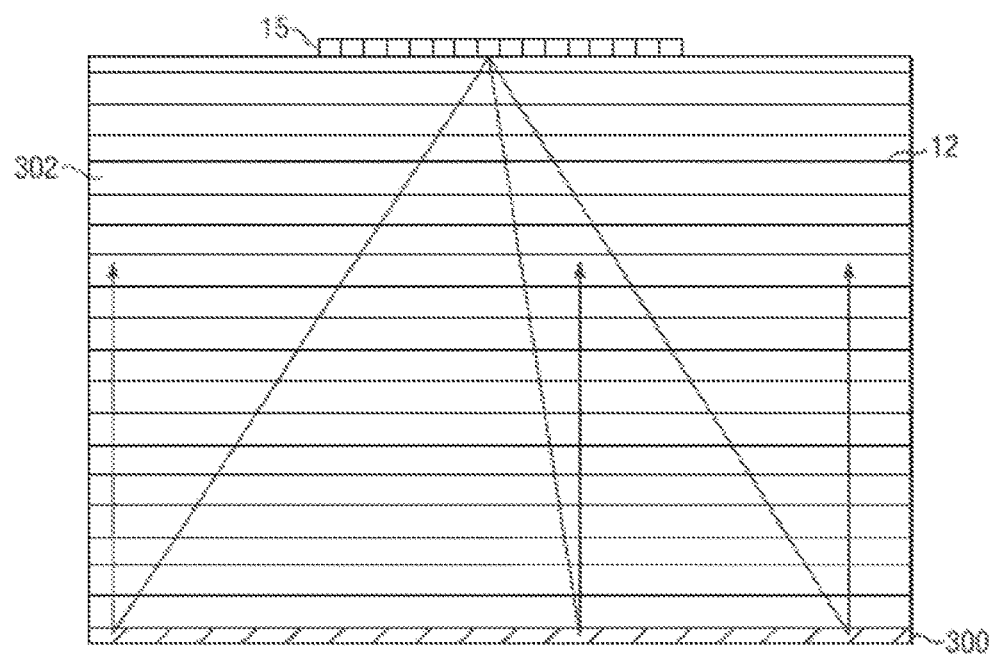
FIG. 34D is a schematic diagram illustrating in front view, a directional backlight including linear light extraction features and a planar diffractive reflector arranged to provide collimation of incident light, in accordance with the present disclosure.

FIG. 34D is a schematic diagram illustrating in front view a directional backlight including linear light extraction features and a planar diffractive reflector arranged to provide focusing of incident light. Further, FIG. 34D shows a stepped waveguide 302 including a diffractive reflector 300 and linear light extraction features 12. Light emitting elements in the illuminator array 15 may illuminate the reflector 300 and are focused, for example, to parallel light for subsequent imaging of viewing windows by a Fresnel lens (not shown in FIG. 34D). The diffractive reflector 300 may include a holographically recorded diffraction pattern that may achieve a focusing function and may for example be a volume hologram. Moreover, the reflector 300 may include stacks of red, green and blue reflection diffractive elements or may be formed by multiple recordings in a single layer. The spectral efficiency of the reflector 300 may be tuned to the output wavelengths of the light emitting elements of the illuminator array 15. The light emitting elements may include narrow band emission to provide high efficiency of reflection. The reflector may be recorded to provide low aberrations over a range of illumination angles including the length of the illuminator array 15, and may include multiple diffractive structures to achieve high efficiency over the respective range of illumination angles.

Advantageously the reflector 300 may be a planar structure that can be attached to a planar surface of the stepped waveguide. Thus the stepped waveguide fabrication may have reduced cost and complexity. Additionally, the plane surface can be arranged in tiled arrays as will be described below. Further, the efficiency of the structure may be optimized by matching to the illumination wavelengths and angles. Moreover, the attachment of the reflector 300 may not require an evaporative coating, and so cost can be reduced.

Figure 34E:
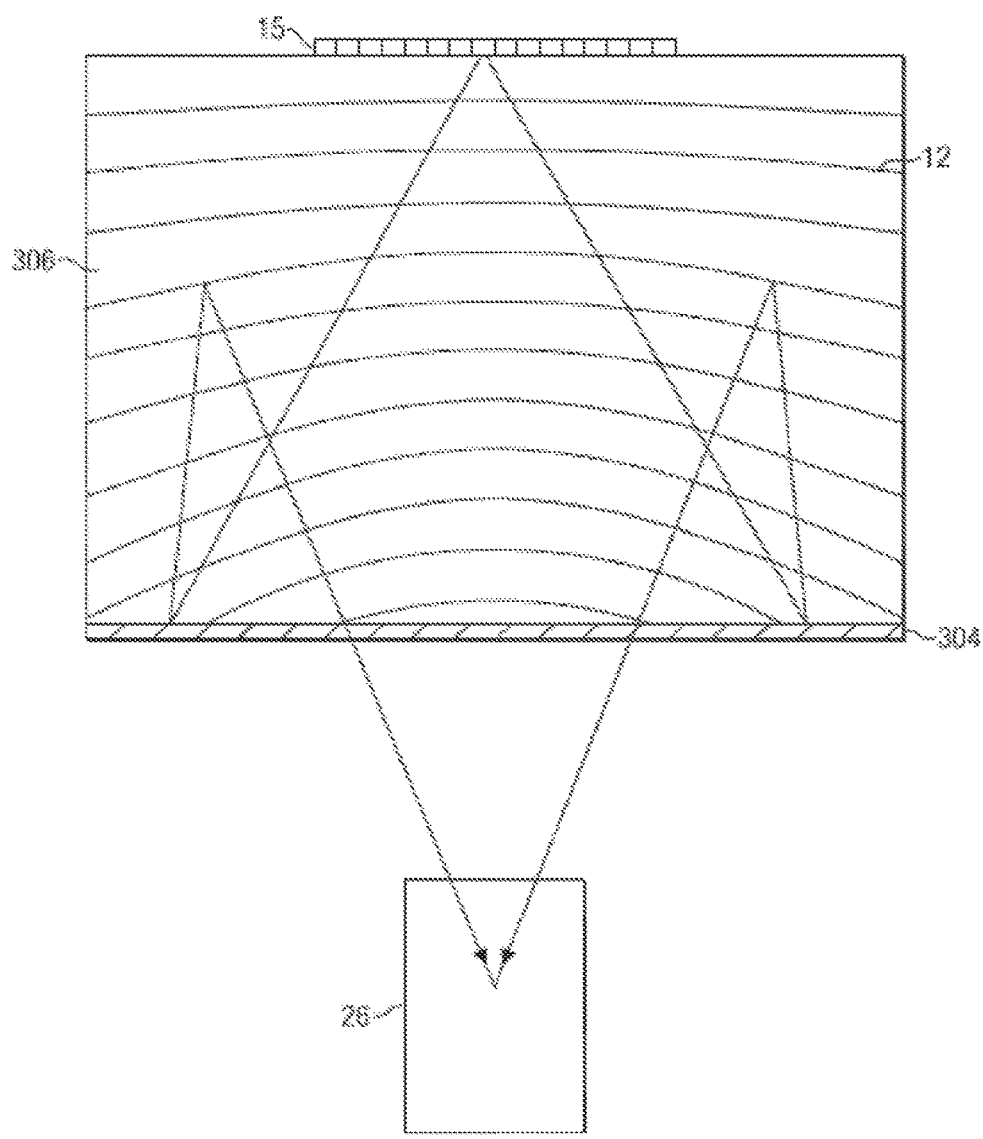
FIG. 34E is a schematic diagram illustrating in front view, imaging by a directional backlight including curved light extraction features and a planar diffractive reflector arranged to provide focusing of incident light, in accordance with the present disclosure.

FIG. 34E is a schematic diagram illustrating in front view imaging by a directional backlight including curved light extraction features and a planar diffractive reflector arranged to provide focusing of incident light. Further, FIG. 34E shows a further embodiment including a stepped waveguide 306 in which optical power is shared between a diffractive reflector 304 and curved light extraction features 12, to provide a viewing window 26, for example without using an additional Fresnel lens 62. Advantageously such an embodiment can provide reduced aberrations, reduced Moiré, lower device thickness and lower cost.

Figure 34G:
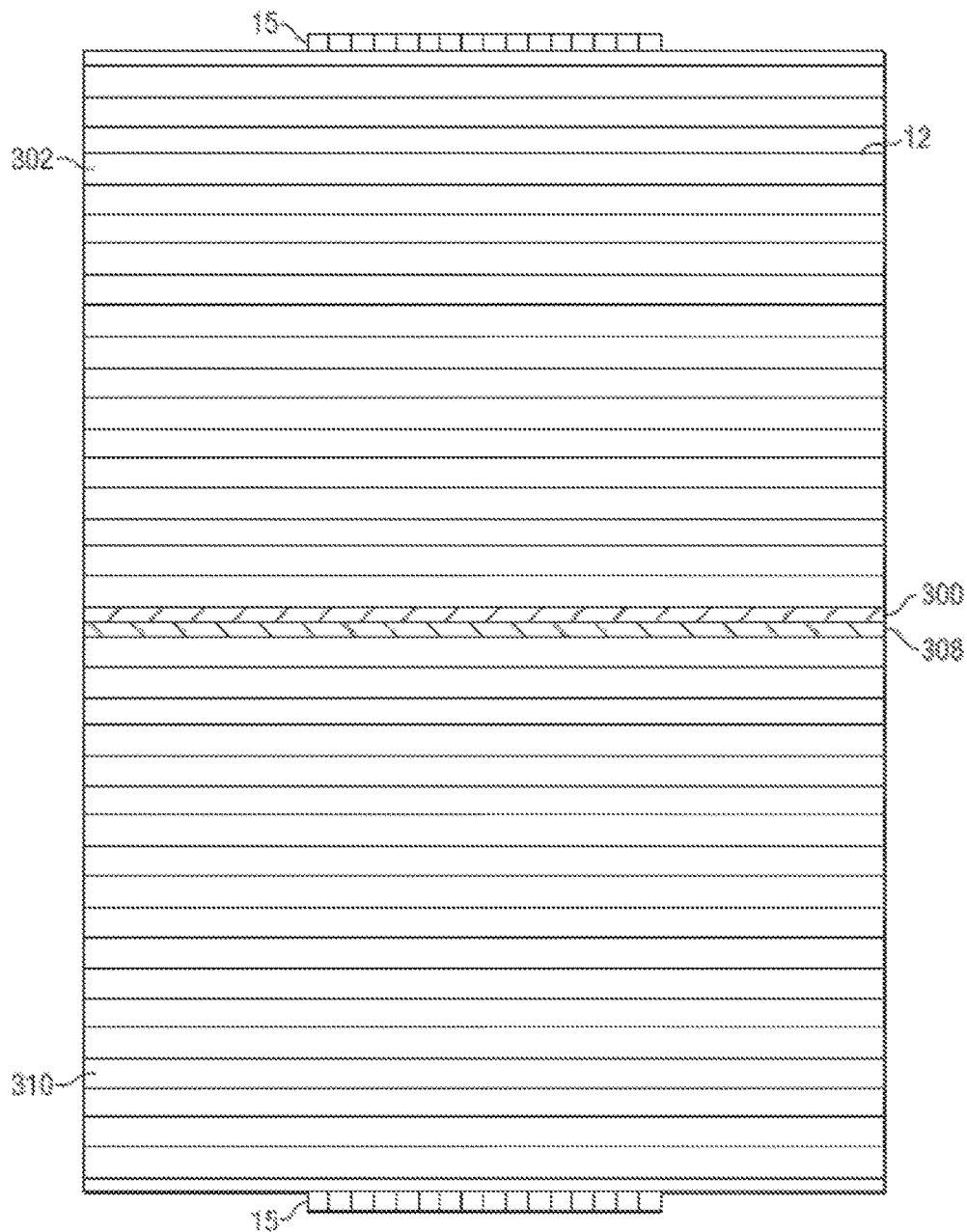
FIG. 34G is a schematic diagram illustrating in front view a tiled array of directional backlights including diffractive reflectors, in accordance with the present disclosure.

FIG. 34F is a schematic diagram illustrating in side view an array of tiled directional backlights of a directional display device illustrating light propagation for light output in a tiled array of stepped waveguides including a holographic reflector. FIG. 34G shows in front view the same array of tiled directional backlights. The array of tiled directional backlights is similar to that of FIG. 34A except for the following modifications.

A first directional backlight includes a stepped waveguide 302 and an array of light sources 15 and a second directional backlight includes a stepped waveguide 310 and an array of light sources 15. The directional backlights are tiled behind the spatial light modulator in a direction perpendicular to the lateral direction. As a result they supply output light through different regions of the spatial light modulator. The reflective ends 300, 308 of the respective waveguides 302, 320 are coplanar and flat, as described above.

FIG. 34F shows in side view propagation of light rays in a tiled array of stepped waveguides 302, 310 in which the reflectors 300, 308 may be arranged in close proximity. The reflective ends 300, 308 may be diffractive reflectors having positive optical power in a lateral direction. Thus the reflective ends 300, 308 may be arranged to reflect light rays 312 propagating within the stepped waveguide but also to transmit off-axis light rays 314 due to the angular selective properties of the diffractive reflectors 300, 308. Advantageously the visibility of the join between the stepped waveguides 302, 310 may be reduced. Additionally, the light cone with the stepped waveguides 302, 310 may be reduced such that off-axis light does not propagate, thus increasing the overall reflector efficiency by reducing incident cone angles.

The diffractive reflectors may take any of the forms described above with reference to FIG. 34D. The diffractive reflectors and stepped waveguides may be attached to each other by a suitable index matching adhesive. Alternatively the diffractive reflectors may be formed as a single element on recording. In yet another alternative, the reflectors may include additional absorbing layers to substantially prevent light from stepped waveguide 302 propagating into stepped waveguide 310.

FIGS. 35 to 38 illustrate respective arrays of tiled directional backlights similar to that of FIG. 30 in that they are tiled in the lateral direction and include waveguides formed from a common piece of material, but with further modifications as follows.

Figure 35:
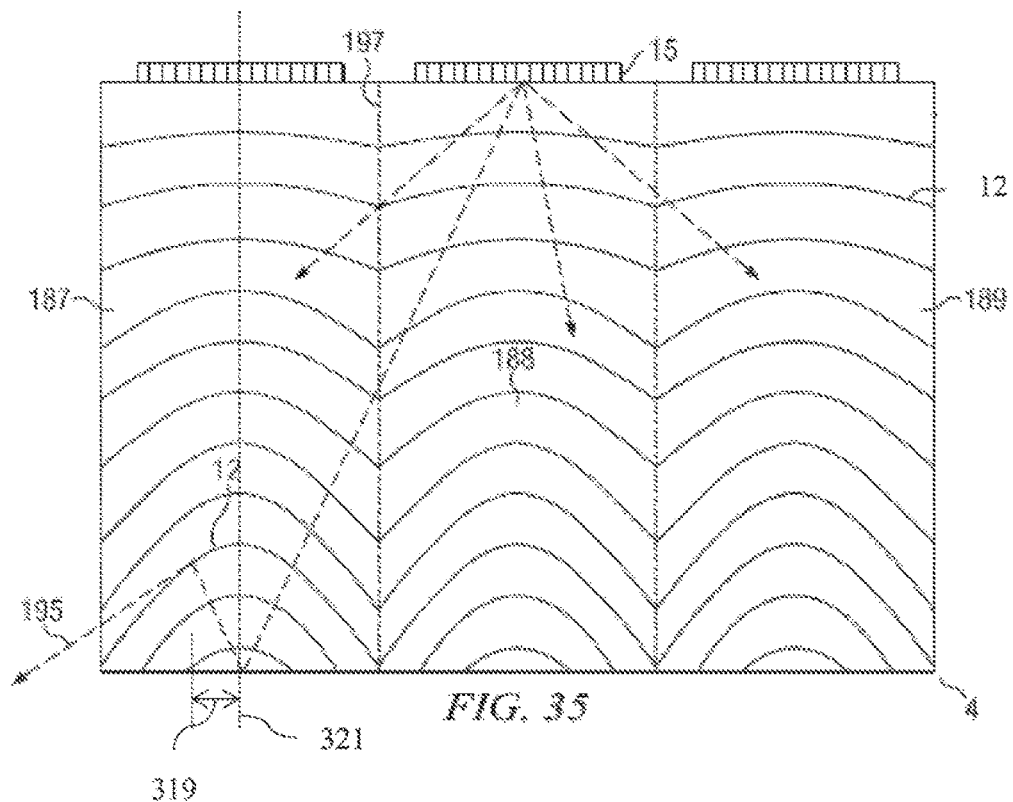
FIG. 35 is a schematic diagram illustrating in front view an array of directional backlights to provide an increased illumination area, in accordance with the present disclosure.

FIG. 35 is a schematic diagram illustrating in front view an array of tiled directional backlights to provide an increased illumination area. The directional backlights include respective stepped waveguides, 187, 188, 189, separated by effective boundaries 197 that may be substantially transparent to light from illuminator arrays 15. In FIG. 35, each of the directional backlights may include a stepped waveguide and a light source illuminator array. Light rays 195 from light source illuminator array 15 associated with stepped waveguide 188 may be guided through the boundary 197 at the cusps of extraction features 12 and so may be directed by first stepped waveguide 188 and second stepped waveguide 187. The light ray 195 is shown schematically as reflecting off of the reflective surface 4 and exiting the stepped waveguide 187 at an extraction feature 12. In one embodiment, the light extraction features 12 of each directional backlight may have positive optical power in a lateral direction across the stepped waveguide, such that the deflection of an incident ray varies with offset of the ray from the optical axis 321 of the respective directional backlight.

Advantageously, such an arrangement can reduce the numerical aperture of the curved extraction features 12, thus improving aberration performance, reducing cross talk and increasing the range for observer tracking without noticeable display flicker. Further, the display area and brightness can be increased and cross talk reduced using the temporal scanning methods shown in FIG. 32 for example. In this case the panel 48 addressing may be side-to-side rather than top-to-bottom.

Figure 36:
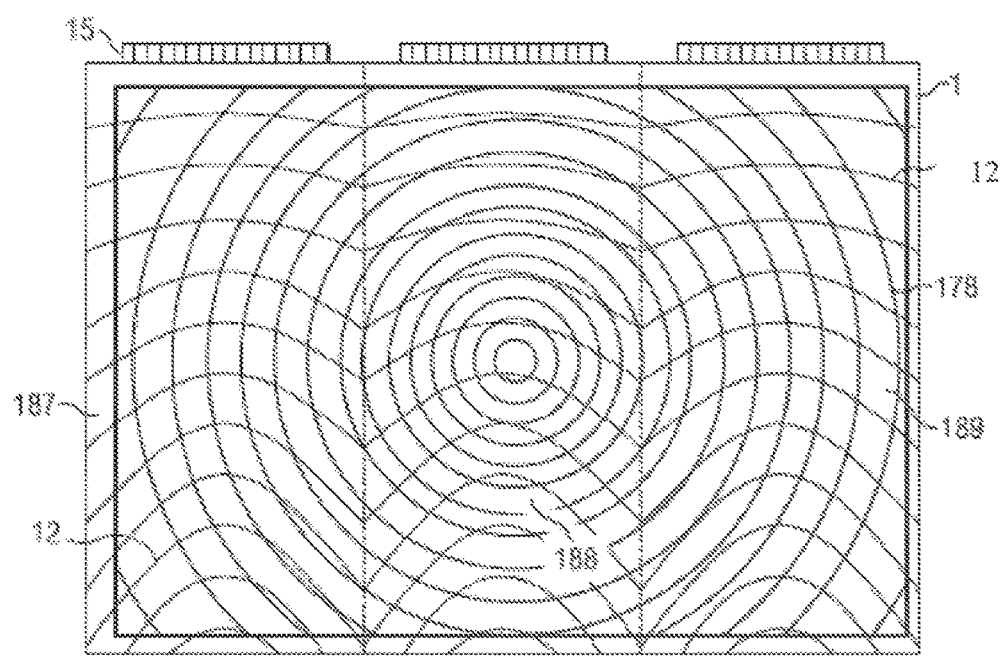
FIG. 36 is a schematic diagram illustrating in front view an array of directional backlights to provide an increased illumination area, in accordance with the present disclosure.

FIG. 36 is a schematic diagram illustrating in front view an array of tiled directional backlights to provide an increased illumination area. Further, FIG. 36 shows a further embodiment in which a Fresnel lens 178 may be incorporated over the array of tiled directional backlights, so that the optical power may be distributed between the curved extraction features 12 and the Fresnel lens 178. In FIG. 36, each of the directional backlights may include a stepped waveguide and a light source illuminator array. In one embodiment, the light extraction features 12 of each directional backlight may have positive optical power in a lateral direction across the stepped waveguide.

A Fresnel lens may alternatively be arranged with individual stepped waveguides of the array, or may be arranged with groups of stepped waveguides so that the display includes multiple Fresnel lenses across the area of the display. Advantageously Fresnel lenses may improve aberrations and achieve stepped waveguides with the same curved extraction feature arrangement, achieving reduced cost for large area arrays of stepped waveguides, as the stepped waveguides may be formed by the same molding process.

Figure 37:
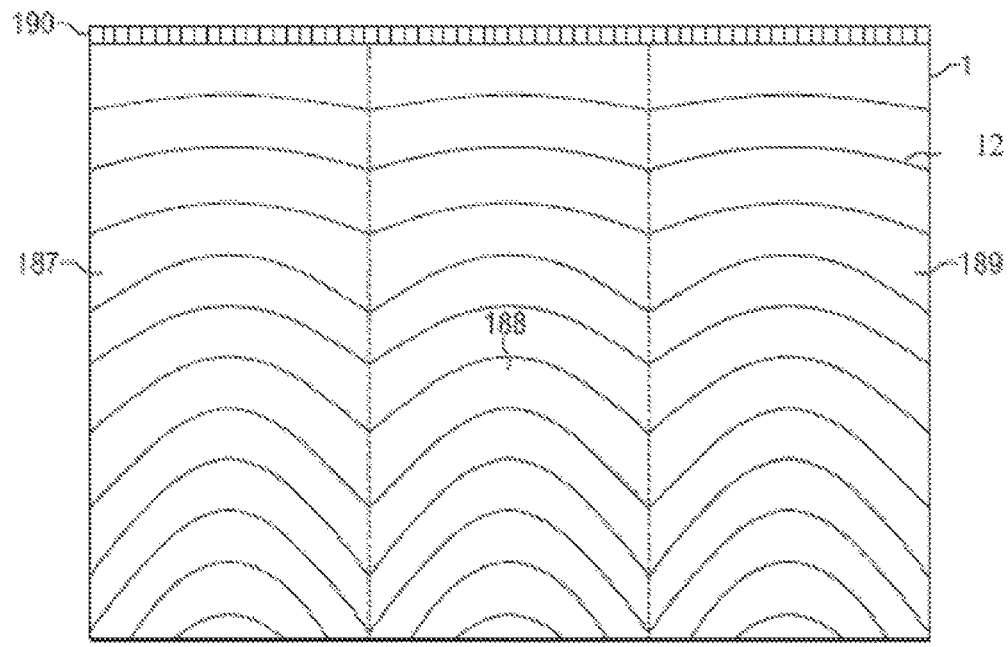
FIG. 37 is a schematic diagram illustrating in front view, an array of directional backlights to provide an increased illumination area, in accordance with the present disclosure.

FIG. 37 is a schematic diagram illustrating in front view an array of tiled directional backlights to provide an increased illumination area. In FIG. 37, each of the directional backlights may include a stepped waveguide and a light source illuminator array. In one embodiment, the light extraction features 12 of each directional backlight may have positive optical power in a lateral direction across the stepped waveguide. Further, FIG. 37 shows an embodiment in which the separate light source illuminator arrays 15 may be replaced by a single light source illuminator array 190 at the input side of the array of stepped waveguides. Advantageously such an arrangement can produce an extended array of viewing windows, increasing viewing freedom of the display.

Figure 38:
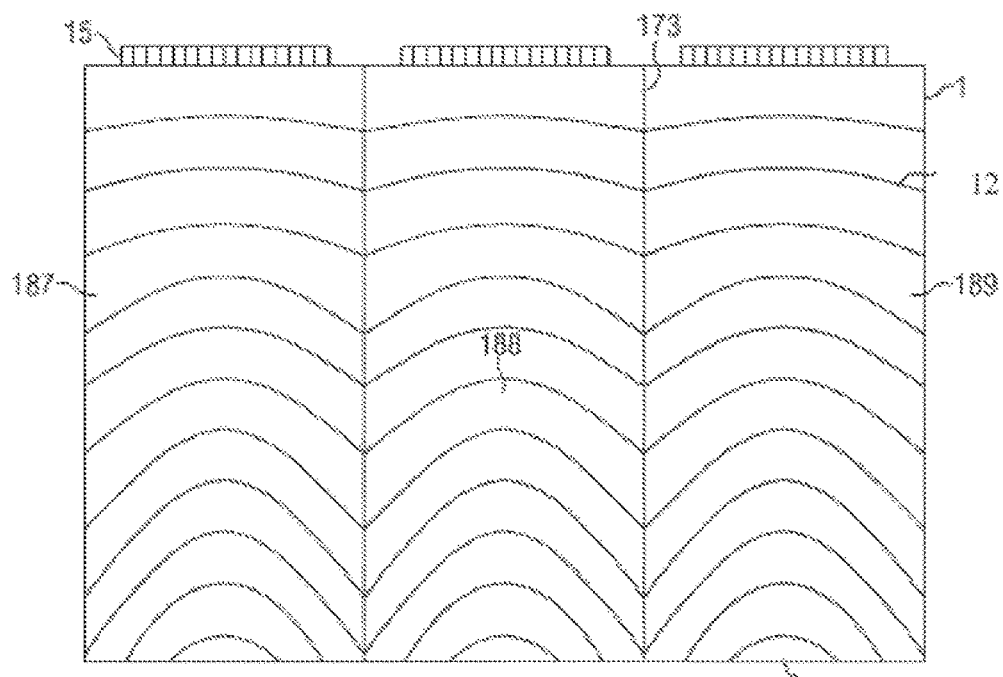
FIG. 38 is a schematic diagram illustrating an embodiment in which directional backlights incorporate light blocking layers at the interface between separate stepped waveguides, in accordance with the present disclosure.

FIG. 38 is a schematic diagram illustrating an embodiment in which tiled directional backlights incorporate light blocking layers at the interface between separate stepped waveguides. Further, FIG. 38 shows a further embodiment in which the stepped waveguides 187, 188, 189 may incorporate light blocking layers 173 at the interface between separate stepped waveguides. Such light blocking layers 185 advantageously achieve a reduction in the cone angle of illumination to provide a privacy mode and to substantially prevent the loss of visibility of edge positioned stepped waveguides for off-axis viewing of the display of FIG. 37. In FIG. 38, each of the directional backlights may include a stepped waveguide and a light source illuminator array. In one embodiment, the light extraction features 12 of each directional backlight may have positive optical power in a lateral direction across the stepped waveguide.

Figure 39:
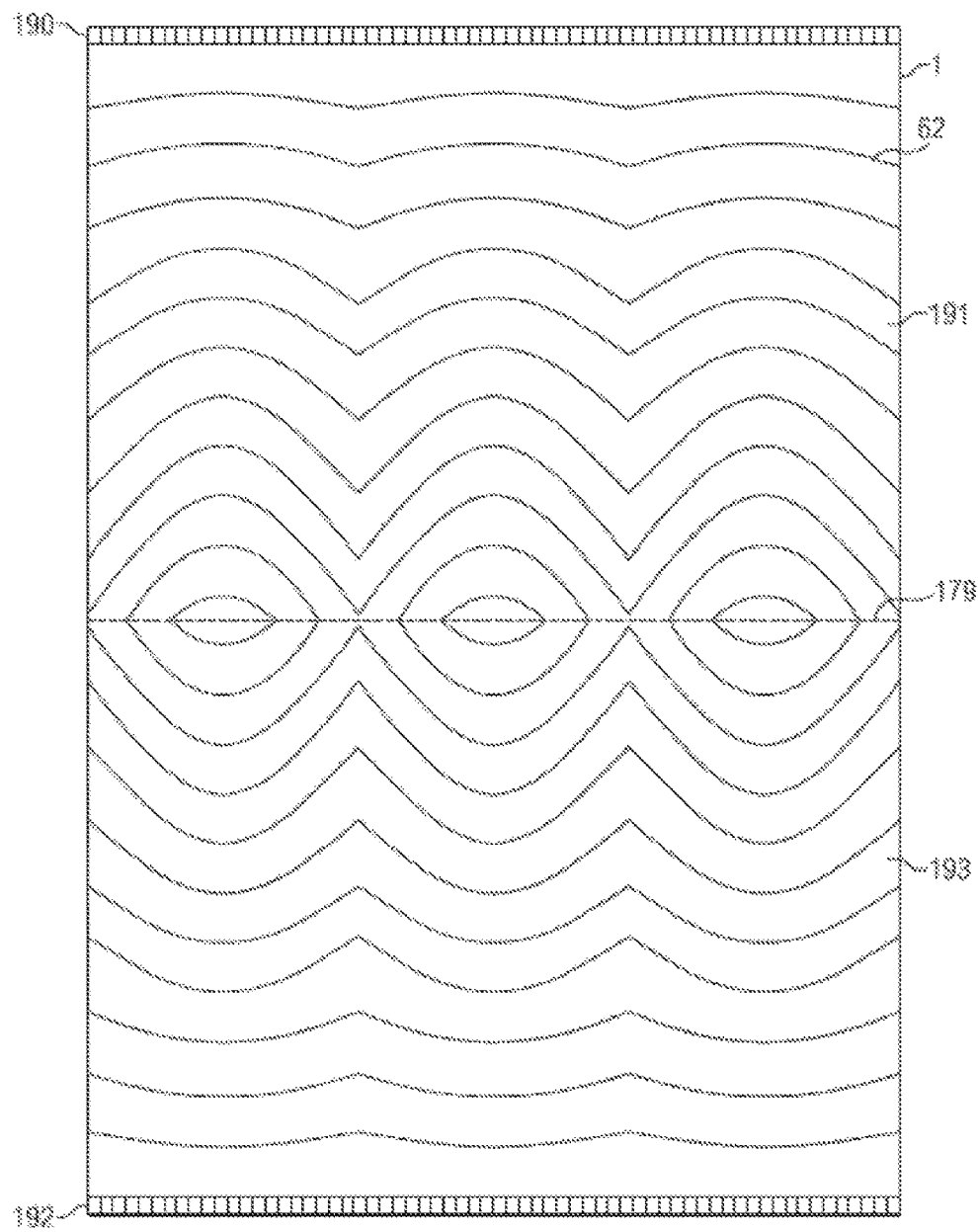
FIG. 39 is a schematic diagram illustrating in front view, an array of directional backlights to provide an increased illumination area, in accordance with the present disclosure.

FIG. 39 is a schematic diagram illustrating in front view an array of tiled directional backlights to provide an increased illumination area. Further, FIG. 39 shows in front view a further embodiment in which tiled stepped waveguide array 191, including stepped waveguides 187, 188, 189, (not shown in FIG. 39), may be approximately aligned with a similar tiled stepped waveguide array 193 in a similar manner to that shown in FIGS. 34A-34C for example. Advantageously such an arrangement may achieve increased display area, and extended viewing freedom while reducing aberrations in individual stepped waveguides and thus increasing maximum observer tracking speed without flicker and reducing image cross talk.

Figure 40:
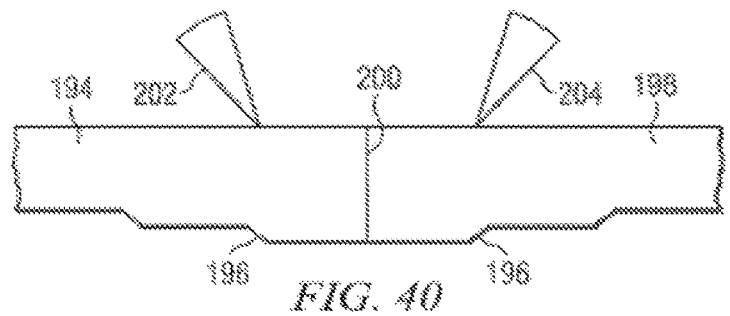
FIG. 40 is a schematic diagram illustrating in side view the boundary between two stepped waveguides of an array of directional backlights, in accordance with the present disclosure.
Figure 41:
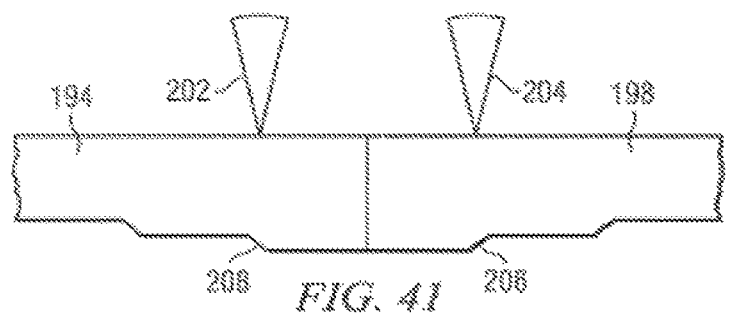
FIG. 41 is a schematic diagram illustrating in side view, the boundary between two stepped waveguides of an array of directional backlights, in accordance with the present disclosure.

FIG. 40 is a schematic diagram illustrating in side view, the boundary between two stepped waveguides of an array of tiled directional backlights. FIG. 40 shows in side view the boundary between two end butted stepped waveguides with a plane boundary, similar to that shown in FIG. 34B. If the light extraction features 196 are uncoated then light cones 202, 204 extracted from the stepped waveguides 194, 198 will typically have different orientations as shown, and thus each part of the tiled stepped waveguide array will have a different brightness from different directions. As shown in FIG. 41, this can be overcome by using metallized light extraction features 206, 208 inclined at approximately 45 degrees so that cones 202, 204 are directed parallel to each other. FIG. 41 is a schematic diagram illustrating in side view, the boundary between two stepped waveguides of an array of directional backlights.

Thus it is possible to provide tiled arrays of tiled directional backlights in which the thickest parts of the stepped waveguides, which may typically include a metallized surface, may be butted together. However to further increase display size while substantially maintaining display brightness and aberration performance, it may be desirable to provide tiled and stacked arrays of stepped waveguides at the thin end or light source input end of the respective stepped waveguides.

Figure 42:
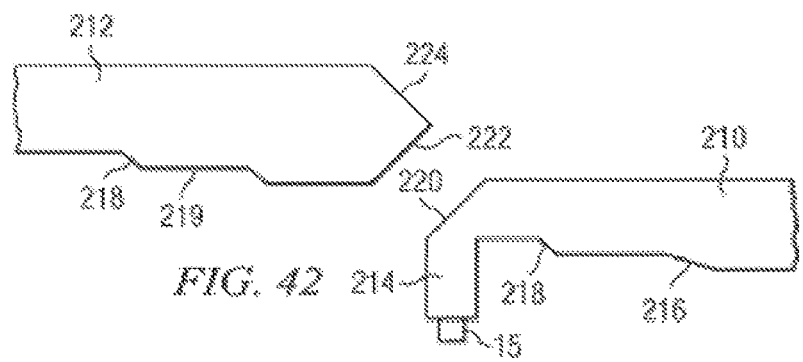
FIG. 42 is a schematic diagram illustrating in side view, first and second ends of a stepped waveguide, in accordance with the present disclosure.

One embodiment of an overlapping thin end stepped waveguide is shown in side view in FIG. 42. Further, FIG. 42 is a schematic diagram illustrating in side view first and second ends of a stepped waveguide. The thick end of a stepped waveguide 212 may be arranged with light extraction features 218 and guiding features 219. The reflective end may be provided by a corner feature including facets 222 and 224, so as to provide a retroreflection as opposed to a mirror reflection for guided light in the xz plane. At the thin end of a stepped waveguide 210 extraction features 216 and 218 may be provided as well as a turning facet 220 and planar input section planar waveguide 214, which may be arranged to direct light from the light source illuminator array 15 into the guiding section of stepped waveguide 210.

Figure 43:
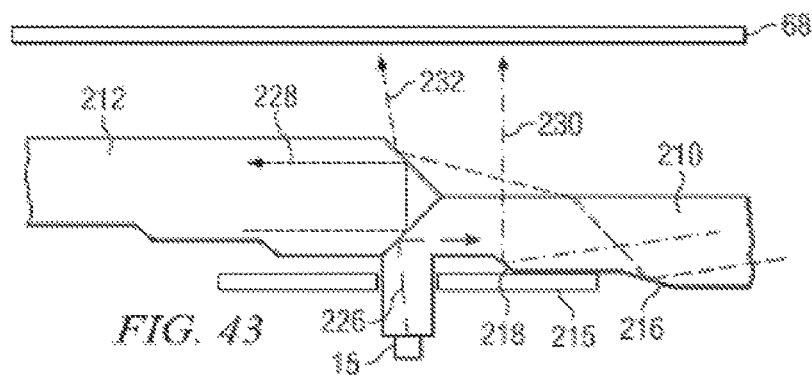
FIG. 43 is a schematic diagram illustrating in side view, first and second ends of a stepped waveguide assembled in an array of directional backlights, in accordance with the present disclosure.

FIG. 43 is a schematic diagram illustrating in side view first and second ends of a stepped waveguide assembled in an array of directional backlights. As shown in side view in FIGS. 42 and 43, light rays 228 guided in stepped waveguide 212 may be reflected at surfaces 222, 224 and counter-propagate towards the respective extraction features 218. Light rays 226 from light source illuminator array 15 in stepped waveguide 210 may be collected in the section planar waveguide 214 and directed by reflection at turning facet 220, the mirror that may be provided by metallization on facet 222, into the stepped waveguide 210. Light rays that are not captured by the section planar waveguide 214 may be collected in light baffle 215. Counter-propagating light rays 230 incident on facets 216 may be directed as in the standard stepped waveguide arrangement. Near to the overlap region, additional light extraction features may be incorporated and arranged to direct light onto the facet 232 and thus direct light from the overlap region to the observer. A vertical diffuser 68 may be further incorporated to provide further blurring of the overlap region, advantageously increasing output uniformity. In this manner, an array of tiled waveguides may be produced to achieve large display area, as may be suitable for example for large area 3DTV applications.

FIG. 44A is a schematic diagram illustrating in side view, a stepped waveguide suitable for an array of directional backlights. Further, FIG. 44A shows in side view a further embodiment, in which the section planar waveguide 214 may be folded to the rear of the stepped waveguide 234, including an additional reflective facet 236. As shown in FIG. 44B, in alignment the stepped waveguides may provide a similar arrangement to that of FIG. 43. FIG. 44B is a schematic diagram illustrating in side view first and second ends of a stepped waveguide assembled in an array of directional backlights. Advantageously such structures may be more compact than that shown in FIG. 43. Further, the section planar waveguide 214 may be substantially transparent so that stacked structures can be implemented, for example by positioning in the gap 237 between the section planar waveguide 214 and the stepped waveguide 234.

FIG. 45 is a schematic diagram illustrating in side view first and second ends of a stepped waveguide including diffractive reflectors. Further, FIG. 45 shows in side view a further embodiment including diffractive reflectors 316, 318 on adjacent stepped waveguides. The reflectors may be formed as described elsewhere, and may be holographic reflectors. Guiding light rays 318, 322 may be reflected by the reflectors 318, 322 while light rays 324 may be transmitted. Advantageously, the appearance of the gap between adjacent valves can be reduced, and may be used to achieve tiling of stepped waveguides over a large display area; for example for autostereoscopic 3DTV.

Figure 46:
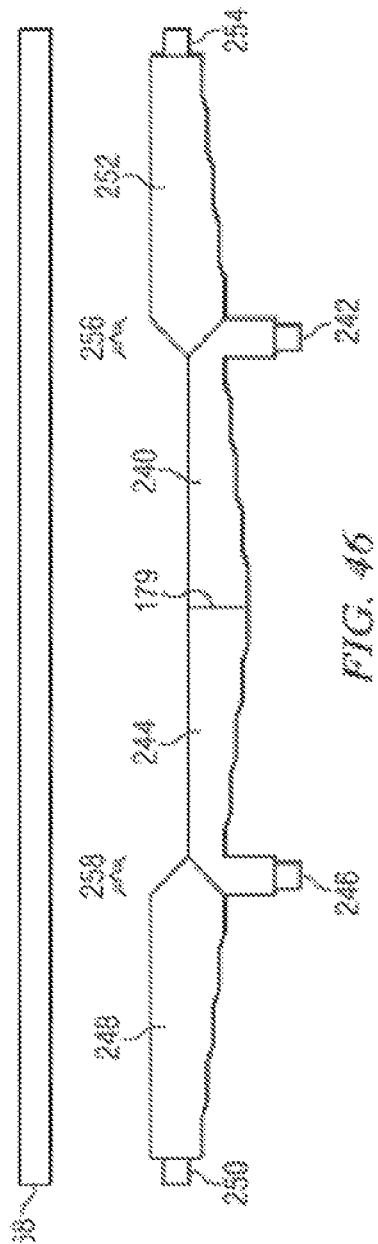
FIG. 46 is a schematic diagram illustrating in side view, an array of directional backlights, in accordance with the present disclosure.

FIG. 46 is a schematic diagram illustrating in side view, an array of directional backlights. Further, FIG. 46 shows a further embodiment in which an array of directional backlights including various features of the previous embodiments are combined into a stepped waveguide array. Thus stepped waveguides 248, 252 are approximately aligned with stepped waveguides 244, 240 respectively and the two stepped waveguide pairs may be butted at interface 179 that may have the properties as previously outlined.

Figure 47:
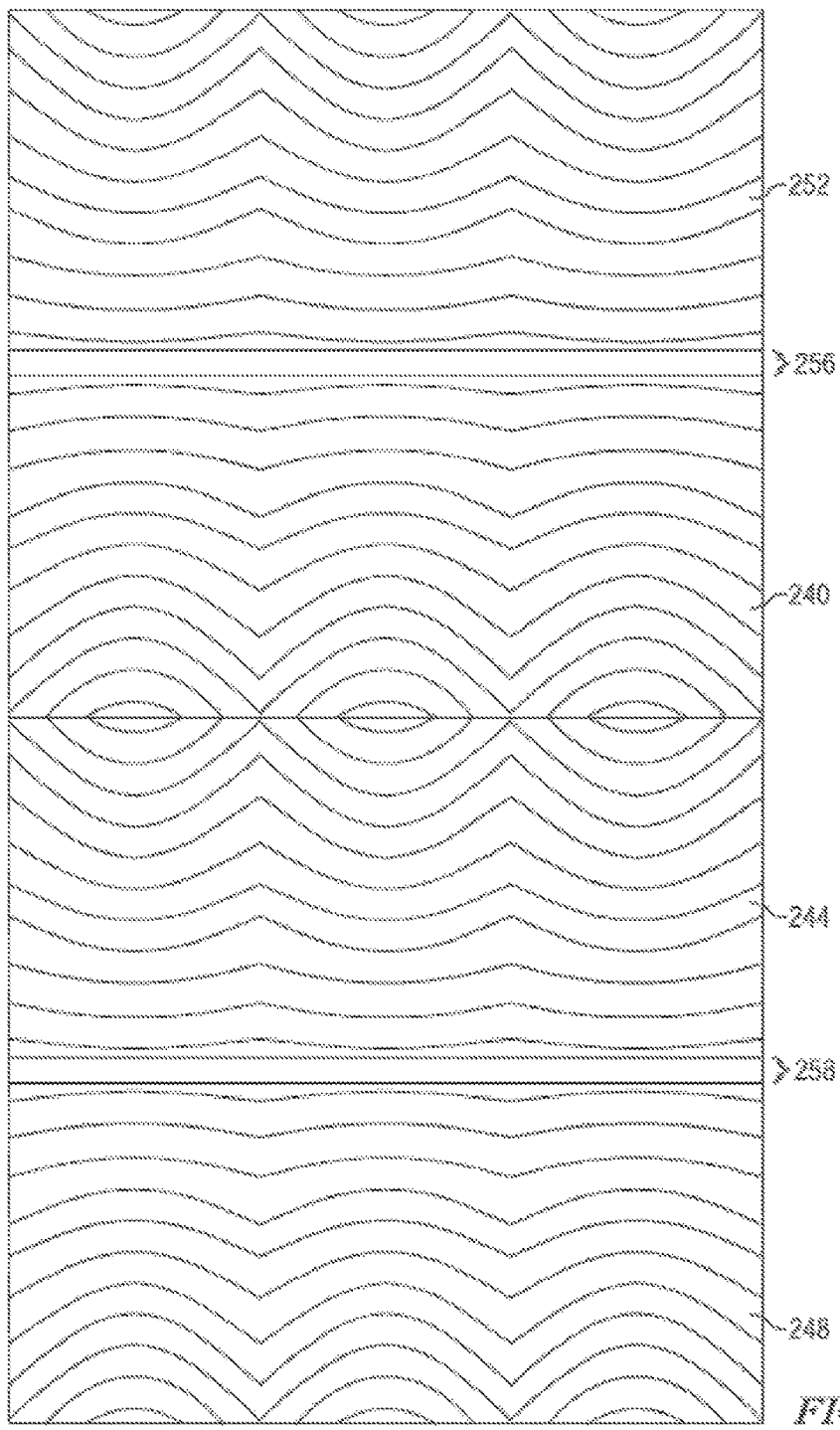
FIG. 47 is a schematic diagram illustrating in front view, an array of directional backlights, in accordance with the present disclosure.

Additionally, FIG. 47 is a schematic diagram illustrating in front view, an array of directional backlights. In front view, as shown in FIG. 47, the stepped waveguides may be provided in a large tile suitable for large area display with regions of stepped waveguides that may be addressed independently through light source arrays 252, 240, 244, 248 respectively. Overlap regions 256, 258 may have their visibility reduced by means of additional facets 216 and vertical diffusers 68. Advantageously, such a mechanism can be extended to large areas with individual addressable characteristics to reduce cross talk, increase viewing freedom, increase brightness and reduce display flicker.

Figure 48A:
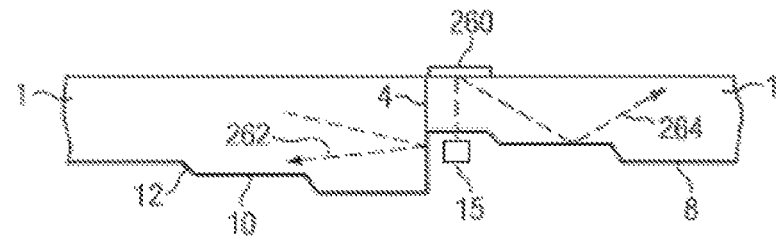
FIG. 48A is a schematic diagram illustrating in side view, tiled directional backlights including a grating coupler, in accordance with the present disclosure.

FIG. 48A is a schematic diagram illustrating in side view, a tiled directional backlight including a grating coupler. Further, FIG. 48A shows a further embodiment for arranging stepped waveguides in an array including a grating coupling element 260. The directional backlights of FIGS. 48A and 48B may include at least a stepped waveguide 1 and a light emitting element illuminator array 15. Light emitting element illuminator array 15 may be arranged on the rear side 8 of the stepped waveguide 1 at the thin end of the stepped waveguide 1. Incident light rays 264 may be incident on the element 260 and may be reflected into the input aperture of the stepped waveguide to be guided within the stepped waveguide. Element 260 may include, for example, a surface relief diffractive reflector or a volume reflection hologram including stacks of holograms to optimize efficiency. Light ray 262 is reflected by end 4 of waveguide 1 so that a small seam is achieved between adjacent waveguides and light may be guided by features 10 and reflected by features 12 in proximity to an adjacent waveguide 1.

In one embodiment one or more of the directional backlights may include an input end that is an extension of one of the guide surfaces, and a coupler facing the input end and arranged to substantially deflect input light along the waveguide.

Figure 48B:
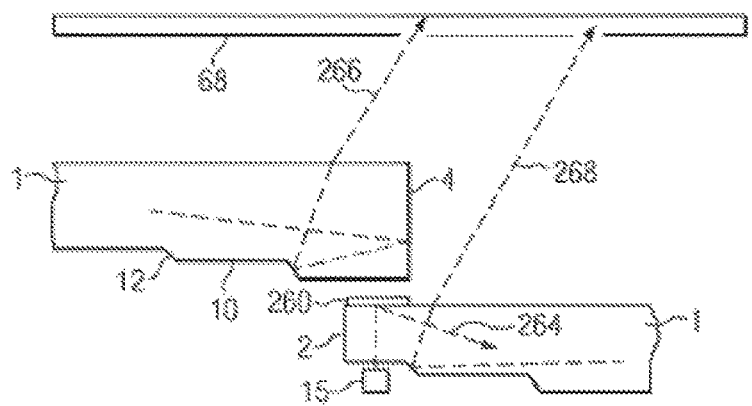
FIG. 48B is a schematic diagram illustrating in side view, directional backlights including a grating coupler, in accordance with the present disclosure.

FIG. 48B is a schematic diagram illustrating in side view, a directional backlight including a grating coupler. FIG. 48B shows a similar embodiment to FIG. 48A in which the coupling region including element 260 may be arranged behind the side 4 of a stepped waveguide 1. Light rays 266, 268 from light extraction features 12 may be arranged to be directed substantially away from the side 4 of the upper stepped waveguide, to avoid interaction with the side 4 which may include a mirror surface. Diffuser 68 may be arranged to blur light in this region. In one embodiment one or more of the directional backlights may include an input end that is an extension of one of the guide surfaces, and a coupler facing the input end and arranged to substantially deflect input light along the waveguide.

Figure 49:
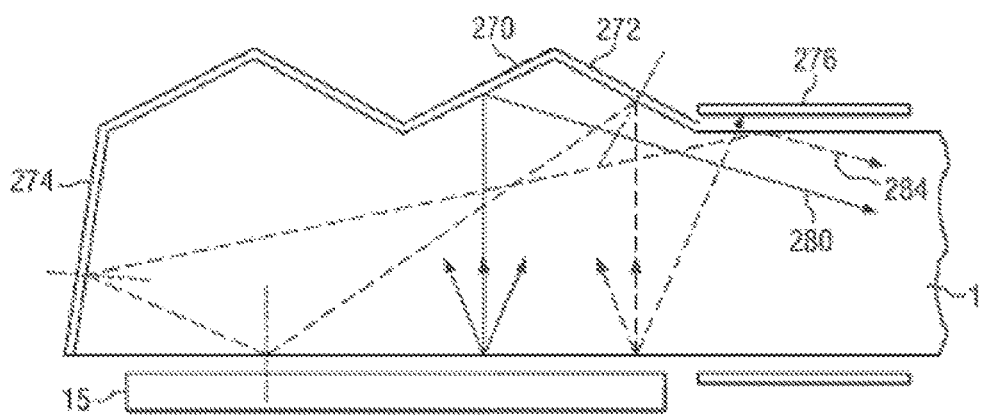
FIG. 49 is a schematic diagram illustrating in side view, a directional backlights including a prismatic coupler, in accordance with the present disclosure.

FIG. 49 is a schematic diagram illustrating in side view, a directional backlight including a prismatic coupler. The directional backlights of FIG. 49 may include a stepped waveguide and a light source illuminator array 15. Further, FIG. 49 shows a further embodiment including an array of inclined elongate surfaces 270, 272 arranged to substantially direct light from illuminator array 15 into the stepped waveguide of the stepped waveguide 1. Thus light rays 280 may be incident on surface 270 and substantially reflected into the stepped waveguide 1. Light rays 284 incident on surface 272 may be reflected in the opposite direction and may be incident on surface 274 and may be reflected into the stepped waveguide 1. Absorbing elements 276 may be arranged to capture light from non-guiding modes of propagation in the stepped waveguide.

In one embodiment one or more of the directional backlights may include an input end that is an extension of one of the guide surfaces, and a coupler facing the input end and arranged to substantially deflect input light along the waveguide.

Advantageously the present embodiments may achieve coupling of light from a light source array that is positioned to the rear of the stepped waveguide. This may provide a more compact arrangement for tiling and stacking implementations. Further, the gap between stepped waveguides may be reduced.

Figure 50:
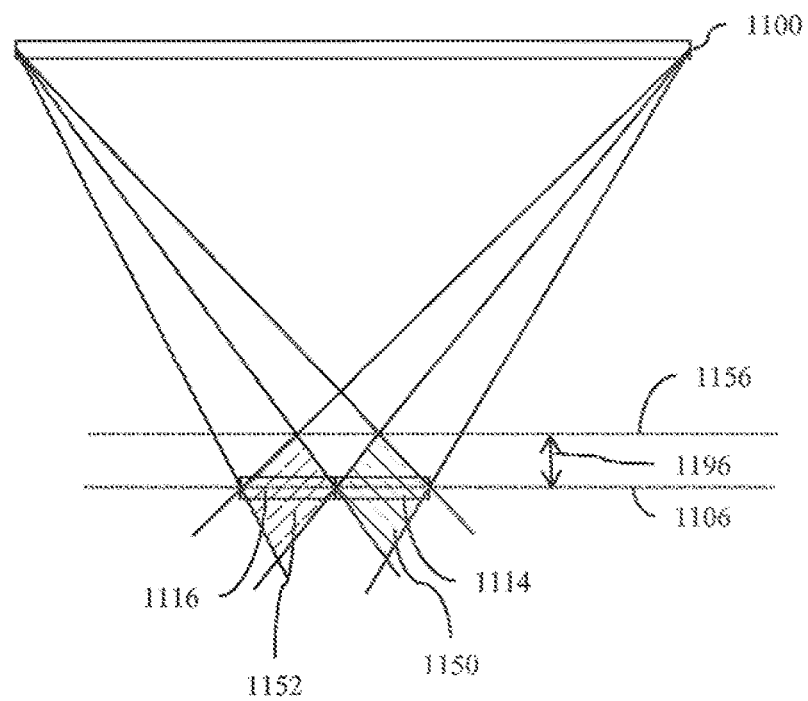
FIG. 50 is a schematic diagram illustrating in front view, the arrangement of the viewing zones from an autostereoscopic display including a single illumination region with an observer at the window plane, in accordance with the present disclosure.

FIG. 50 is a schematic diagram illustrating in front view, the arrangement of the viewing zones from an autostereoscopic directional display device including a single illumination region with an observer at the window plane. Further, FIG. 50 illustrates the diamond shaped viewing regions 1152 and 1150 corresponding to viewing windows 1114, 1116 at the window plane 1106 for a given size of display 1100. At the plane 1156, the useful viewing regions 1152, 1150 may provide only a single lateral viewing location without observer tracking. Forward of the line 1156, an autostereoscopic image may not be seen across the whole of the display. Thus, as shown in FIG. 50, the forward range 1196 for 3D viewing may be from the window plane towards the display 100 with a single valve optical element.

In one embodiment, an autostereoscopic display apparatus including the display device may further include a control system which may be arranged to selectively operate the light sources to direct light into viewing windows corresponding to output directions. The control system may be arranged to control the display device to display temporally multiplexed left and right images and substantially synchronously to direct the displayed images into viewing windows in positions which may correspond to the left and right eyes of an observer.

Further, the control system may include a sensor system which may be arranged to detect the position of an observer relative to the display device. The control system may be arranged to direct the displayed images into viewing windows in positions corresponding to left and right eyes of an observer, which may depend on the detected position of the observer. Additionally, the sensor system may be arranged to detect the position of an observer relative to the display device laterally and longitudinally to the approximate normal to the spatial light modulator. The control system is arranged to direct the displayed images into viewing windows in positions corresponding to left and right eyes of an observer, in dependence on the detected position of the observer.

Figure 51:
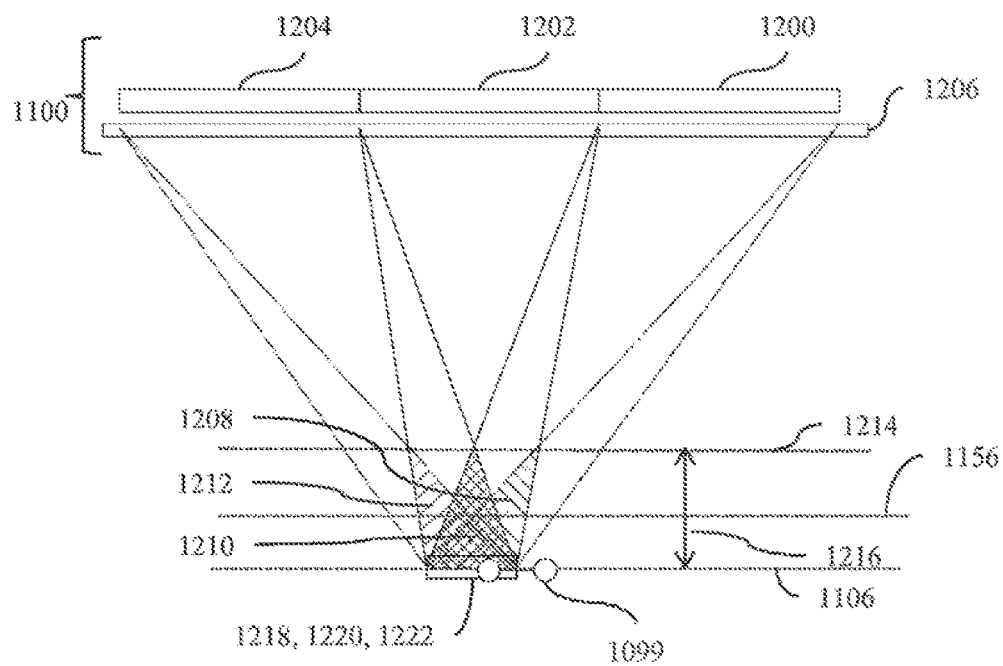
FIG. 51 is a schematic diagram illustrating in front view, the arrangement of the near viewing zones from an autostereoscopic directional display device including multiple illumination regions with an observer at the window plane, in accordance with the present disclosure.

FIG. 51 is a schematic diagram illustrating in front view, the arrangement of the near viewing zones from an autostereoscopic directional display device including multiple illumination regions with an observer 1099 at the window plane. Further, FIG. 51 shows that the illumination system behind the spatial light modulator 1206 may be provided by an array of optical valves 1200, 1202, 1204. By way of illustration, only the portion of the viewing diamonds between the window plane and display 1100 are shown, although the following discussion may be applied to the region behind the window plane. Each optical valve 1200, 1202, 1204 may illuminate a respective left eye viewing window 1218, 1220, 1222, and may provide forward viewing zones 1208, 1210, 1212. At the window plane, the viewing windows 1218, 1220, 1222 may be overlapped and the observer 1099 can see a left eye image across approximately the whole of the display 1100 area.

Advantageously the present embodiments increase the longitudinal viewing freedom for displays by reducing the size of the individual optical valves. Such an embodiment may be advantageous for large area displays, such as televisions and monitors when viewed from short distances as well as for mobile displays with an extended range of viewing freedom.

Figure 52:
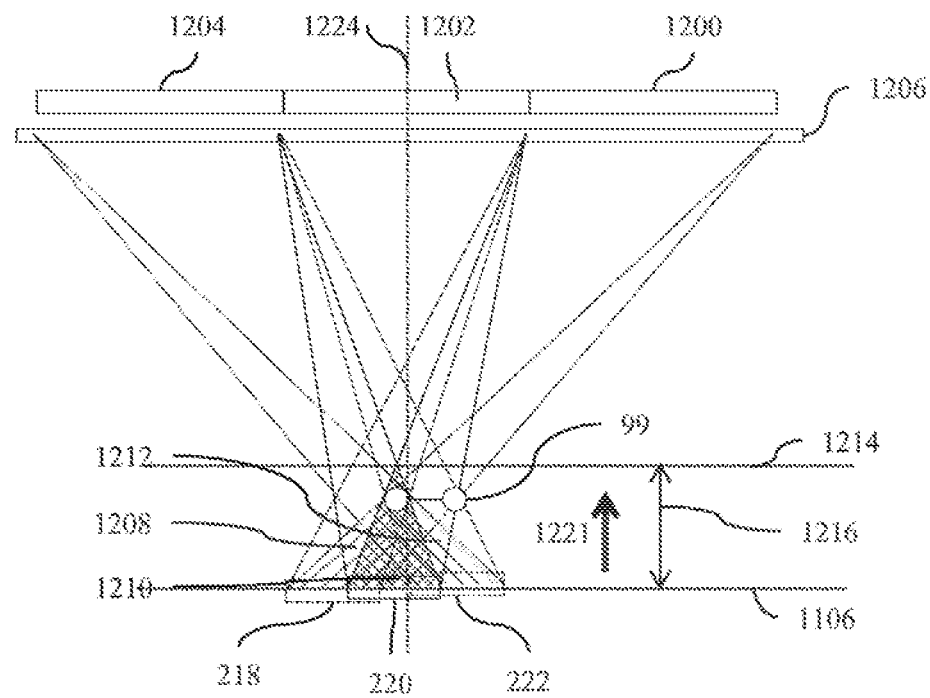
FIG. 52 is a schematic diagram illustrating in front view, the arrangement of the near viewing zones from an autostereoscopic directional display device including multiple illumination regions with an observer between the window plane and the display, in accordance with the present disclosure.

FIG. 52 is a schematic diagram illustrating in front view, the arrangement of the near viewing zones from an autostereoscopic directional display device including multiple illumination regions with an observer between the window plane and the display. Further, FIG. 52 shows that in combination with an observer tracking system, the longitudinal viewing freedom can be further extended. Observer 99 moving in direction 1221 may be tracked so that respective optical valves may produce viewing windows 1218, 1220, 1222 that may no longer be overlapping in the window plane 1106. Thus the optical valves and respective approximately aligned light emitting element arrays may cooperate to direct light to an observer such that the illumination of the plurality of aligned light emitting element arrays may be independently controlled to provide illumination in alignment with the three dimensional location of the observer. In this manner, an observer can be advantageously tracked over a wide longitudinal viewing range 1216.

Figure 53:
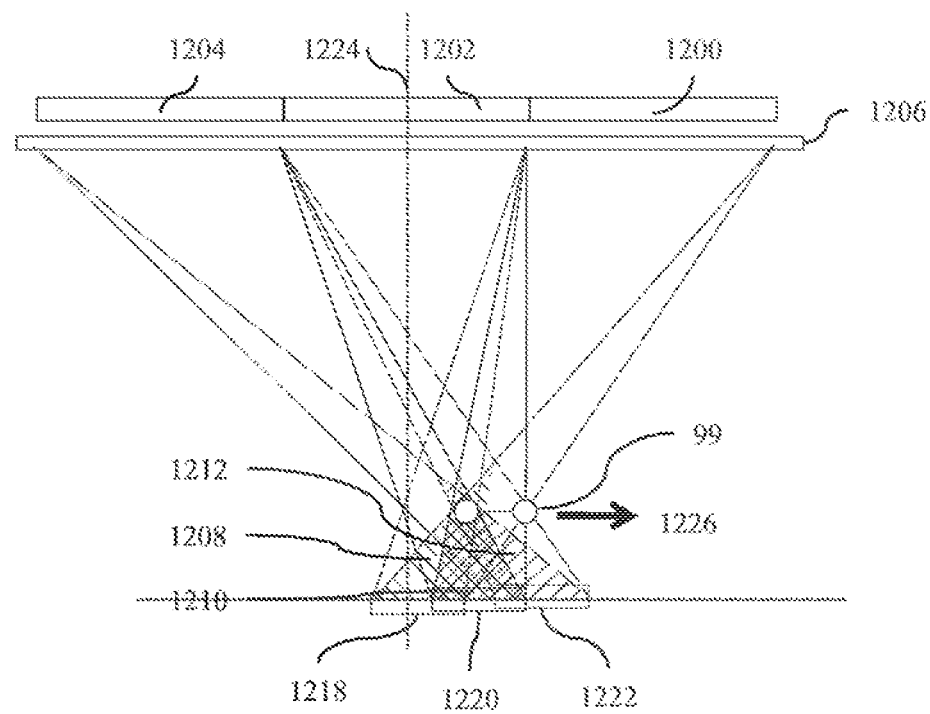
FIG. 53 is a schematic diagram illustrating in front view, the arrangement of the near viewing regions from an autostereoscopic directional display device including multiple illumination regions for a moving observer between the window plane and the display, in accordance with the present disclosure.

FIG. 53 is a schematic diagram illustrating in front view, the arrangement of the near viewing regions from an autostereoscopic directional display device including multiple illumination regions for a moving observer between the window plane and the display. Further, FIG. 53 shows the embodiment of FIG. 52 when the forward positioned observer 99 has translated in direction 1226. Thus it can be seen that by translating separate viewing windows 1218, 1220, 1222, the observer can maintain an autostereoscopic image across the display surface over a wide range of lateral and longitudinal viewing positions. Longitudinal tracking may be achieved by adjusting viewing window 1218, 1220, 1222 separation for each of the respective optical valves and lateral tracking may be achieved by adjusting position of the set of viewing windows 1218, 1220, 1222 by means of controlling illumination of respective optical windows.

Figure 54:
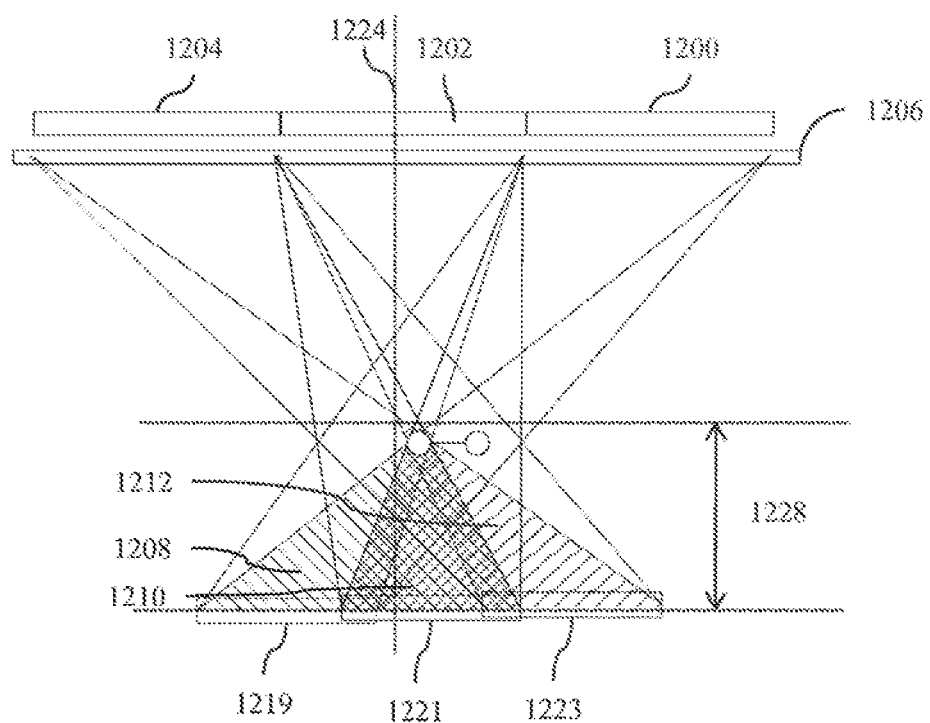
FIG. 54 is a schematic diagram illustrating a limit of longitudinal viewing freedom for an autostereoscopic directional display device including multiple illumination regions, in accordance with the present disclosure.

FIG. 54 is a schematic diagram illustrating a limit of longitudinal viewing freedom for an autostereoscopic directional display device including multiple illumination regions. Further, FIG. 54 shows the limit of viewing freedom in a three segment optical valve display can be increased by increasing the size of the respective viewing windows 1219, 1221, 1223 compared to the viewing windows of FIG. 53. Two or more segment optical valves may be used. However, for very wide angle devices it may be desirable to provide even closer viewing. This may be achieved using the apparatus of FIG. 55 or FIG. 56 for example as will be described below.

By way of comparison with known spatially multiplexed longitudinal tracking displays, an observer may be tracked without adjusting the SLM to show mixed slices of left and right views in a single illumination phase, thus higher display resolution may be advantageously achieved.

In the above stacked embodiments, the transmission of light from the lower element may be lower than for the upper element. The output luminance of the light emitting elements may be adjusted to compensate for this difference.

Figure 55:
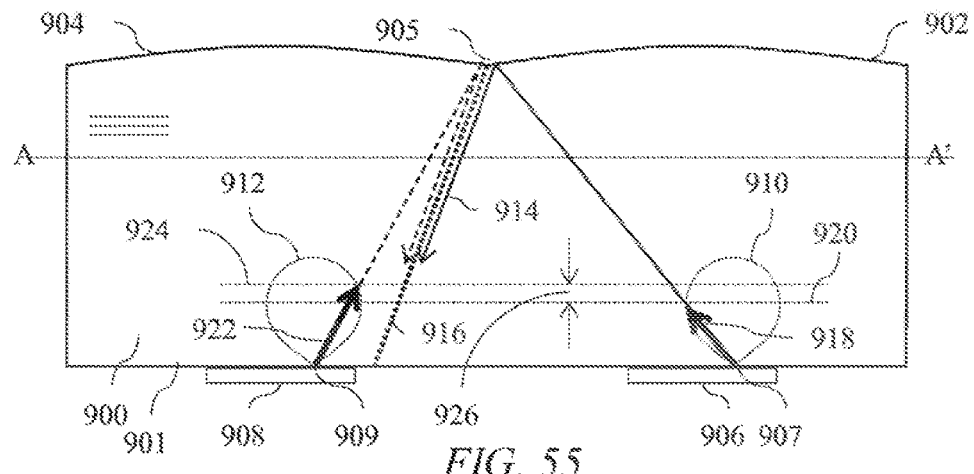
FIG. 55 is a schematic diagram illustrating a front view of a waveguide including first and second light reflecting sides for a first illumination arrangement, in accordance with the present disclosure.

FIG. 55 is a schematic diagram illustrating a front view of a waveguide including first and second light reflecting sides for a first illumination arrangement. Optical valve 900 includes first curved side 902 and second curved side 904 arranged to achieve a tiled optical valve as described above. Light source arrays 906, 908 are arranged to illuminate respective sides 902, 904 so that source 907 and source 909 are illuminated for a given optical window of the viewing window 26. If an air gap is provided between the light source arrays 906, 908, and the input side 901 to the tiled optical valve, then typically Lambertian illumination profile will be provided in air, that is coupled by refraction into a profile with a cone angle of $+/-\theta_c$ where $\theta_c$ is the critical angle of the material of the optical valve. Thus polar intensity distributions 910, 912 are produced inside the valve. It would be desirable to reduce the visibility of the seam 916 between the first and second curved sides 902, 904. In operation, light rays 918, 922 are directed towards the seam 916 so that rays 914 propagate parallel to the seam 916 after reflection at sides 902, 904. From the polar distributions 910, 912 it can be seen that the intensity of the rays 914 will be different either side of the seam 916, illustrated by the relative separation 926 of the lines 920, 924 with respect to the two distributions 910, 912. Further, the distance of the source to the cusp 905 may be different for the two sources 907, 909, thus further providing a difference in intensity of rays 914 either side of the seam 916. Undesirably this may provide an illumination discontinuity at the display surface.

Figure 56:
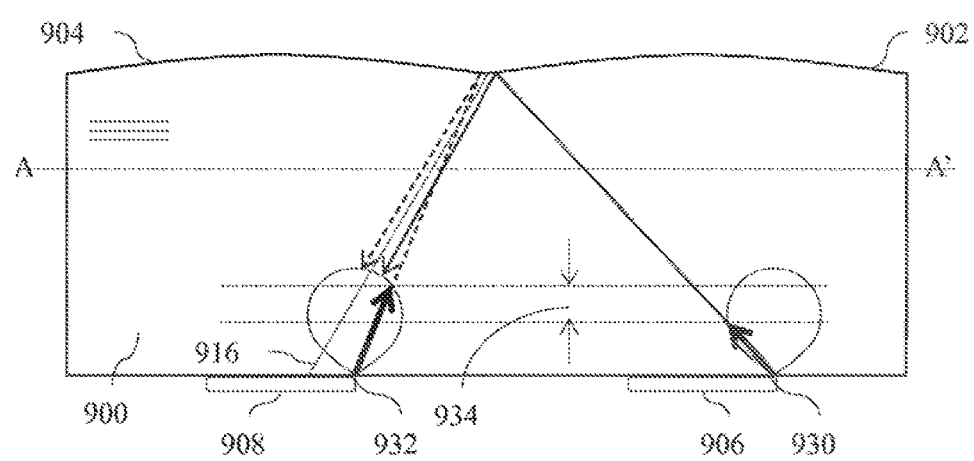
FIG. 56 is a schematic diagram illustrating a front view of a waveguide including first and second light reflecting sides for a second illumination arrangement, in accordance with the present disclosure.

FIG. 56 is a schematic diagram illustrating a front view of a waveguide including first and second light reflecting sides for a second illumination arrangement. Sources 930, 932 are provided at a greater distance from the centre of the arrays 906, 908 and thus the separation 934 is increased, thus providing a greater intensity difference across the seam 916 for rays 914.

Figure 57:
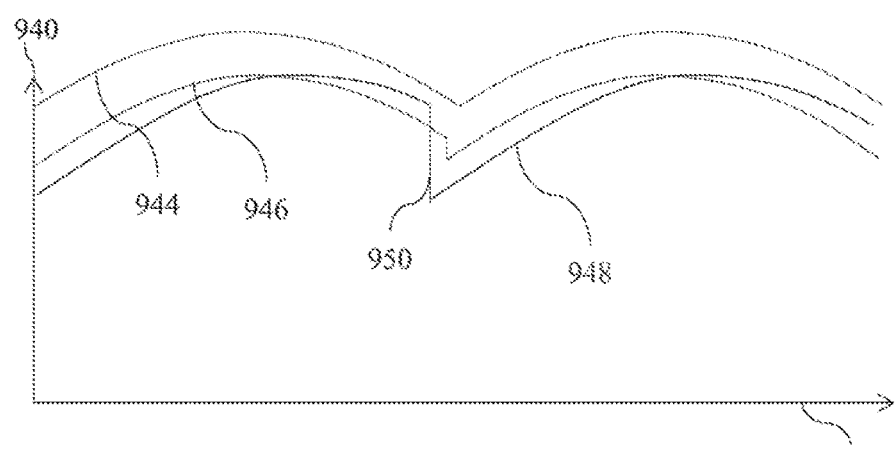
FIG. 57 is a schematic diagram illustrating graphs of display luminance across the width of the waveguide for various illumination arrangements, in accordance with the present disclosure.

FIG. 57 is a schematic diagram illustrating graphs of display luminance across the width of the optical valve for various illumination arrangements for a horizontal cross section A-A' across the optical valves of FIGS. 55 and 56. For on-axis sources, distribution 944 may be achieved. At the cusp region, the intensity variation may change direction, but there is no discontinuity in the intensity distribution. If further diffusers are added, such a difference may have low visibility. Distribution 946 may be provided by light source arrangement of FIG. 55 and distribution 948 by the arrangement of FIG. 56. Thus a discontinuity 950 in intensity at the seam 916 may be provided.

Figure 58:
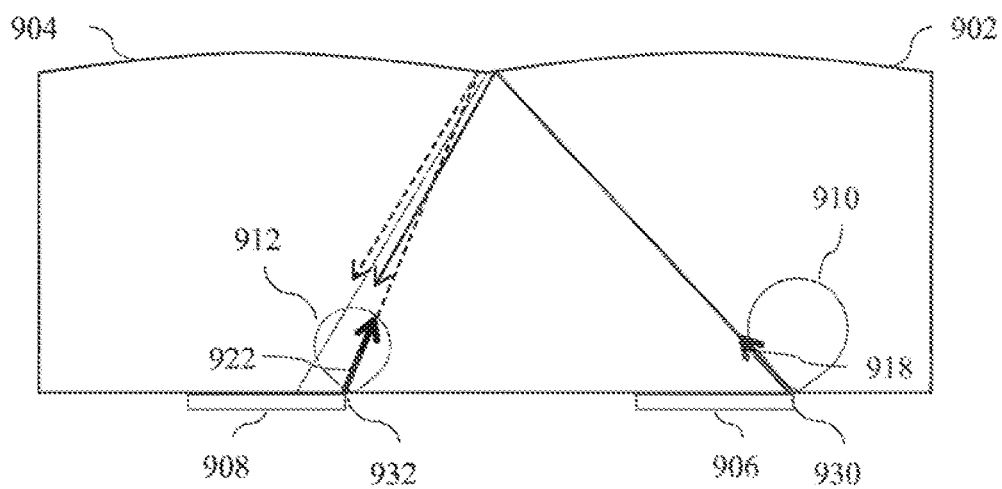
FIG. 58 is a schematic diagram illustrating a front view of a waveguide including first and second light reflecting sides for a third illumination arrangement, in accordance with the present disclosure.

FIG. 58 is a schematic diagram illustrating a front view of a waveguide including first and second light reflecting sides for a third illumination arrangement. A control system (not shown) may be provided to modulate the greyscale output of the respective light sources 930, 932. Thus the distribution 912 may be reduced in intensity compared to the distribution 910 so that the intensity of the rays 914 are substantially matched either side of the seam 916.

Figure 59:
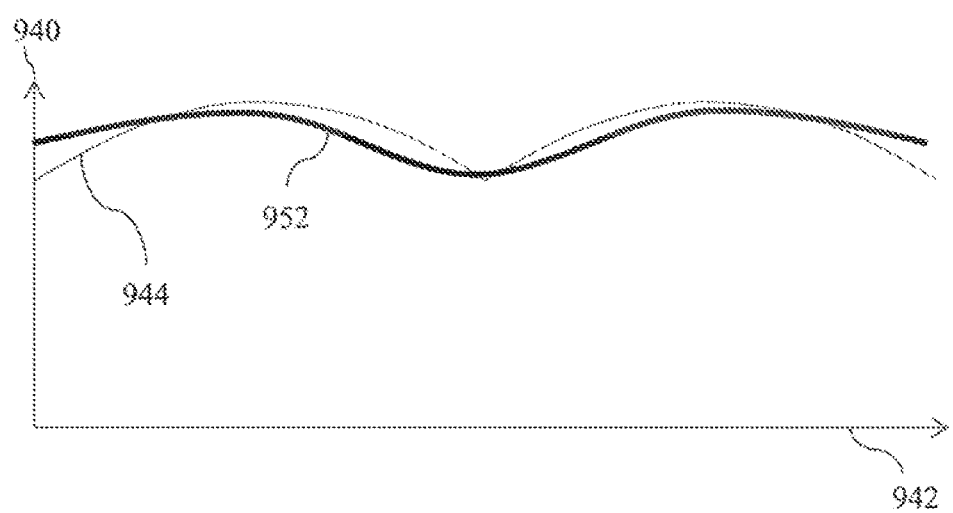
FIG. 59 is a schematic diagram illustrating graphs of display luminance across the width of the waveguide for various illumination arrangements, in accordance with the present disclosure.

FIG. 59 is a schematic diagram illustrating graphs of display luminance across the width of the waveguide for various illumination arrangements. Thus the display illuminance distribution 944 may be achieved by the arrangement of FIG. 58. Further, addition of a diffuser with some diffusion in the lateral direction may achieve the distribution 952.

Advantageously the uniformity of illumination of the display is increased and the appearance of the seam 916 is minimized.

FIG. 57 is a schematic diagram illustrating graphs of display luminance across the width of the optical valve for various illumination arrangements. Distribution 944 may be provided by the corrected intensity of the respective light sources 930, 932 and after a diffusor is provided between the valve and observer, distribution 944 may be achieved. Advantageously the uniformity of the display output across its area may be increased. Such an arrangement can achieve desirable uniformity performance for tiled valves, increasing display area and reducing display bezel size as well as reducing display aberrations.

Figure 60:
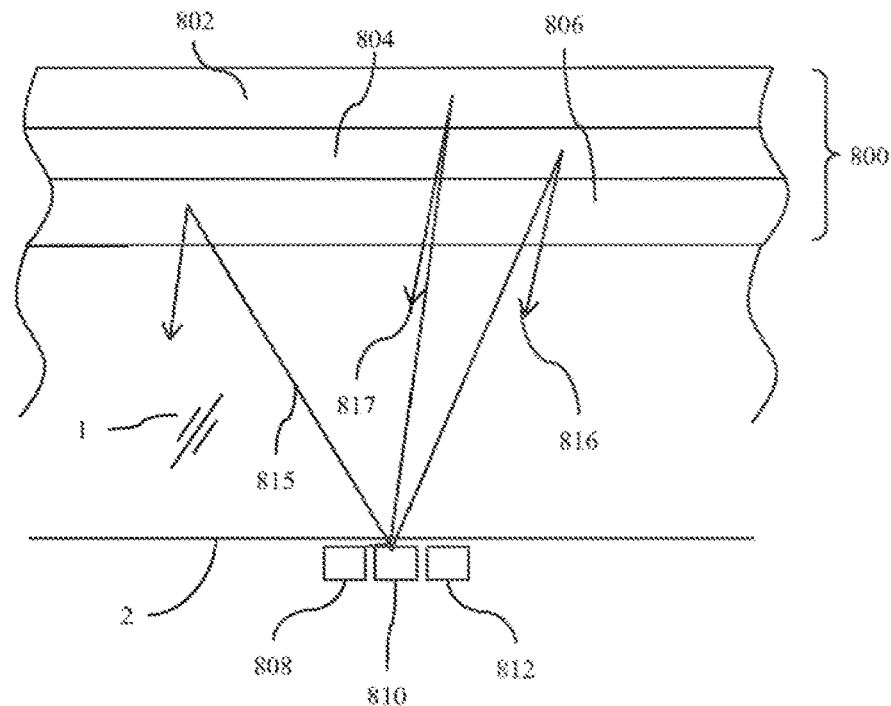
FIG. 60 is a schematic diagram illustrating a first arrangement of a diffractive mirror in accordance with the present disclosure.

Advantageously, the diffractive reflector 800 may be tuned to the peak emission wavelengths of the light emitting elements of the array 15 as shown in FIG. 60 including respective layers 802, 804, 806 or alternatively recorded within a single layer, corresponding to peak emission of red light emitting element 808, green light emitting element 810 and blue light emitting element 812. The reflector 800 may include stacks of red, green and blue reflection diffractive elements or may be formed by multiple recordings in a single layer. Thus the reflected rays 815, 816, 817 are collimated across a broad spectral band from a flat element. Advantageously, such an arrangement achieves a non-metalized reflector that is planar. Advantageously, such an arrangement may reduce stray light by way of comparison with poorly finished plastic surfaces that are metalized. Thus such an arrangement may have reduced cross talk.

Figure 61:
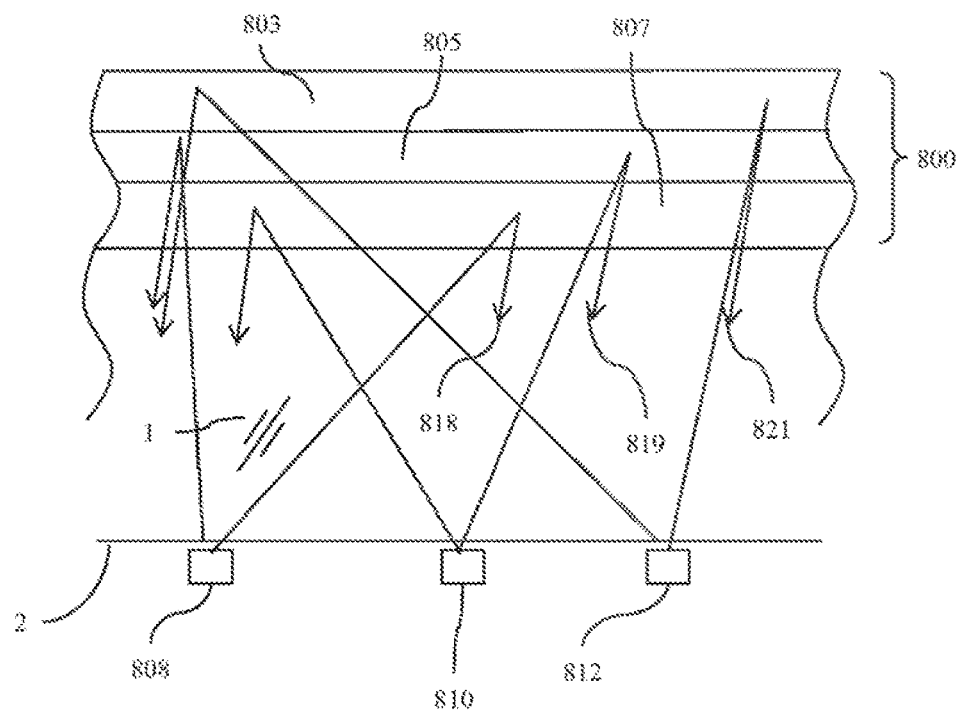
FIG. 61 is a schematic diagram illustrating a further arrangement of a diffractive mirror in accordance with the present disclosure.

FIG. 61 shows that further layers or diffractive reflective structures may be incorporated into the reflector 800 to achieve higher quality off-axis imaging so that advantageously, the viewing angle of the display may be increased compared to spherical surface mirrors. Thus, the layers 803, 805, 807 may be optimized for separated light emitting element 808, 810, 812, providing collimated output rays 818, 819, 821 for guiding within the optical valve 1.

The light emitting elements may include narrow band emission to provide high efficiency of reflection. The reflector 800 may be recorded to provide low aberrations and high efficiency over a range of illumination angles including the length of the array 15, and may include multiple diffractive structures to achieve high efficiency over the respective range of illumination angles.

The reflector 800 may further incorporate a diffusing function that is different in x and y directions, so as to achieve limited blurring across the windows (y axis) while larger blurring in the vertical direction (x-axis). Advantageously, the asymmetric diffusers may be removed, reducing cost and complexity.

Figure 62:
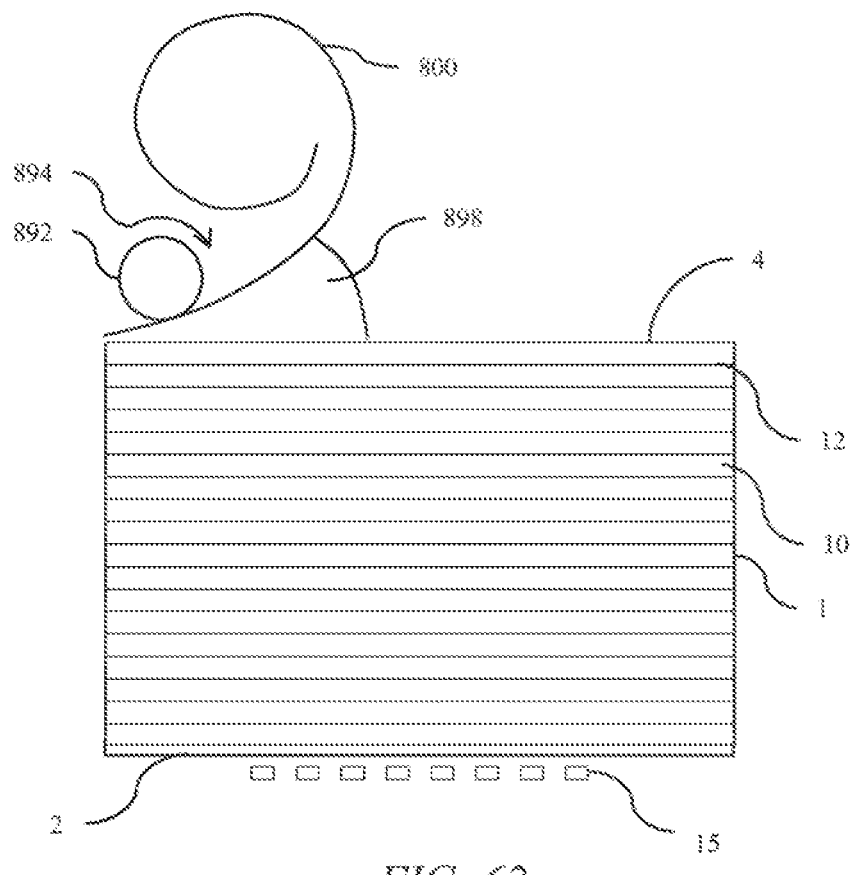
FIG. 62 is a schematic diagram illustrating a method to form a holographic mirror on a waveguide in accordance with the present disclosure.

FIG. 62 shows a method to form the diffractive mirror 800 on a waveguide 1. Side 4 may be expensive to provide with an accurately polished and reflective surface on a plastic optical valve 1. The reflector 800 may be provided by a roller 892 rolling in direction 894 onto the top side 4 and an index matching adhesive 898 to provide an optically transparent interface to the reflector 800.

Figure 63:
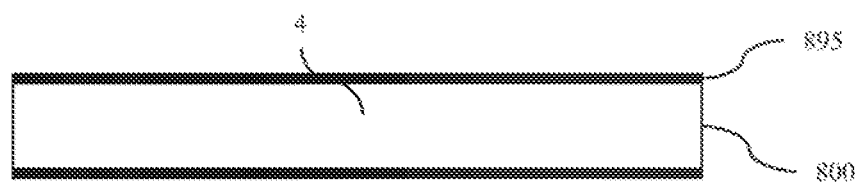
FIG. 63 is a schematic diagram illustrating the end view of a holographic mirror in accordance with the present disclosure.

FIG. 63 shows a further embodiment to control stray light losses in optical valves, illustrating the top view of side 4. Chips or other errors in the corners of the side 4 in contact with side 6 and feature 10 may create unwanted non-uniformities in light output. Advantageously, an absorbing region 895 and mirror region 897 may be provided on the side 4 to reduce non-uniformities and reduce stray light. The region 895 may be formed by printing for example, either directly onto the side 4 prior to forming the reflector 800 on the side 4.

As may be used herein, the terms "substantially" and "approximately" provide an industry-accepted tolerance for its corresponding term and/or relativity between items. Such an industry-accepted tolerance ranges from approximately zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A directional illumination apparatus, comprising:
at least two optical valves for guiding light, wherein each optical valve further comprises:
a first light guiding surface, wherein the first light guiding surface is substantially planar; and
a second light guiding surface, opposite the first light guiding surface, further comprising a plurality of guiding features and a plurality of extraction features,
wherein the plurality of extraction features are operable to allow light to pass with substantially low loss when the light is propagating in a first direction;
wherein the plurality of extraction features are oriented to cooperate with light sources to direct illumination light provided from different light sources along different directions, wherein different directions comprise at least different angular directions, and wherein at least one of the optical valves has a nonuniform thickness between the light guiding surfaces, and
wherein the optical valves are arranged in a stacked configuration.

2. The directional illumination apparatus of claim 1, wherein the optical valves are arranged in a tiled configuration.

3. The directional illumination apparatus of claim 1, wherein at least some light from the first optical valve is directed through the second optical valve.

4. A directional illumination apparatus, comprising:
a first light extraction element for guiding and extracting light, wherein the first light extraction element comprises:
a first light guiding surface;
a second light guiding surface, opposite the first light guiding surface; and
a first illumination input surface located between the first and second light guiding surfaces, the first illumination input surface operable to receive light from a first array of light sources; and
a second light extraction element for guiding and extracting light,
wherein the second light extraction element comprises:
a third light guiding surface,
a fourth light guiding surface opposite the third light guiding surface,
a second illumination input surface located between the third and fourth light guiding surfaces, the second illumination input surface operable to receive light from a second array of light sources,
wherein light from the second light extraction light element is directed at least in part through a surface of the first light extraction element other than the first illumination input surface, and wherein at least one of the first and second light extraction elements has a nonuniform thickness between the light guiding surfaces; and
wherein the second and fourth light guiding surfaces further comprise a plurality of light extraction features oriented to cooperate with respective arrays of light sources to direct illumination light provided from different light sources along different directions, wherein different directions comprise at least different angular directions, and
wherein the first and second light extraction elements are arranged in a stacked configuration.

5. The directional illumination apparatus of claim 4, wherein the first and second light extraction elements are arranged in a tiled configuration.

6. The directional illumination apparatus of claim 4, wherein the first and second light extraction elements are arranged in a tiled configuration such that the respective light guiding surfaces are substantially coplanar.

7. The directional illumination apparatus of claim 4, wherein the first and second light extraction elements are arranged in a stacked configuration to provide at least a first viewing window and a second viewing window.

8. The directional illumination apparatus of claim 4, wherein the first and second light extraction elements each have a thick end and a thin end and are arranged in a stacked configuration and inverted with respect to one another such that the thin end of the first light extraction element may approximately align with the thick end of the second light extraction element.

9. The directional illumination apparatus of claim 4, further comprising an illuminator array.

10. The directional illumination apparatus of claim 4, further comprising a third light extraction element.

11. The directional illumination apparatus of claim 10, wherein the third light extraction element is arranged in a stacked configuration with the first and second light extraction elements.

12. The directional illumination apparatus of claim 11, further comprising a first illuminator array, a second illuminator array, and a third illuminator array for the first, second, and third light extraction elements, respectively.

13. The directional illumination apparatus of claim 12, wherein the first, second, and third light extraction elements are operable to illuminate a monochromatic spatial light modulator.

14. The directional illumination apparatus of claim 12, wherein the first illuminator array is a red illuminator array, the second illuminator array is a green illuminator array, and the third illuminator array is a blue illuminator array.

15. The directional illumination apparatus of claim 14, wherein the red illuminator array is a red LED array, the green illuminator array is a green LED array, and the blue illuminator array is a blue LED array.

16. The directional illumination apparatus of claim 15, wherein the first, second, and third light extraction elements provide respective red, green and blue illumination directions for illumination of a transmissive spatial light modulator.

17. The directional illumination apparatus of claim 4, further comprising a red illuminator array, a blue illuminator array, and a green illuminator array.

18. The directional illumination apparatus of claim 17, wherein the red illuminator array, the blue illuminator array and the green illuminator array are arranged in series proximate to the first illumination input surface of the first light extraction element.

19. The directional illumination apparatus of claim 4, wherein the first and second light extraction elements each have a thick end and a thin end and are arranged in a stacked configuration, and inverted with respect to one another such that the thin end of the first light extraction element may approximately align with the thick end of the second light extraction element, and incorporating a first substantially parallel input section planar waveguide and a second substantially parallel input section planar waveguide.

20. The directional illumination apparatus of claim 4, further comprising at least a third light extraction element, and a fourth light extraction element arranged in a stacked and tiled configuration.

21. The directional illumination apparatus of claim 4, wherein the first light extraction element is a first optical valve and the second light extraction element is a second optical valve.

* * * * *